United States Patent
Ashrafi

(10) Patent No.: US 10,014,948 B2
(45) Date of Patent: *Jul. 3, 2018

(54) RE-GENERATION AND RE-TRANSMISSION OF MILLIMETER WAVES FOR BUILDING PENETRATION

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/466,320

(22) Filed: Mar. 22, 2017

(65) Prior Publication Data

US 2017/0195054 A1    Jul. 6, 2017

Related U.S. Application Data

(63) Continuation-in-part of application No. 15/357,808, filed on Nov. 21, 2016, now Pat. No. 9,712,238.
(Continued)

(51) Int. Cl.
*H04B 7/14* (2006.01)
*H04B 10/40* (2013.01)
(Continued)

(52) U.S. Cl.
CPC ............ *H04B 10/40* (2013.01); *H01Q 1/526* (2013.01); *H01Q 13/02* (2013.01); *H04B 5/0031* (2013.01); *H04B 5/0093* (2013.01); *H04B 10/11* (2013.01); *H04B 10/2575* (2013.01); *H04B 10/2581* (2013.01); *H04B 10/5161* (2013.01);
(Continued)

(58) Field of Classification Search
CPC .... H04B 5/0031; H04B 5/0093; H04B 10/11; H04B 10/40; H04B 10/2575; H04W 12/04
See application file for complete search history.

(56) References Cited

U.S. PATENT DOCUMENTS 3,459,466 A    8/1969   Giordmaine
3,614,722 A   10/1971   Jones
(Continued)

OTHER PUBLICATIONS

Vasnetsov, M. V., Pasko, V.A. & Soskin, M.S.; Analysis of orbital angular momentum of a misaligned optical beam; New Journal of Physics 7, 46 (2005).
(Continued)

*Primary Examiner* — Tuan Pham
(74) *Attorney, Agent, or Firm* — Gregory M. Howison

(57) ABSTRACT

A system for enabling signal penetration into a building includes first circuitry, located on an outside of the building, that receives millimeter wave signals and converting the millimeter wave signals into a format that penetrates into an interior of a building for reception by wireless devices within the building. Second circuitry, located on an inside of the building and communicatively linked with the first circuitry, receives the millimeter wave signals in the format that penetrates into an interior of the building and converts the millimeter wave signals in the format to a second format for transmission to the wireless devices within the building.

21 Claims, 44 Drawing Sheets

Related U.S. Application Data which is a continuation of application No. 15/144,297, filed on May 2, 2016, now Pat. No. 9,503,258, which is a continuation of application No. 14/323,082, filed on Jul. 3, 2014, now Pat. No. 9,331,875.

(60) Provisional application No. 62/317,829, filed on Apr. 4, 2016, provisional application No. 62/321,245, filed on Apr. 12, 2016, provisional application No. 62/368,417, filed on Jul. 29, 2016, provisional application No. 62/369,393, filed on Aug. 1, 2016, provisional application No. 62/425,432, filed on Nov. 22, 2016, provisional application No. 61/975,142, filed on Apr. 4, 2014.

(51) Int. Cl.

| | |
|---|---|
| *H04B 10/11* | (2013.01) |
| *H04B 10/2575* | (2013.01) |
| *H04W 12/04* | (2009.01) |
| *H01Q 13/02* | (2006.01) |
| *H01Q 1/52* | (2006.01) |
| *H04B 5/00* | (2006.01) |
| *H04B 10/2581* | (2013.01) |
| *H04B 10/516* | (2013.01) |
| *H04B 10/532* | (2013.01) |
| *H04B 10/54* | (2013.01) |
| *H04J 14/00* | (2006.01) |
| *H04L 9/08* | (2006.01) |
| *H04L 25/03* | (2006.01) |
| *H04L 27/00* | (2006.01) |
| *H04L 27/34* | (2006.01) |
| *H04L 29/06* | (2006.01) |
| *H04L 9/30* | (2006.01) |
| *H04W 84/12* | (2009.01) |
| *H04L 5/00* | (2006.01) |

(52) U.S. Cl.
CPC ......... *H04B 10/532* (2013.01); *H04B 10/541* (2013.01); *H04J 14/00* (2013.01); *H04L 9/0858* (2013.01); *H04L 9/3093* (2013.01); *H04L 25/03006* (2013.01); *H04L 25/03343* (2013.01); *H04L 27/0008* (2013.01); *H04L 27/3488* (2013.01); *H04L 63/06* (2013.01); *H04W 12/04* (2013.01); *H04L 5/0026* (2013.01); *H04L 2025/0335* (2013.01); *H04L 2025/0342* (2013.01); *H04W 84/12* (2013.01)

(56) References Cited

U.S. PATENT DOCUMENTS

| | | | |
|---|---|---|---|
| 4,379,409 A | 4/1983 | Primbsch et al. | |
| 4,503,336 A | 3/1985 | Hutchin et al. | |
| 4,736,463 A | 4/1988 | Chavez | |
| 4,792,814 A | 12/1988 | Ebisui | |
| 4,862,115 A | 8/1989 | Lee et al. | |
| 5,051,754 A | 9/1991 | Newberg | |
| 5,220,163 A | 6/1993 | Toughlian et al. | |
| 5,222,071 A | 6/1993 | Pezeshki et al. | |
| 5,272,484 A | 12/1993 | Labaar | |
| 5,543,805 A | 8/1996 | Thaniyavarn | |
| 5,555,530 A | 9/1996 | Meehan | |
| 6,337,659 B1 | 1/2002 | Kim | |
| 6,992,829 B1 | 1/2006 | Jennings et al. | |
| 7,577,165 B1 | 8/2009 | Barrett | |
| 7,729,572 B1 | 6/2010 | Pepper et al. | |
| 7,792,431 B2 | 9/2010 | Jennings et al. | |
| 8,432,884 B1 | 4/2013 | Ashrafi | |
| 8,503,546 B1 | 8/2013 | Ashrafi | |
| 8,559,823 B2 | 10/2013 | Izadpanah et al. | |
| 8,811,366 B2 | 8/2014 | Ashrafi | |
| 9,077,577 B1 | 7/2015 | Ashrafi | |
| 2005/0254826 A1 | 11/2005 | Jennings et al. | |
| 2005/0259914 A1 | 11/2005 | Padgett et al. | |
| 2009/0028579 A1 | 1/2009 | Deng | |
| 2010/0013696 A1 | 1/2010 | Schmitt et al. | |
| 2010/0227547 A1* | 9/2010 | DiPiazza | H04B 7/2606 455/7 |
| 2011/0287716 A1 | 11/2011 | Lortz | |
| 2012/0207470 A1 | 8/2012 | Djordevic et al. | |
| 2013/0027774 A1 | 1/2013 | Bovino et al. | |
| 2013/0235744 A1 | 9/2013 | Chen et al. | |
| 2014/0355624 A1 | 12/2014 | Li et al. | |
| 2015/0098697 A1 | 4/2015 | Marom et al. | |
| 2016/0134356 A1* | 5/2016 | Rappaport | H04B 7/15507 370/315 |
| 2016/0294441 A1* | 10/2016 | Fazlollahi | H04B 3/36 |
| 2016/0380678 A1* | 12/2016 | McManus | H04B 5/02 455/73 |
| 2018/0026722 A1* | 1/2018 | Ashrafi | H04B 10/2575 |

OTHER PUBLICATIONS

Byun, S.H., Haji, G.A. & Young, L.E.; Development and application of GPS signal multipath simulator; Radio Science, vol. 37, No. 6, 1098 (2002).

Tamburini, Fabrizio; Encoding many channels on the same frequency through radio vorticity: first experimental test; New Journal of Physics 14, 033001 (2012).

Gibson, G. et al., Free-space information transfer using light beans carrying orbital angular momentum; Optical Express 12, 5448-5456 (2004).

Yan, Y. et al.; High-capacity millimetre-wave communications with orbital angular momentum multiplexing; Nature communications; 5, 4876 (2014).

Hur, Sooyoung et at.; Millimeter Wave Beamforming for Wireless Backhaul and Access in Small Cell Networks. IEEE Transactions on Communications, vol. 61, 4391-4402 (2013).

Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).

Anderson, Jorgen Bach; Rappaport, Theodore S.; Yoshida, Susumu; Propagation Measurements and Models for Wireless Communications Channels; 33 42-49 (1995).

Iskander, Magdy F.; Propagation Prediction Models for Wireless Communication Systems; IEEE Transactions on Microwave Theory and Techniques, vol. 50., No. 3, 662-673 (2002).

Wang, Jian, et al.; Terabit free-space data transmission employing orbital angular momentum multiplexing. Nature Photonics; 6, 488-496 (2012).

Katayama, Y., et al.; Wireless Data Center Networking with Steered-Beam mmWave Links; IEEE Wireless Communication Network Conference; 2011, 2179-2184 (2011).

Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).

Rapport, T.S.; Millimeter Wave Mobile Communications for 5G Cellular: It Will Work!; IEEE Access, 1, 335-349 (2013).

Solyman Ashrafi, Channeling Radiation of Electrons in Crystal Lattices, Essays on Classical and Quantum Dynamics, Gordon and Breach Science Publishers, 1991.

Solyman Ashrafi, Solar Flux Forecasting Using Mutual Information with an Optimal Delay, Advances in the Astronautical Sciences, American Astronautical Society, vol. 84 Part II, 1993.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Metrics and Design Parameters for an FSO Communications Link Based on Multiplexing of Multiple

(56) References Cited

OTHER PUBLICATIONS

Orbital-Angular-Momentum Beams, IEEE Globecom 2014, paper 1570005079, Austin, TX, Dec. 2014(IEEE, Piscataway, NJ, 2014).
Solyman Ashrafi, Optical Communications Using Orbital Angular Momentum Beams, Adv. Opt. Photon. 7, 66-106, Advances in Optics and Photonic, 2015.
Solyman Ashrafi, Performance Enhancement of an Orbital-Angular-Momentum based Free-space Optical communications Link Through Beam Divergence Controlling, IEEE/OSA Conference on Optical Fiber Communications (OFC) and National Fiber Optics Engineers Conference (NFOEC),paper M2F.6, Los Angeles, CA, Mar. 2015 (Optical Society of America, Washington, D.C., 2015).
Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.
Solyman Ashrafi, Link Analysis of Using Hermite-Gaussian Modes for Transmitting Multiple Channels in a Free-Space Optical Communication System, The Optical Society, vol. 2, No. 4, Apr. 2015.
Solyman Ashrafi, Performance Metrics and Design Considerations for a Free-Space Optical Orbital-Angular-Vlomentum Multiplexed Communication Link, The Optical Society, vol. 2, No. 4, Apr. 2015.
Solyman Ashrafi, Demonstration of Distance Emulation for an Orbital-Angular-Momentum Beam. OSA Technical Digest (online), paper STh1F.6. The Optical Society, 2015.
Solyman Ashrafi, Free-Space Optical Communications Using Orbital-Angular-Momentum Multiplexing Combined with MIMO-Based Spatial Multiplexing. Optics Letters, vol. 40, No.18, Sep. 4, 2015.
Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.
Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.
Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.
Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper UTh2A.63. The Optical Society, 2015.
Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC),paper M2F.1, Los Angeles, CA, Mar. 2015 (Optical Society of America, Washington, D.C., 2015).
Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.
Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.
Solyman Ashrafi, An Information Theoretic Framework to Increase Spectral Efficiency, IEEE Transactions on Information Theory, vol. XX, No. Y, Oct. 2014, Dallas, Texas.
Solyman Ashrafi, Acoustically induced stresses in elastic cylinders and their visualization, The Journal of the Acoustical Society of America 82(4):1378-1385, Sep. 1987.
Solyman Ashrafi, Splitting of channeling-radiation peaks in strained-layer superlattices, Journal of the Optical Society of America B 8(12), Nov. 1991.
Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.
Solyman Ashrafi, Orbital-Angular-Momentum-Multiplexed Free-Space Optical Communication Link Using Transmitter Lenses, Applied Optics, vol. 55, No. 8, pp. 2098-2103, 2016.
Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).
Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).
Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).
Solyman Ashrafi, Demonstration of OAM-based MIMO FSO link using spatial diversity and MIMO equalization for urbulence mitigation, IEEE/OSA Conference on Optical Fiber Communications (OFC), paper Th1H.2, Anaheim, CA, Mar. 2016 (Optical Society of America, Washington, D.C., 2016).
Solyman Ashrafi, Dividing and Multiplying the Mode Order for Orbital-Angular-Momentum Beams, European Conference on Optical Communications (EEOC), paper Th.4.5.1, Valencia, Spain, Sep. 2015.
Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.
Solyman Ashrafi, Experimental Demonstration of a 400-Gbit/s Free Space Optical Link using Multiple Orbital-Angular-Momentum Beams with Higher Order Radial Indices, APS/IEEE/OSA Conference on Lasers and Electro-Optics (CLEO), paper SW4M.5, San Jose, CA, May 2015 (OSA, Wash., D.C., 2015).
Solyman Ashrafi, Spurious Resonances and Modelling of Composite Resonators, 37th Annual Symposium on Frequency Control, 1983.
Solyman Ashrafi, Splitting and contrary motion of coherent bremsstrahlung peaks in strained-layer superlattices, Journal of Applied Physics 70:4190-4193, Dec. 1990.
Solyman Ashrafi, Nonlinear Techniques for Forecasting Solar Activity Directly From its Time Series, Proceedings of Flight Mechanics/Estimation Theory Symposium, National Aeronautics and Space Administration, May 1992.
Solyman Ashrafi, Demonstration of using Passive Integrated Phase Masks to Generate Orbital-Angular-Vlomentum Beams in a Communications Link, APS/IEEE/OSA Conference on Lasers and Electro-Optics (CLEO), paper 2480002, San Jose, CA, Jun. 2016 (OSA, Wash., D.C., 2016).
Solyman Ashrafi, Combining Schatten's Solar Activity Prediction Model with a Chaotic Prediction Model, National Aeronautics and Space Administration, Nov. 1991.
Solyman Ashrafi, Detecting and Disentangling Nonlinear Structure from Solar Flux Time Series, 43rd Congress of be International Astronautical Federation, Aug. 1992.

(56) References Cited

OTHER PUBLICATIONS

Solyman Ashrafi, Physical Phaseplate for the Generation of a Millimeter-Wave Hermite-Gaussian Beam, IEEE Antennas and Wireless Propagation Letters, RWS 2016; pp. 234-237.

Solyman Ashrafi, Future Mission Studies: Forecasting Solar Flux Directly From Its Chaotic Time Series, Computer Sciences Corp., Dec. 1991.

Solyman Ashrafi, CMA Equalization for a 2 Gb/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, Evidence of Chaotic Pattern in Solar Flux Through a Reproducible Sequence of Period-Doubling-Type Bifurcations; Computer Sciences Corporation (CSC); Flight Mechanics/ Estimation Theory Symposium; NASA Goddard Space Flight Center; Greenbelt, Maryland; May 21-23, 1991.

Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.

H. Yao et al.; Patch Antenna Array for the Generation of Millimeter-wave Hermite-Gaussian Beams, IEEE Antennas end Wireless Propagation Letters; 2016.

Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).

Li, X. et al.; Investigation of interference in multiple-input multiple-output wireless transmission at W band for an optical wireless integration system. Optics Letters 38, 742-744 (2013).

Padgett, Miles J. et al., Divergence of an orbital-angular-momentum-carrying beam upon propagation. New Journal of Physics 17, 023011 (2015).

Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).

National Science Foundation Award Search: Award #1514275-CIF: Medium Fundamental Properties of Millimeter Wave Networks: Signal, Interference, and Connectivity; Accessed on Oct. 4, 2017; 2 pgs.

Future Cars: The word from GM at IDC's Smart Technology World conference; Jerry Apr. 30, 2012 19:45; Accessed on Oct. 10, 2017. https://m.blog.naver.com/PostView.nhn?blogId=windpusan &logNo=150137554930&proxyReferer=https%3A%2F%2Fwww. google.com%2F; 1 pg.

Yoshihisa Kishiyama et al; "Future Steps of LTE-A: Evolution Toward Integration of Local Area and Wide Area Systems"; Multicell Cooperation; NTT DOCOMO, Inc.; DOCOMO Innovations, Inc.: 1536-1284113; 2013 IEEE; IEEE Wireless Communications; Feb. 2013; 7 pgs.

Ahmed Alkhateeb and Robert W. Heath Jr. "Gram Schmidt Based Greedy Hybrid Precoding for Frequency Selective Millimeter Wave MIMO Systems"; The University of Texas at Austin; Austin, TX; 978-1-4799-9988-0/16; 2016 IEEE; ICASSP 2016; 5 pgs.

Hamamatsu; "Si PIN photodiodes: S1223 series—For visible to near IR, precision photometry"; Hamamatsu Photonics K.K., Solid State Division; Cat. No. KPIN1050E02 Feb. 2013; 3 pgs.

Foad Sohrabi and Wei Yu; "Hybrid Digital and Analog Beamforming Design for Large-Scale MIMO Systems"; Department of Electrical and Computer Engineering; University of Toronto; Toronto, Ontario; 978-1-4673-6997-8/15; 2015 IEEE; ICASSP 2015; 5 pgs.

Roi Mendez-Rial et al.; "Hybrid MIMO Architectures for Millimeter Wave Communications: Phase Shifters or Switches?" IEEE Access; vol. 4, 2016; The University of Texas at Austin; Austin, Texas; 21 pgs.

Duy H. N. Nguyen et al.; "Hybrid MMSE Precoding and Combining Designs for mmWave Multiuser Systems"; DOI 10.1109/Access/2017.2754979 IEEE Access; 2169-3536; 2017 IEEE; 14 pgs.

Cardinal IG; Technical Service Bulletin (Bulletin #IG05-02/16); Performance Data and Comparisons; 2016 Cardinal IG Company; 5 pgs.

David J. Goodman et al.; "INFOSTATIONS: A New System Model for Data and Messaging Services"; Wireless Information Network Laboratory (WINLAB), Rutgers University, Piscataway, NJ; O-7803-3659-3/97; 1997 IEEE; 5 pgs.

Andrew Thornburg, Tianyang Bai and Robert W. Heath, Jr.; "Interference Statistics in a Random mmWave ad hoc Network"; Wireless Communication and Networking Group; The University of Texas at Austin; Austin, TX; 978-1-4673-6997-8/15; 2015 IEEE; ICASSP 2015; 5 pgs.

Pretti Kumari, Nuria Gonzalez-Prelcic and Robert W. Heath, Jr.; "Investigating the IEEE 802.11ad Standard for Millimeter Wave Automotive Radar"; Wireless Net. And Comm. Group, Department of ECE, The Jniversity of Texas at Austin; Austin, TX; Department of Signal Theory and Communications, Universidade de Vigo; Vigo, Spain; 978-1-4799-8091-8/15; 2015 IEEE; 5 pgs.

Ahmed Alkhateeb, Geert Leus and Robert W. Heath, Jr.; "Limited Feedback Hybrid Precoding for Multi-User Millimeter Wave Systems"; IEEE Transactions on Wireless Communications, vol. 14, No. 11, Nov. 2015; 14 pgs.

Cristian Rusu et al.; "Low Complexity Hybrid Precoding Strategies for Millimeter Wave Communication Systems" IEEE Transactions on Wireless Communications, vol. 15, No. 12, Dec. 2016; 14 pgs.

Wonil Roh et al.; "Millimeter-Wave Beamforming as an Enabling Technology for 5G Cellular Communications: Theoretical Feasibility and Prototype Results" Samsung Electronics Co., Ltd.; Samsung Research America; IEEE communications Magazine; Feb. 2014; 8 pgs.

Sundeep Rangan, Theodore S. Rappaport and Elza Erkip; "Millimeter-Wave Cellular Wireless Networks: Potentials and Challenges" Proceedings of the IEEE; vol. 102, No. 3, Mar. 2014; 20 pgs.

Mustafa Riza Akdeniz et al.; "Millimeter Wave Channel Modeling and Cellular Capacity Evaluation" IEEE Journal on Selected Areas in Communications, vol. 32, No. 6, Jun. 2014: 16 pgs.

Gabriel M. Rebeiz et al.; "Millimeter-Wave Large-Scale Phased-Arrays for 5G Systems" University of California San Diego; La Jolla, California; 978-1-4799-8275-2/15; 2015 IEEE; 3 pgs.

Theodore S. Rappaport et al.; "Millimeter Wave Mobile Communications for 5G Cellular: It Will Work!" NYU Wireless, Polytechnic Institute of New York University; New York, NY; vol. 1, 2013; 2169-3536; 2013 IEEE Access; 15 pgs.

Kiran Venugopal and Robert W. Heath, Jr.; "Millimeter Wave Networked Wearables in Dense Indoor Environments" The University of Texas, Austin; Special Section on Body Area Networks for Interdisciplinary Research; vol. 4, Apr. 6, 2016; 17 pgs.

Junil Choi et al.;"Millimeter Wave Vehicular Communication to Support Massive Automotive Sensing" arXiv:1602.06456v2 [cs. IT]; May 18, 2016; 7 pgs.

Zhouyue Pi et al.; "Millimeter-Wave Gigabit Broadband Evolution toward 5H: Fixed Access and Backhaul" IEEE Communication Magazine; 0163-6804/16; Apr. 2016; 7 pgs.

Shu Sun et al.; MIMO for Millimeter-Wave Wireless Communications: Beamforming, Spatial Multiplexing, or Both? IEEE Communications Magazine; Radio Communications; 0163-6804/14; Dec. 2014; 12 pgs.

Ahmed Alkhateeb et al.; "MIMO Preceding and Combining Solutions for Millimeter-Wave Systems" IEEE communications Magazine; 0163-6804/14; Dec. 2014; 10 pgs.

Andrew Thornburg, Tianyang Bai and Robert W. Heath, Jr.; "MmWave Ad Hoc Network Coverage and capacity" IEEE ICC 2015 SAC—Millimeter-Wave Communications; Wireless Communication and Networking Group; The University of Texas at Austin; Austin, TX; 978-1-4673-6432-4/15; 6 pgs.

(56) References Cited

OTHER PUBLICATIONS

Chan Dai Truyen Thai et al.; "Multi-Flow Scheduling for Coordinated Direct and Relayed Users in Cellular Systems" IEEE Transactions on Communications, vol. 61, No. 2, Feb. 2013; 0090-6778/13; 10 pgs.
Junil Choi and Robert W. Heath Jr.; "Near Maximum-Likelihood Detector and Channel Estimator for Uplink Multiuser Massive MIMO Systems With One-Bit ADCs" IEEE Transactions on Communications, vol. 64, No. 5, May 2016; 0090-6778; 14 pgs.
Thomas L. Marietta; "Noncooperative Cellular Wireless with Unlimited Nos. Of Base Station Antennas"; IEEE Transactions on Wireless Communications, vol. 9, No. 11, Nov. 2010; 1536-1276/10; 2010 IEEE; 11 pgs.
Abhishek K. Gupta et al.; "On the Feasibility of Sharing Spectrum Licenses in mmWave Cellular Systems"; IEEE Transactions on Communications, vol. 64, No. 9.; Sep. 2016; 15 pgs.
Christopher Mollen et al.; "One-Bit ADCS in Wideband Massive MIMO Systems with OFDM Transmission"; Linkoping University, Dept. of Electrical Engineering; University of Texas at Austin, Dept. of Electrical and Computer Engineering, Austin, TX; 978-1-4799-9988-0/16; 2016 IEEE; ICASSP 2016; 5 pgs.
Mohammed E. Eltayeb et al.; "Opportunistic Beam Training with Hybrid Analog/Digital Codebooks for mmWave Systems" The University of Texas at Austin; King Abdulla University of Science and Technology; GlobalSIP 2015; Symposium on Massive MIMO and Full-Dimension MIMO (FD-MIMO) Communications; 978-1-4799-7591-4/15; 2105 IEEE; 5 pgs.
Andrew Thornburg and Tianyang Bai; Performance Analysis of Outdoor mmWave Ad Hoc Networks; IEEE Transactions on Signal Processing, vol. 64, No. 15, Aug. 1, 2016; 15 pgs.
Christopher Mollen et al.; "Uplink Performance of Wideband Massive MIMO With One-Bit ADCs" IEEE Transactions on Wireless Communications, vol. 16, No. 1, Jan. 2017; 14 pgs.
Premiertek.net—Networking; 2.4GHz/5GHz 802.11ac/a/b/g/n Dual Band MIMO 11dBi/13dBi Panel Antenna 2x N Female; Accessed on Sep. 22, 2017; http://www.premiertek.net/products/networking/ANT-D245813-MIMO.html; 4 pgs.
Premiertek.net—Networking; Outdoor 5.8GHz 12dBi OMNI-Directional High-Gain N-Type Female Antenna for WiFi WLAN 802.11a Application; Accessed on Sep. 22, 2017; http://www.premiertek.net/products/networking/ANT-OMNI-5812.html; 3 pgs.
Premiertek.net—Networking; "Outdoor 5GHz 30dBi Directional High-Gain N-Type Female Aluminum Die Cast Grid Parabolic Antenna"; Accessed on Sep. 22, 2017; 3 pgs.
Jens Zander et al.; "Riding the Data Tsunami in the Cloud: Myths and Challenges in Future Wireless Access"; The Royal Institute of Technology; RWTH Aachen University; Topics in Radio Communications; IEEE Communications Magazine; Mar. 2013; 0163-6804/13; 7 pgs.
Penfei Xia and Robert W. Heath, Jr.; "Robust Analog Precoding Designs for Millimeter Wave MIMO Transceivers With Frequency and Time Division Duplexing" IEEE Transactions on Communications, vol. 64, No. 11, Nov. 2016; 13 pgs.
Xia et al.; "Robust Analog Precoding Designs for Millimeter Wave MIMO Transceivers"; Key Lab of Embedded System and Service Computing, Tongji University, Shanghai China; The University of Texas at Austin, Austin, Texas; University of Vigo; Vigo, Spain; ISBN 978-3-8007-4177-9; WWA 2016; Mar. 9-11, 2016, Munich, Germany; 8 pgs.
Afif Osseiran et al.; "Scenarios for 5G Mobile and Wireless Communications: The Vision of the METIS Project" 5G Wireless Communications Systems: Prospects and Challenges; IEEE Communications Magazine; 0163-6804/14; May 2014; 10 pgs.
Texas Instruments; "TSW308x Evaluation Module" User's Guide; SLAU374B; Dec. 2011; Revised May 2016; 36 pgs.
Texas Instruments; "TSW1265EVM Evaluation Module" User's Guide; SLAU429; Mar. 2012; 18 pgs.
Texas Instruments; "TSW1266EVM Evaluation Module" User's Guide; SLAU484; Jan. 2013; 21 pgs.
Texas Instruments; "TRG2432EVM" User's Guide; SLWU036A; Jun. 2006; Revised Oct. 2006; 19 pgs.
Texas Instruments; "TRF2436EVM" User's Guide; SLWU038; Aug. 2006; 11 pgs.
Texas Instruments; "TRF370x Quadrature Modulator Evaluation Module" User's Guide; Literature No. SLWU062; Mar. 2010; 20 pgs.
Texas Instruments; "TRF3711xxEVM" User's Guide; SLWU069B; Feb. 2010; Revised Nov. 2010; 13 pgs.
Omar El Ayach et al.; "Spatially Sparse Precoding in Millimeter Wave MIMO Systems" IEEE Transactions on Wireless Communications, vol. 13, No. 3, Mar. 2014; 1536-1276/14; 15 pgs.
Wonbin Hong et al.; Study and Prototyping of Practically Large-Scale mmWave Antenna Systems for 5G Cellular Devices; Millimeter-Wave Communications for 5G; IEEE Communications Magazine; Sep. 2014; 0163-6804/14; 7 pgs.
3rd Generation Partnership Project; "Technical Specification Group Services and System Aspects; Study on architecture enhancements to support Proximity-based Services (ProSe) (Release 12)" 3GPP TR 23.703; v12.0.0; Feb. 2014; 324 pgs.
Vutha Va et al.; "The Impact of Beamwidth on Temporal Channel Variation in Vehicular Channels and Its Implications" IEEE Transactions on Vehicular Technology, vol. 66, No. 6, Jun. 2017; 16 pgs.
Andreas Mai; "The Internet of Cars: A Catalyst to Unlock Societal Benefits of Transportation" CISCO; Mar. 2013; 42 pgs.
Jerry Baulier et al.; "Making Meaningful Predictions in the Fast Lane: The Role of Event Stream Processing in Connected Vehicles" Research Brief; International Institute for Analytics; SAS; Connected Vehicle Trade Association; IIA Faculty; Oct. 2014; 14 pgs.
Jeffrey G. Andrews; "Seven Ways that HetNets Are a Cellular Paradigm Shift" Topics in Radio Communication; University of Texas at Austin; IEEE Communications Magazine; 0163-6804/13; Mar. 2013; 9 pgs.
Cristian Rusu et al.; "The Use of Unit Norm Tight Measurement Matrices for One-Bit Compressed Sensing" University of Vigo; The University of Texas at Austin; 978-1-4799-9988-0/16; 2016 IEEE; ICASSP 2016; 5 pgs.
Texas Instruments; "TSW1266 Wideband RF-to-Digital Complex Receiver-Feedback Signal Chain" TI Designs High Speed: Verified Design; Matt Guibord; TIDU127; Sep. 2013; 14 pgs.
Texas Instruments; "TSW308x Wideband Digital to RF Transmit Solution" TI Designs High Speed: CerTIfied Design; Kang Hsia; TIDU128; Sep. 2013; 31 pgs.
Sarabjot Singh et al.; "Tractable Model for Rate in Self-Backhauled Millimeter Wave Cellular Networks" IEEE Journal on Selected Areas in Communication, vol. 33, No. 10, Oct. 2015; 0733-8716; 16 pgs.
Texas Instruments; "Dual-Band IQ/IF Transceiver With Dual VCO Synthesizers" TRF2432; SWLS177A; Apr. 2005; Revised Dec. 2005; 23 pgs.
Texas Instruments; "High-Power Dual-Band (2.4-GHz to 2.5-GHz and 4.9-GHz to 5.9-GHz) RF Front-End" TRF2436; SWLS176; Apr. 2005; 11 pgs.
Texas Instruments; "TRF370419 50-MHz to 6-GHz Quadrature Modulator" TRF370417; SLWS213A; Jan. 2010; Revised Nov. 2015; 34 pgs.
Texas Instruments; "Integrated IQ Demodulator" TRF371135; SLWS220A; Feb. 2010; Revised Mar. 2010; 58 pgs.
Texas Instruments; "TSW1265 Dual-Wideband RF-to-Digital Receiver"; Mall Guibord; TI Designs High Speed: Verified Design; TIDU126; Sep. 2013; 15 pgs.
WirelessHD Product Listing; Website: http://www.wirelesshd.org/consumers/product-listing/; Accessed Oct. 4, 2017; 4 pgs.
3rd Generation Partnership Project; Technical Specification Group Services and System Aspects; Study on architecture enhancements to support Proximity Services (ProSe) (Release 12) 3GPP TR 23.703 V0.3.0 (Apr. 2013); Release 12 ; 26 pgs.
3rd Generation Partnership Project; Technical Specification Group Services and System Aspects; Study on architecture enhancements to support Proximity Services (ProSe) (Release 12) 3GPP TR 23.703 V0.3.0 (Apr. 2013); Release 12; 26 pgs. (Second One Found).

(56) References Cited

OTHER PUBLICATIONS

Research in China; "Global and China Low-E Glass Industry" Report, 2010-2011; Oct. 2011, Beijing, China; 10 pgs.
P. Baracca et al.; "A Dynamic Clustering and Resource Allocation Algorithm for Downlink CoMP Systems with Multiple Antenna UEs" arXiv:1311.5114v1 [cs.IT] Nov. 20, 2013; 27 pgs.
Cristian Rusu et al.; "Adaptive One-bit Compressive Sensing with Application to Low-Precision Receivers at mmWave" Universidade de Vigo; Vigo, Spain; The University of Texas at Austin; Austin, TX; 2015 IEEE; 6 pgs.
Amazon.com; Competition Solar 7-Watt Amorphous Solar Power Battery Charger; Sep. 22, 2017; 7 pgs.
Amazon.com; ECEEN Portable Solar Charger, 7W Solar Panel 22% High Efficiency with USB Port Power Charger for IOS for Apple iPhone 6/6 Plus, S6/S6 Edge iPad & Samsung any more USB devices; Sep. 22, 2017; 7 pgs.
Zhouyue Pi and Farooq Khan, Samsung Electronics "An Introduction to Millimeter-Wave Mobile Broadband Systems"; Topics in Radio Communications; IEEE Communications Magazine; Jun. 2011; 7 pgs.
Robert W. Heath Jr. et al; "An Overview of Signal Processing Techniques for Millimeter Wave MIMO Systems" IEEE Journal of Selected Topics in Signal Processing; vol. 10, No. 3, Apr. 2016; 18 pgs.
Tianyang Bai et al; "Analysis of Blockage Effects on Urban Cellular Networks" IEEE Transactions on Wireless communications; vol. 13, No. 9; Sep. 2014; 14 pgs.
Kiran Venugopal et al; "Analysis of Millimeter Wave Networked Wearables in Crowded Environments" IEEE; Asilomar 2015; 5 pgs.
Tianyang Bai and Robert W. Heath Jr.; "Analysis of Self-body Blocking Effects in Millimeter Wave Cellular Networks" Wireless Networking and Communication Group, The University of Texas at Austin; IEEE; Asilomar 2014; 5 pgs.
Atheros Communications; "AR9280 Single-chip 2A/5 GHz 802.11n WLAN solution for PCI-Express" XSPAN Atheros; 2010; AR9280-6-16-10; 2 pgs.
Atheros Communications; "AR9280 Single-chip 2A/5 GHz draft 802.11n WLAN solution for PCI-Express" XSPAN Atheros; 2010; AR9280-11-5-07; 2 pgs.
Atheros Communications; "AR9281 Single-chip 2.4 GHz 802.11n WLAN solution for PCI-Express" XSPAN Atheros; 2010; AR9280-6-16-10; 2 pgs.
Qualcomm; "AR9382 Single-chip, 2.4/5GHz, 2-stream 802.11a/b/g/n. solution with SST Technology" Qualcomm Atheros Inc.; AR9382-11-4-13; 2 pgs.
Atheros Communications; "AR9382 Single-chip, 2.4/5GHz, 2-stream 802.11a/b/g/n solution with SST Technology" Atheros Inc.; AR9382-11-16-10; 2 pgs.
Tianyang Bai and Robert W. Heath Jr. "Asympotic Coverage and Rate in Massive MIMO Networks" Wireless Networking and Communication Group; The University of Texas at Austin; Austin, TX; GlobalSIP 2014: Massive MIMO Communications; 5 pgs.
Tianyang Bai and Robert W. Heath Jr.; "Asymptotic SINR for Millimeter Wave Massive MIMO Cellular Networks" Wireless Networking and Communication Group; The University of Texas at Austin; Austin, TX; 2015 IEEE 16th International Workshop on Signal Processing Advances in Wireless Communications (SPAWC); 5 pgs.
Dalin Ahu, Junil Choi and Robert W. Heath Jr.; "Auxiliary Beam Pair Design in MMWAVE Cellular Systems with Hybrid Precoding and Limited Feedback" Department of Electrical and Computer Engineering; The University of Texas at Austin; 978-1-499-9988-0/16; 2016 IEEE; ICASSP 2016; 5 pgs.
Vutha Va and Robert W. Heath Jr.; "Basic Relationship between Channel Coherence Time and Beamwidth in Vehicular Channels"; Wireless Networking and Communications Group, The University of Texas at Austin; 978-1-4799-8091-8-15; 2015 IEEE; 5 pgs.
Vutha Va et al.; "Beam Design for Beam Switching Based Milimeter Wave Vehicle-to-Infrastructure Communications" Wireless Networking and Communications Group; The University of Texas at Austin; Austin, TX; Toyota InfoTechnology Center, U.S.A., Inc.; Mountain View, CA; IEE ICC 2016—Wireless Communications Symposium; 6 pgs.
Vutha Va et al; "Beam Switching for Millimeter Wave Communication to Support High Speed Trains" Wireless Networking and Communications Group, The University of Texas at Austin; Austin, TX; Qualcomm Inc.; San Diego, CA; 978-1-4799-8091-8/15; 2015 IEEE; 5 pgs.
Jianhua Mo and Robert W. Heath Jr.; "Capacity Analysis of One-Bit Quantized MIMO Systems With Transmitter Channel State Information" IEEE Transactions on Signal Processing; vol. 63, No. 20; Oct. 15, 2015; 15 pgs.
Ahmed Alkhateeb et al.; "Channel Estimation and Hybrid Precoding for Millimeter Wave Cellular Systems" IEEE Journal of Selected Topics in Signal Processing; vol. 8, No. 5, Oct. 2014; 1932-4553; 2014 IEEE; 16 pgs.
Jianhua Mo et al.; "Channel Estimation in Millimeter Wave MIMO Systems with One-Bit Quantization" Department of ECE, The University of Texas at Austin; Austin, TX; Department of ECE, The Ohio State University; Columbus, OH; Department of Signal Theory and Communications, Universidade de Vigo; Vigo, Spain; 978-1-4799-8297-4/14; 2014 IEEE; Asilomar 2014; 5 pgs.
Alexander Pyattaev et al.; "Communication Challenges in High-Density Deployments of Wearable Wireless Devices" 1536-1284-15; 2015 IEEE; IEEE Wireless Communications; Feb. 2015; 7 pgs.
Ahmed Alkhateeb, Geert Leus and Robert W. Heath Jr.; "Compressed Sensing Based Multi-User Millimeter Wave Systems: How Many Measurements are Needed?" The University of Texas at Austin; Texas, USA; Delft University of Technology, the Netherlands; 978-1-4673-6997-8-15; 2015 IEEE; ICASSP 2015; 5 pgs.
Xingqin Lin and Jeffrey G. Andrews; "Connectivity of Millimeter Wave Networks With Multi-Hop Relaying" IEEE Wireless Communications Letter, vol. 4, No. 2, Apr. 2015; 4 pgs.
Tianyang Bai, Ahmed Alkhateeb and Robert W. Heath, Jr.; "Coverage and Capacity of Millimeter-Wave Cellular Networks" Millimeter-Wave Communications for 5G; 0163-6804-14; 2104 IEEE; IEEE Communications Magazine; Sep. 2014; 8 pgs.
Tianyang Bai and Robert W. Heath, Jr.; "Coverage and Rate Analysis for Millimeter-Wave Cellular Networks" IEE Transactions on Wireless Communications; vol. 14, No. 2; 1536-1276; 2014 IEEE; Feb. 2015; 15 pgs.
Amin Abdel Khalek, Robert W. Heath, Jr., et al.; "Cross-polarization RFf Precoding to Mitigate Mobile Misorientation and Polarization Leakage"; Wireless Networking and Communications Group, The University of Texas at Austin; Austin, Texas; Samsung Research America—Dallas; Samsung Electronics; Richardson, Texas; The 11th Annual IEEE CCNC-Wireless Communications Track; 978-1-4799-2355-7/14; 2014 IEEE; 6 pgs.
HANDLINK: Your HotSpot Service Partner; "PoE-2440 24-Port PoE L2 Managed Gigabit Ethernet Switch: Enterprise-Grade PoE Gigabit Switch with 4 Combo SFP slots to Expanding Your Network Flexibly & Offering Superior Performance and Capability"; Taiwan, R.O.C.; May 2016 EN V.100 ID; 2 pgs.
Kiran Venugopal, Matthew C. Valenti and Robert W. Heath Jr.; "Device-to-Device Millimeter Wave Communications: Interference, Coverage, Rate, and Finite Topologies"; IEEE Transactions on Wireless Communcations; vol. 15, No. 9; Sep. 2016; 1536-1276 2016 IEEE; 14 pgs.
Roi Mendez-Rial et al; "Dictionary-free Hybrid Precoders and Combiners for mmWave MIMO Systems"; Universidade de Vigo; Vigo, Spain; The University of Texas at Austin; Austin, Texas; 2015 IEEE 16th International Workshop on Signal Processing Advances in Wireless Communications (SPAWC); 978-1-4799-1931-4/15; 2015 IEEE; 5 pgs.
Mario Giovanni Luigi Frecassetti et al.; "E-Band and V-Band—Survey on status of worldwide regulation" First edition—Jun. 2015; ISBN No. 979-10-92620-06-1; ETSI; Cedex, France; 40 pgs.
Andrew Thornburg and Robert W. Heath, Jr.; "Ergodic Capacity in mmWave Ad Hoc Network with Imperfect Beam Alignment"; Wireless Communication and Networking Group, The University of Texas at Austin; Austin, Texas; 978-1-5090-0073-9/15; 2015 IEEE; Milcom 2015 Track 1—Waveforms and Signal Processing; 6 pgs.

(56) References Cited

OTHER PUBLICATIONS

Mark Cudak et al.; "Experimental mmWave 5G Cellular System"; Nokia Networks; Arlington Heights, Illinois; NTT DOCOMO, Inc., Kanagawa-ken, Japan; Globecom 2014 Workshop—Mobile Communications in Higher Frequency Bands; 978-1-4799-7470-2-14; 2014 IEEE; 5 pgs.

Negin Golrezael et al.; "Femtocaching and Device-to-Device Collaboration: A New Architecture for Wireless Video Distribution" Accepted from Open Call; 0163-6804/13; 2013 IEEE; IEEE Communications Magazine; Apr. 2013; 8 pgs.

Federico Boccardi et al.; "Five Disruptive Technology Directions for 5G" 5G Wireless Communication Systems: Prospects and Challenges; 0163-6804/14; IEEE Communications Magazine; Feb. 2014; 7 pgs.

Ahmed Alkhateeb and Robert W. Heath, Jr.; "Frequency Selective Hybrid Preceding for Limited Feedback Millimeter Wave Systems"; IEEE Transactions on Communications, vol. 64, No. 5, May 2016; 0090-6778; 2016 IEEE; 18 pgs.

Sungwoo and Robert W. Heath Jr.; "Frequency Selective Hybrid Preceding in Millimeter Wave OFDMA Systems"; Wireless Networking and Communications Group; Dept. of Electrical and Computer Engineering, The Jniversity of Texas at Austin; Austin, TX; 978-4799-5952-5/15; 2015 IEEE; 6 pgs.

Angel Lozano, Robert W. Heath, Jr. And Jeffrey G. Andrews; "Fundamental Limits of Cooperation" IEEE Transactions of Information Theory, vol. 59, No. 9, Sep. 2013; 0018-9448; 2013 IEEE; 14 pgs.

PCT: International Search Report and Written Opinion of PCT/US17/25934 (related application), Aug. 23, 2017, 15 pgs.

\* cited by examiner

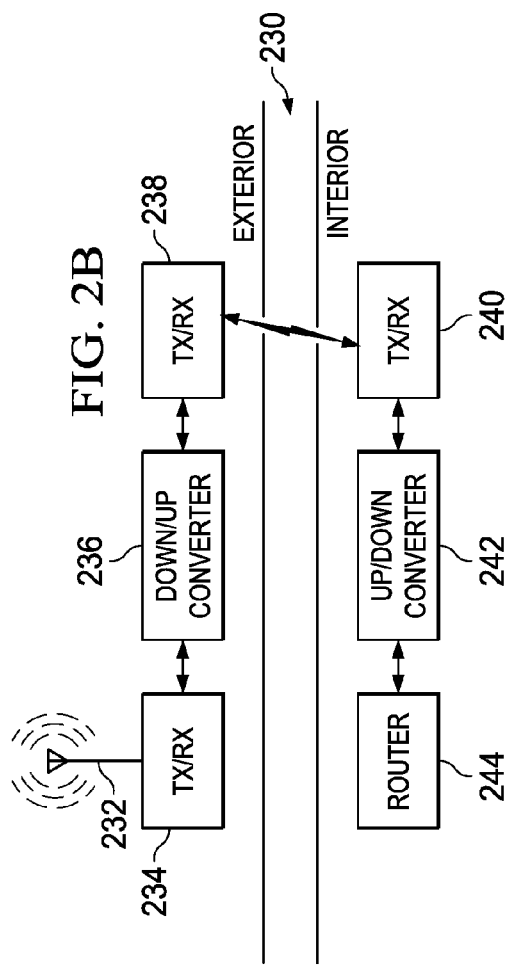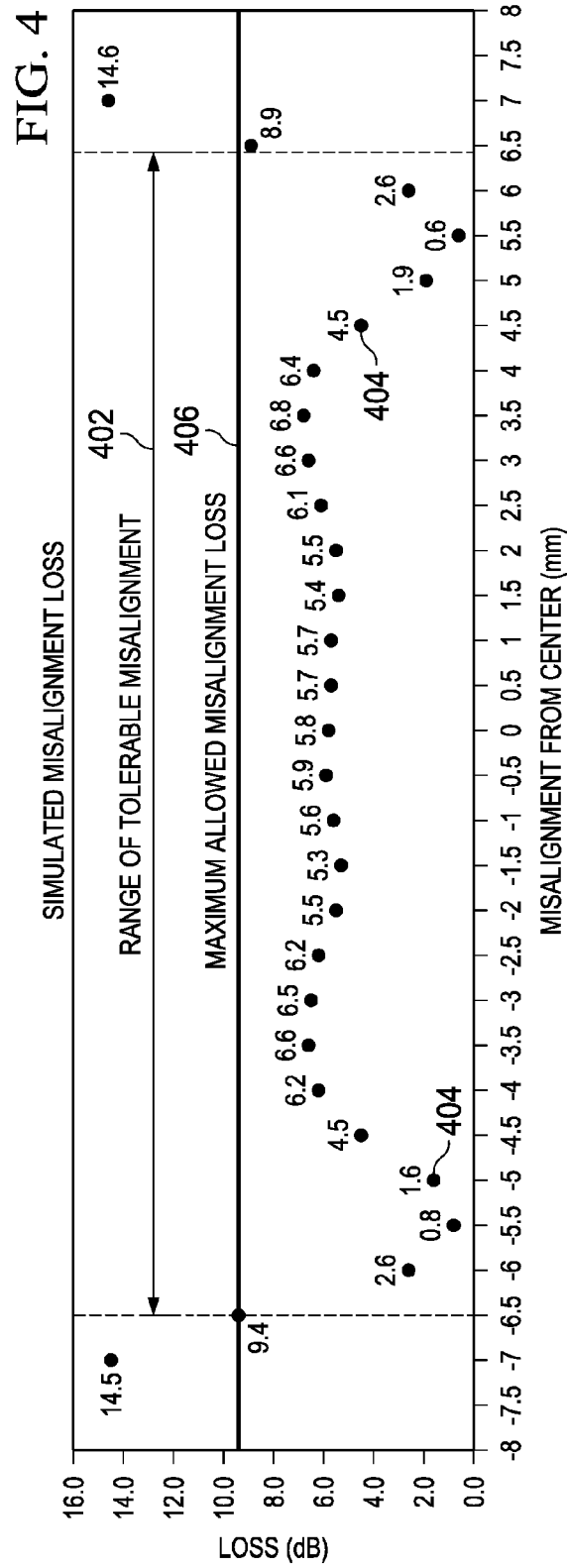

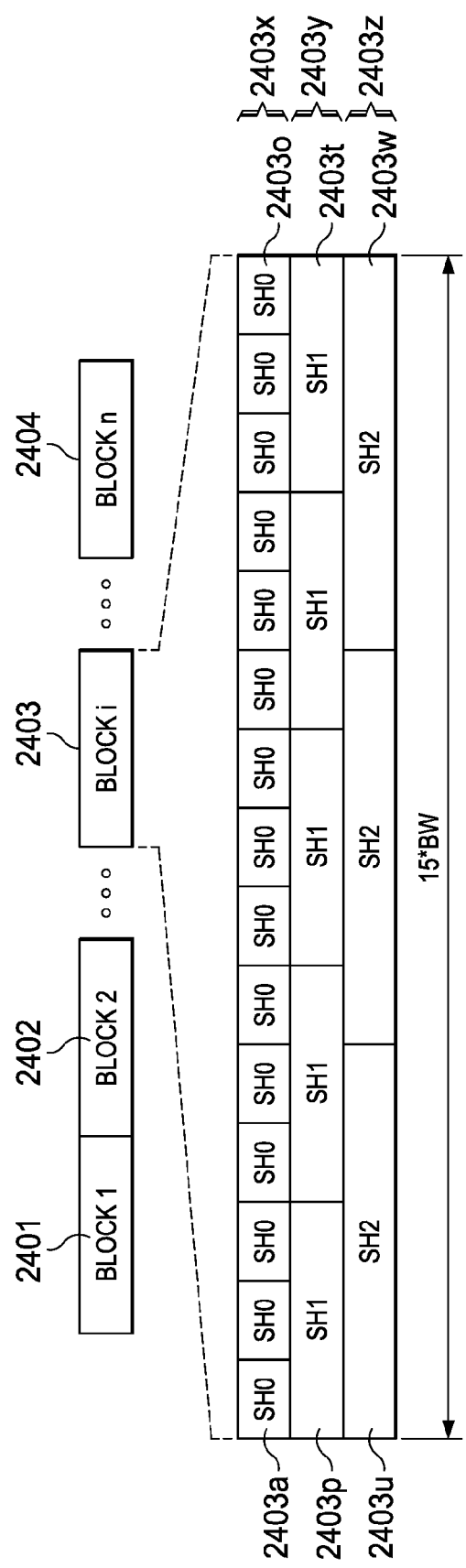
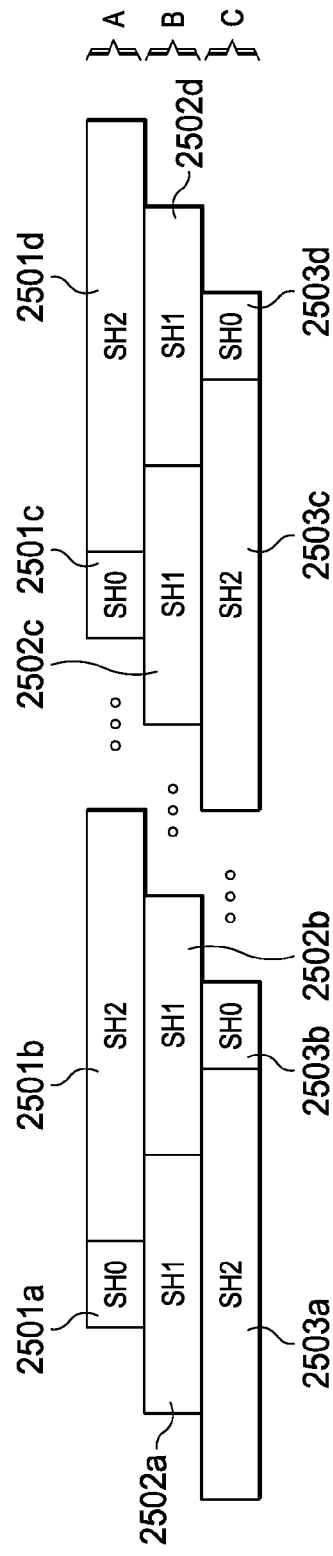
FIG. 24
FIG. 25

RE-GENERATION AND RE-TRANSMISSION OF MILLIMETER WAVES FOR BUILDING PENETRATION

CROSS-REFERENCE TO RELATED APPLICATIONS

This application claims benefit of U.S. Provisional Application No. 62/317,829, filed Apr. 4, 2016, entitled RE-GENERATION AND RE-TRANSMISSION OF MILLIMETER WAVES FOR BUILDING PENETRATION, and claims benefit of U.S. Provisional Application No. 62/321,245, filed Apr. 12, 2016, entitled RE-GENERATION AND RE-TRANSMISSION OF MILLIMETER WAVES FOR BUILDING PENETRATION, and claims benefit of U.S. Provisional Application No. 62/368,417, filed Jul. 29, 2016, entitled REGENERATION, RETRANSMISSION OF MILLIMETER WAVES FOR INDOOR PENETRATION, and claims benefit of U.S. Provisional Application No. 62/369,393, filed Aug. 1, 2016, entitled REGENERATION, RETRANSMISSION OF MILLIMETER WAVES FOR INDOOR PENETRATION, and U.S. Provisional Application No. 62/425,432, filed Nov. 22, 2016, entitled REGENERATION, RETRANSMISSION OF MILLIMETER WAVES FOR BUILDING PENETRATION USING HORN ANTENNAS. U.S. Application Nos. 62/317,829, 62/321,245, 62/368,417, 62/369,393 and 62/425,432 are incorporated by reference herein in their entirety.

This application is a continuation-in-part of U.S. application Ser. No. 15/357,808, filed on Nov. 21, 2016, entitled SYSTEM AND METHOD FOR COMMUNICATION USING ORBITAL ANGULAR MOMENTUM WITH MULTIPLE LAYER OVERLAY MODULATION, which is a continuation of U.S. patent application Ser. No. 15/144,297, filed on May 2, 2016, entitled SYSTEM AND METHOD FOR COMMUNICATION USING ORBITAL ANGULAR MOMENTUM WITH MULTIPLE LAYER OVERLAY MODULATION, now U.S. Pat. No. 9,503,258, issued on Nov. 22, 2016. U.S. application Ser. No. 15/144,297 is a continuation of U.S. application Ser. No. 14/323,082, filed on Jul. 3, 2014, entitled SYSTEM AND METHOD FOR COMMUNICATION USING ORBITAL ANGULAR MOMENTUM WITH MULTIPLE LAYER OVERLAY MODULATION, now U.S. Pat. No. 9,331,875, issued on May 3, 2016, which claims benefit of U.S. Provisional Application No. 61/975,142, filed Apr. 4, 2014, entitled SYSTEM AND METHOD FOR COMMUNICATION USING ORBITAL ANGULAR MOMENTUM WITH MODULATION. U.S. application Ser. Nos. 15/357,808, 15/144,297, 14/323,082, and 61/975,142, and U.S. Pat. Nos. 9,503,258 and 9,331,875 are incorporated by reference herein in their entirety.

TECHNICAL FIELD

The present invention relates to millimeter wave transmissions, and more particularly, to a manner for improving building penetration for millimeter wave transmissions.

BACKGROUND

Millimeter wave transmissions were developed as a bandwidth plan for making 1300 MHz of the local multipoint distribution service (LMDS) spectrum available within the United States. The millimeter wave transmissions meet the needs for increased bandwidth availability due to the increasing bandwidth and application requirements for wireless mobile devices. However, while increasing bandwidth capabilities, millimeter wave transmissions have the problem of having very poor building penetration capabilities. Signals are drastically degraded when attempting to penetrate most building structures. This provides a serious problem since the vast majority of wireless signaling traffic is originated from within buildings and the inability to utilize millimeter wave bandwidths would drastically limit its implementation in the modern marketplace. Thus, there is a need for some manner for improving building penetration characteristics of millimeter wave transmissions.

SUMMARY

The present invention, as disclosed and described herein, in one aspect thereof comprises a system for enabling signal penetration into a building includes first circuitry, located on an outside of the building, that receives millimeter wave signals and converting the millimeter wave signals into a format that penetrates into an interior of a building for reception by wireless devices within the building. Second circuitry, located on an inside of the building and communicatively linked with the first circuitry, receives the millimeter wave signals in the format that penetrates into an interior of the building and converts the millimeter wave signals in the format to a second format for transmission to the wireless devices within the building.

BRIEF DESCRIPTION OF THE DRAWINGS

For a more complete understanding, reference is now made to the following description taken in conjunction with the accompanying Drawings in which:

FIG. 2B illustrates a block diagram of an embodiment wherein received signals are down converted to a level that more easily transmits through a window or wall;

FIG. 4 illustrates the misalignment losses associated with the millimeter wave regeneration and retransmission circuitry;

FIG. 24 illustrates a spectral alignment of multiple level overlay signals for differing bandwidths of signals;

FIG. 25 illustrates an alternative spectral alignment of multiple level overlay signals;

DETAILED DESCRIPTION

Figure 1:
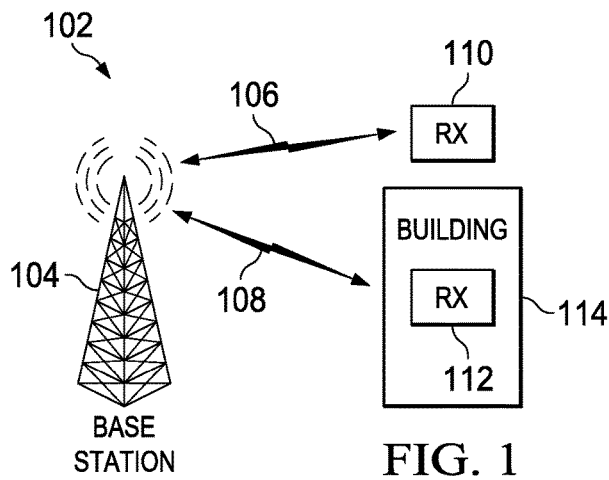
FIG. 1 illustrates millimeter wave transmissions between a base station and receivers located both inside and outside of a building structure.

Referring now to the drawings, wherein like reference numbers are used herein to designate like elements throughout, the various views and embodiments of regeneration and retransmission of millimeter waves for building penetration are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Millimeter wave signaling was developed when the FCC devised a band plan making 1300 MHz of local multipoint distribution service (LMDS) spectrum available within each basic trading area across the United States. The plan allocated two LMDS licenses per BTA (basic trading area), an "A Block" and a "B Block" in each. The A Block license comprised 1150 MHz of total bandwidth, and the B Block license consisted of 150 MHz of total bandwidth. A license holder Teligent developed a system for fixed wireless point to multipoint technology that could send high speed broadband from rooftops to surrounding small and medium-size businesses. However, the system, as well as others provided by Winstar and NextLink, did not succeed and many of the LMDS licenses fell back into the hands of the FCC. These licenses and related spectrum are seen as useful for 5G trials and services.

Referring now to the drawings, and more particularly to FIG. 1, there is illustrated the use of a millimeter wave transmission system 102 for communications. The base station 104 generates the millimeter wave transmissions 106, 108 for transmissions to various receivers 110, 112. Millimeter wave transmissions 106 that traveled directly from the base station 104 to a receiver 110 are able to be easily received without much ambient interference. Millimeter wave transmissions 108 from a base station 104 to a receiver 112 located inside of the building 114 will have significant interference issues. Millimeter wave transmissions 108 do not easily penetrate a building 104. When passing through transparent windows or building walls significant signal losses are experienced. The 28 GHz and above frequencies do not penetrate building walls and glass of the windows yet 85% of communications traffic is generated from within buildings.

In view of millimeter wave spectrum transmissions not propagating very far and lacking the ability to penetrate indoors, these frequencies will be used for very short range applications of about a mile. By way of perspective, at 2.4 GHz, a low-power Wi-Fi can cover most of a house that's under 3000 sq. ft., but a 5 GHz Wi-Fi signal would only cover approximately 60% of a two-story house because the signal does not travel as far at the higher frequency range. For 5G applications, the power is higher, but still higher frequencies have higher losses and propagation through space and other media.

The losses occurring as the millimeter wave signals penetrate a building drive data rates down to almost nothing. For example, when transmitting on a downlink from a base station to the inside of a home or building through clear glass, the maximum data rate is 9.93 Gb per second. When transmitting through tinted glass the data rate is 2.2 Mb per second. When transmitting through brick the data rate is 14 Mb per second, and when transmitting through concrete, the data rate drops all the way to 0.018 bps. Similarly, when transmitting on an uplink from the inside of the building towards a base station, the maximum data rate through clear glass is 1.57 Gb per second and through tinted glass is 0.37 Mb per second. The signal being transmitted on the uplink has a data rate of 5.5 Mb per second when transmitted through brick and 0.0075 bits per second when transmitted through concrete. Differences are also provided on the downlink and uplink when transmitting to/from older or newer buildings. Older buildings are defined as buildings using a composite model that comprises 30% standard glass and 70% concrete wall. Newer buildings are defined as composite models comprising 70% infrared reflective glass (IRR glass) and 30% concrete wall. Base station transmissions on the downlink to the inside of the building are 32 Mb per second for older buildings and 0.32 Mb per second for newer buildings. Similarly, the uplink transmissions from inside the home/building to the base station are 2.56 Mb per second for older buildings in 25.6 kb per second for newer buildings.

Despite the shortcomings, in order to meet the increased demands for bandwidth, RF service providers will increasingly move to carrier frequencies of higher frequency rates. In particular, 28 GHz is an emerging frequency band for providing local multipoint distribution service (LMDS). The 28 GHz and 39 GHz frequency bands are being contemplated by the FCC for small cell deployments to support 5G networks to subscriber premises using beam forming and beam steering. These higher frequency bandwidths have a number of advantages in addition to the disadvantages caused by the huge penetration losses when passing through building materials or windows. These advantages include a higher frequency rate, capability of more precise beamforming and more effective beam steering in the smaller footprint of the components providing the millimeter wave frequencies.

Figure 2A:
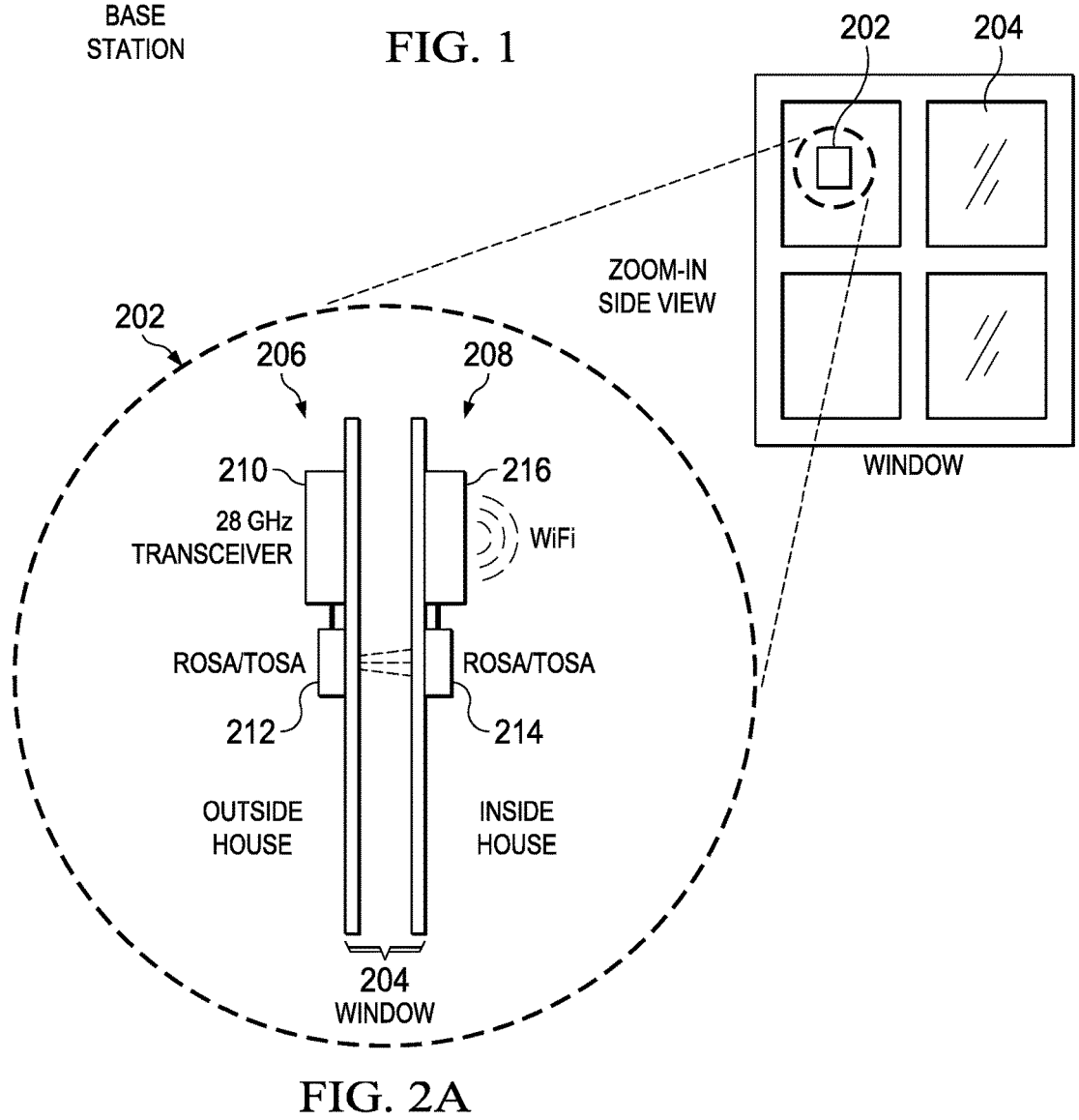
FIG. 2A illustrates a block diagram of an optical bridge for transmitting millimeter wave transmissions through a window.

FIG. 2A illustrates one manner for transmitting millimeter wave signals inside of a building using an optical bridge 202 mounted to a window 204. The optical bridge 202 includes a first portion 206 included on an outside of the window 204 and a second portion 208 included on the inside of the window 204. The first portion 206 includes a 28 GHz transceiver 210 that is mounted on the outside of the window 204. The 28 GHz transceiver 210 receives the millimeter wave transmissions that are being transmitted from, for example, a base station 104 such as that described with respect to FIG. 1. The received/transmitted signals are transmitted to and from the transceiver 210 using a receiver optical subassembly (ROSA)/transmission optical subassembly (TOSA) 212. A receiver optical subassembly is a component used for receiving optical signals in a fiber optic system. Similarly, a transceiver optical subassembly is a component used for transmitting optical signals in a fiber optic system. ROSA/TOSA component 212 transmits or receives the optical signals through the window 204 to a ROSA/TOSA component 214 located on the inside of the window 204. The signals are forwarded from the ROSA/TOSA 214 to a Wi-Fi transmitter 216 for transmissions within the building.

FIG. 2B illustrates a further embodiment wherein a received frequency that does not easily penetrate a tinted window or wall 230 down converts a received signal in order to facilitate transmission between the window or wall 230. On the exterior of the building, a signal is received at an antenna 232 of a transceiver 234 at a frequency that does not easily penetrate a window or wall. The transceiver 234 forwards the signals to a down/up converter 236 for down converting the signals to a frequency band that will more easily penetrate the window/wall 230. Another transceiver 238 takes the frequency down converted signal from the converter 236 and transmits it through the wall or window 230. The transmitted signal is received by a transceiver 240 located on the interior of the building at the down converted frequency. The received signal is passed to an up/down converter 242 to convert the signal to a level for transmission in the interior of the building. In many cases this may be the Wi-Fi band. The up converted signal is forwarded to a router 244 for transmission within the building. Outgoing signal received from devices located within the building are processed and transmitted in a reverse manner to transmit the signal outside of the building from transceiver 234.

Figure 3:
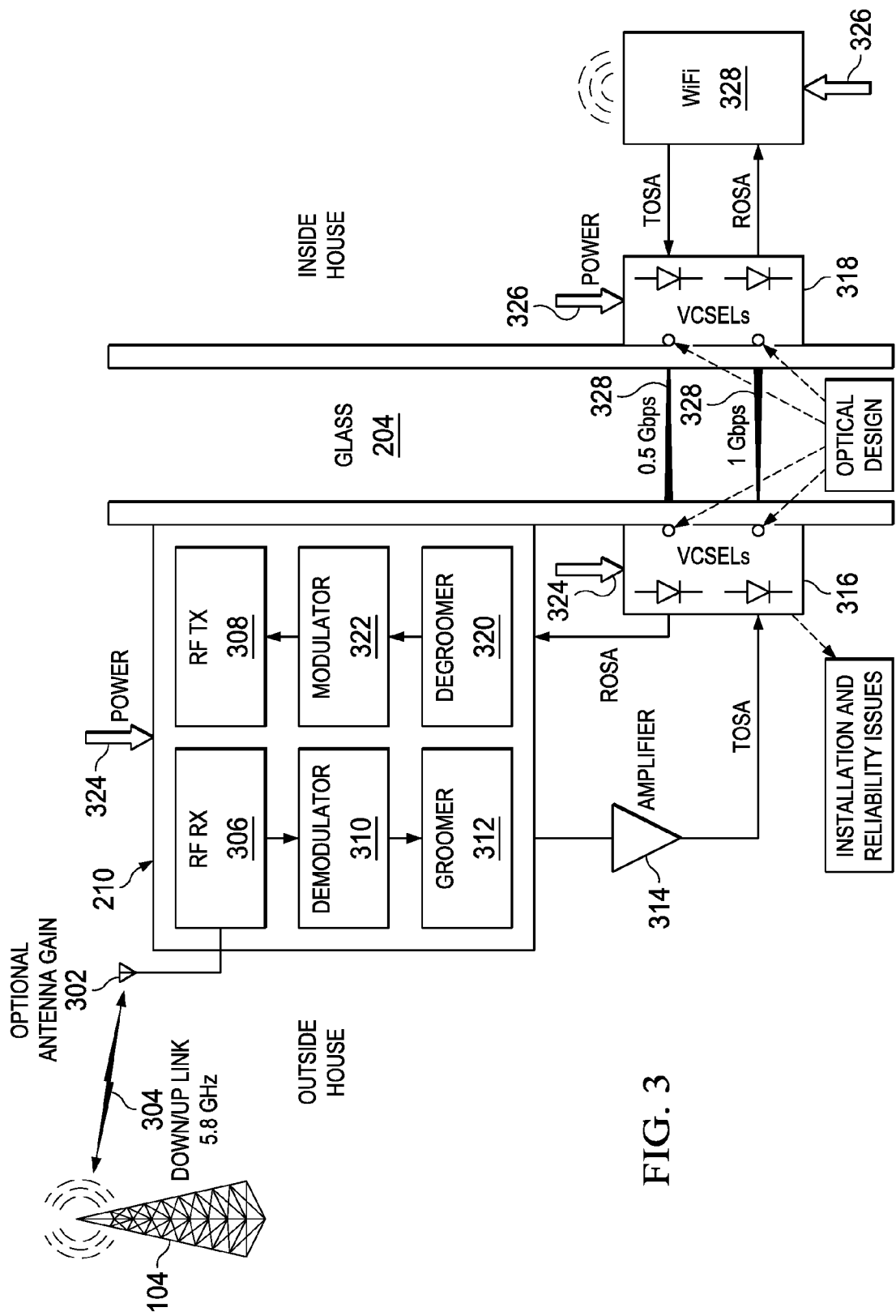
FIG. 3 is a more detailed block diagram of the millimeter wave regeneration and retransmission circuitry.

Referring now to FIG. 3, there is illustrated a more detailed illustration of the components for transmitting millimeter wave transmissions through a window or wall of a building. The transceiver 210 includes an optional antenna gain element 302 for receiving the millimeter wave transmissions transmitted on a down/up link 304 from a base station 104. The down/uplink 304 comprises a 28 GHz beam transmission. However other frequency transmissions may also be utilized. An RF receiver 306 is used for receiving information from the base station 104 over the down/up link 304. Similarly, the RF transmitter 308 is used for transmitting information on the down/up link 304 to a base station 104. Receive signals are provided to a demodulator 310 for demodulation of any received signals. The demodulated signals are provided to a groomer 312 which places the signals in the appropriate configuration for transmission by the optical transmission components. When translating different modulations (say from a high order QAM to OOK (On-Off Keying)), there are signaling conversions that require some grooming (or signal conditioning) to ensure all bits translate properly and still provide a low BER. The present system translates from RF at a high QAM rate to raw bit rates of OOK to enable transmissions using the VCSELs to go through the glass of the window. VCSELs only work with OOK and therefore a translation using the groomer 312 is needed. If a received signal were just down-convert from 28 GHz directly to 5.8 GHz (because 5.8 GHz does pass through the wall and glass), then we do not need to worry about complications of translating to low order modulation. The problem is that down-converting signal from 28 GHz to 5.8 GHz requires expensive components. The groomer 312 completes the translation of the received 28 GHz signal to a frequency for transmission through a glass or wall without the more expensive components.

The signals to be transmitted are passed through an amplifier 314 to amplify the signal for transmission. The amplified signal is provided to VCSELs 316 for optically transmitting the signal. The VCSEL 316 is a vertical cavity surface emitting laser that is a type of semiconductor laser diode with laser beam omissions perpendicular from the top surface. In a preferred embodiment, the VCSEL 316 comprises a Finisar VCSEL having a wavelength of approximately 780 nm, a modulation rate of 4 Gb per second and an optical output power of 2.2 mW (3.4 to dBm). In alternative embodiments the components for transmitting the optical signals across the window 204 may comprise an LED (light emitting diode) or EEL (edge emitting lasers). The different lasers enable different optical re-transmissions at different frequencies based on different characteristics of a window such as tint.

The VCSEL 316 includes a transmission optical subassembly (TOSA) for generating the optical signals for transmission from VCSEL 316 to VCSEL 318 located on the opposite side of the window 204. The VCSELs 316 and 318 comprise a laser source for generating the optical signals for transmission across the window 204. In one embodiment, the VCSEL comprises a Finisar VCSEL that provides a 780 nm optical signal having a maximum modulation rate of 4 Gb per second when running at 1 Gb per second and an optical output power of 3 mW (5 dBm). The TOSA includes a laser device or LED device for converting electrical signals from the amplifier 314 into light signal transmissions. Transmissions from the outside VCSEL 316 to the inside VCSEL 318 and an associated receiver optical subassembly (ROSA).

The optical signals are transmitted through the window 204 using optical focusing circuitry 317. The optical focusing circuitry 317 will be more fully described on the transmitter and receiver sides with respect to FIG. 6. The optical link 328 between VCSEL 316 and VCSEL 318 has an optical link budget associated therewith that defines the losses that may be accepted while still transmitting the information between the VCSELs 316, 318. The VCSEL has an output power of approximately 5 dBm. The detector at the receiver within the VCSEL can detect a signal at approximately −12 dBm. The glass losses associated with the optical signal passing through the glass at a wavelength of 780 nm is 7.21 dB. The coupling loss and lens gain associated with the transmission is approximately 0.1 dB. The maximum displacement loss caused by a lens displacement of 3.5 mm is 6.8 dB. Thus, the total link margin equals 2.88 dB based upon a subtraction of the detector sensitivity, glass losses, coupling loss and lens gain and maximum displacement loss from the VCSEL output power. The 2.88 dB link margin is provided for unexpected an extra losses such as len's losses and unexpected output variances.

Lens displacement or misalignment can account for a significant portion of the link loss within the system. As illustrated in FIG. 4, the range of tolerable misalignment 402 ranges from approximately −6.5 mm to +6.5 mm from the center of the power spectrum received by the detector. The alignment losses 404 range in an area from 0.6 dB to 6.8 dB as the misalignment moves between ±6.5 mm. The maximum allowed misalignment loss is 9.4 dB as illustrated at 406.

The VCSEL 318 on the inside of the window 204 uses a TOSA to transmit an optical signal at a data rate of 0.5 Gbps through the window 204 to a ROSA within the VCSEL 316 located on the outside of the window. The received optical signal is provided to a de-groomer component 32 for processing the signals from raw bit rates of OOK to RF at high QAM rate to enable RF transmissions after receipt of the signals by the VCSELs. The de-groomed signal is modulated within a modulator 322. The modulated signal is transmitted over the uplink 304 using an RF transmitter 308. The transceiver 210 is powered by a power input 324 the components inside the window are similarly powered by a power input 326. Signals are provided within the building using a Wi-Fi transmitter 328 that is connected to receive optical signals received by the VCSEL 318 and provide signals to the VCSEL 318 for transmission through the window 204. The Wi-Fi transmitter uses the 802.11 transmission protocol.

Figure 5:
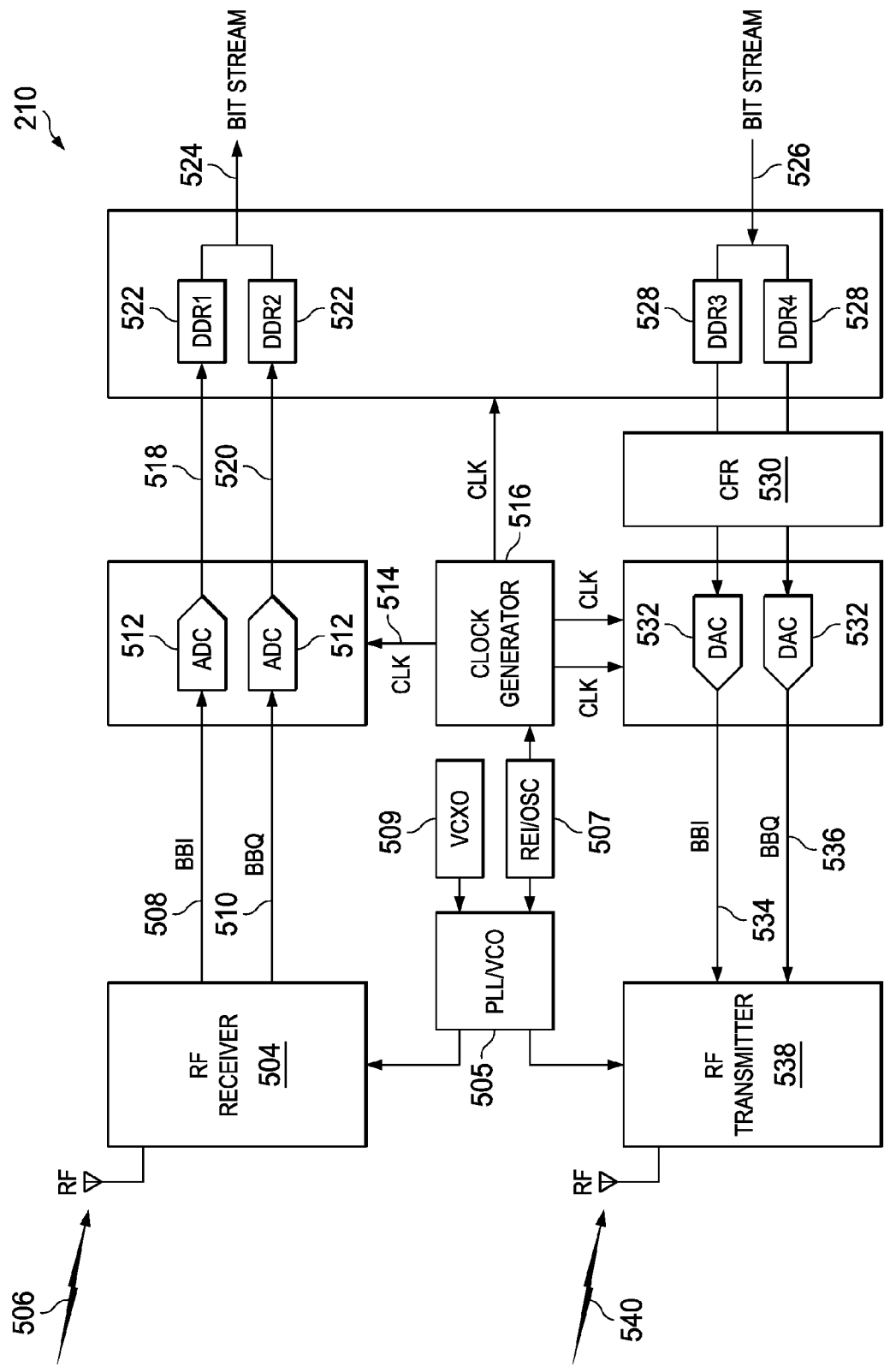
FIG. 5 illustrates the RF transceiver circuitry of the millimeter wave regeneration and retransmission circuitry.

Referring now to FIG. 5 there is illustrated a more detailed block diagram of the transceiver 210. The receiver portion 502 includes an RF receiver 504 for receiving the RF signals transmitted from the base station on the downlink 506. The receiver 504 generates output signals having a real portion BBI 508 and an imaginary portion BBQ 510. The RF receiver 504 generates the real signal 508 and imaginary signal 510 responsive to the receive signal and inputs from a phase locked loop/voltage control oscillator 505. The phase locked loop/voltage control oscillator 505 provides inputs to the RF receiver 504 responsive to a reference oscillator signal provided from reference oscillator 507 and a voltage controlled oscillator signal provided from oscillator 509. The real signal 508 and the imaginary signal 510 are provided to analog-to-digital converters 512 for conversion to a digital signal. The analog-to-digital converters 512 are clocked by an associated clock input 514 provided from clock generation circuit 516. The clock generation circuit 516 also receives an input from the reference oscillator 507. The real and imaginary digital signals 518 and 520 are input to a digital down converter 522. The digital signals are down converted to a lower frequency and output as a bit stream 524 to the optical transmission circuitry (VCSEL) for transmitting across the window glass.

The transmitter portion 524 receives a digital bitstream 526 from the optical circuitry and provides this bitstream to the real and imaginary portions of digital up converters 528 to convert the digital data to a higher frequency for transmission. The real and imaginary portions of the up-converted digital signal are provided to a crest factor reduction processor 530. Some signals (especially OFDM-based systems) have high peak-to-average power ratio (PAR) that negatively impacts the efficiency of power amplifiers (PAs). Crest factor reduction (CFR) schemes implemented by the processor help reduce PAR and have been used for many networks (CDMA & OFDM). However, CFR schemes developed primarily for CDMA signals have a poor performance when used in OFDM (given the tight error vector magnitude (EVM) requirements). With a well-designed CFR algorithm on FPGAs, one can achieve low-latency, high-performance that can significantly reduce the PAR of the output signal which improves PA efficiency and reduced cost.

The real and imaginary signals are provided from the crest factor reduction processor 530 to a digital to analog converter 532. The digital to analog converter 532 converts the real and imaginary digital signals into real and imaginary analog signals BBI 534 and BBQ 536. The real and imaginary analog signals are inputs to the RF transmitter 538. The RF transmitter 538 processes the real signal 534 and imaginary signal 536 responsive to input from the phase locked loop/voltage control oscillator 504 to generate RF signals for transmission on the uplink 540 to generate the millimeter wave and transmissions.

Figure 6:
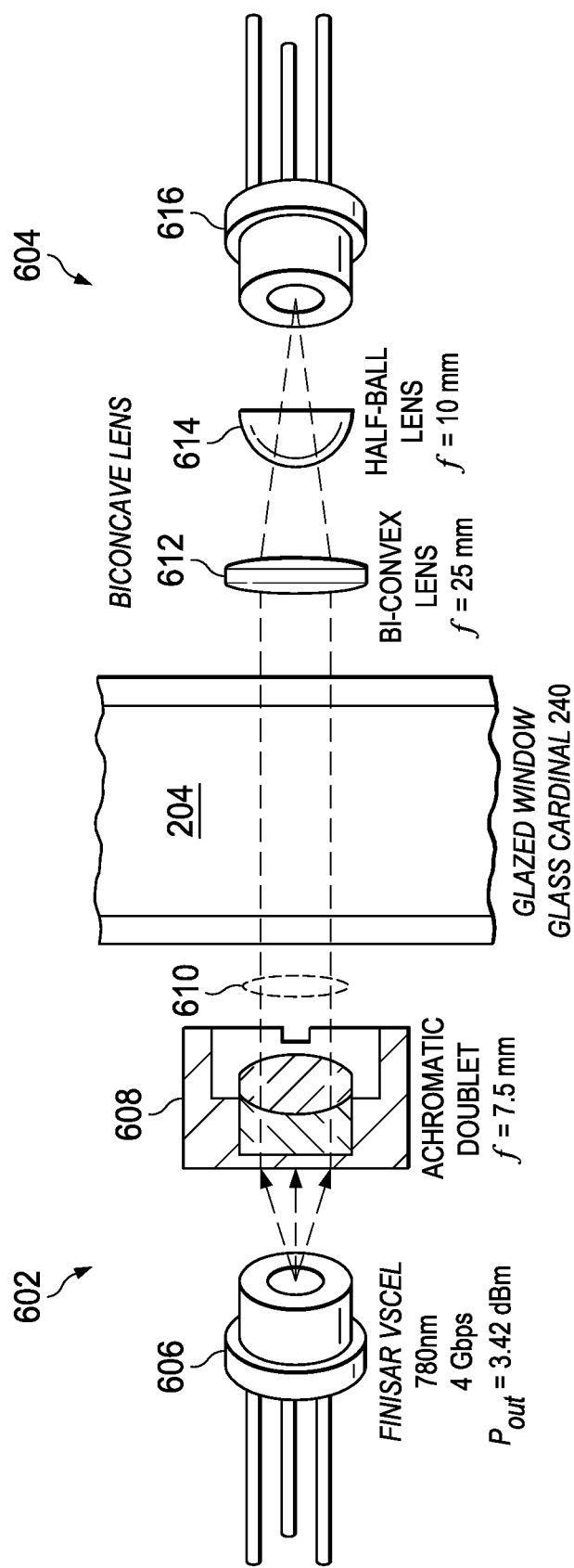
FIG. 6 illustrates the optical focusing circuitry of the millimeter wave regeneration and retransmission circuitry.

Referring now to FIG. 6, there is illustrated the optical focusing circuitry 317 associated with the optical transmission interface across the window 204. The optical focusing circuitry 317 is included with the VCSEL located on each side of the window 204 and includes a transmission portion 602 and a receiver portion 604. The transmission portion 602 and receiver portion 604 would be included on each side of the window 204 as the system provides bidirectional communications across the window. The transmission portion 602 includes in one embodiment a VCSEL 606 provided by Finisar that transmits a 780 nm optical signal at 4 Gb per second and has a power output of 3.42 dBm. The optical signal generated by the VCSEL 606 is provided to an acromatic doublet 608 having a focal length of 7.5 mm that collimates the optical signal generated by the VCSEL 606 into a small aperture. A collimated beam 610 is transmitted across the window 204. The collimated beam exits the window 204 and on the receiver portion 604 first passes through a bi-convex lens 612 having a focal length of 25 mm. The bi-convex lens 612 focuses the beam column 610 onto a half ball lens 614 that focuses the optical signal onto a semiconductor aperture of a photo detector 616. In one embodiment, the detector 616 has an aperture diameter of 10 mm and a detector sensitivity of 12 dBm.

The transmissions between the VCSELs 606 and to and from the RF transceiver to 10 may in one particular embodiment utilize orthogonal function signal transmission techniques such as those described in U.S. application Ser. No. 15/357,808, entitled SYSTEM AND METHOD FOR COMMUNICATION USING ORBITAL ANGULAR MOMENTUM WITH MULTIPLE LAYER OVERLAY MODULATION, filed on Nov. 21, 2016, which is incorporated herein by reference in its entirety. However, it should be realized that a variety of other data transmission techniques may also be used.

Figure 7:
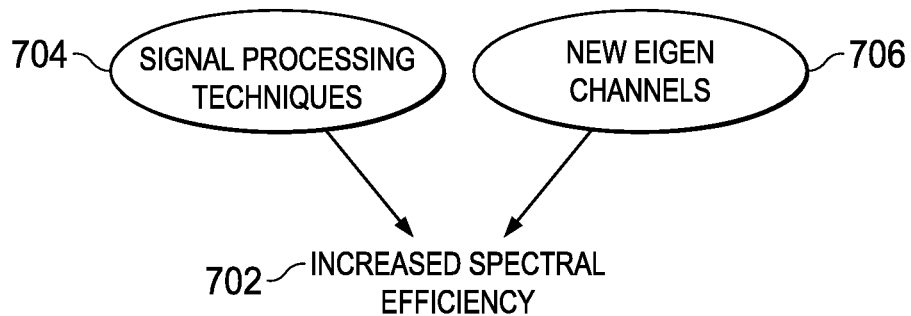
FIG. 7 illustrates various techniques for increasing spectral efficiency within a transmitted signal.

FIG. 7 illustrates two manners for increasing spectral efficiency of a communications system. In general, there are basically two ways to increase spectral efficiency 702 of a communications system. The increase may be brought about by signal processing techniques 704 in the modulation scheme or using multiple access technique. Additionally, the spectral efficiency can be increase by creating new Eigen channels 706 within the electromagnetic propagation. These two techniques are completely independent of one another and innovations from one class can be added to innovations from the second class. Therefore, the combination of this technique introduced a further innovation.

Spectral efficiency 702 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 706, the innovations include diversity techniques including space and polarization diversity as well as multiple input/multiple output (MIMO) where uncorrelated radio paths create independent Eigen channels and propagation of electromagnetic waves.

Figure 8:
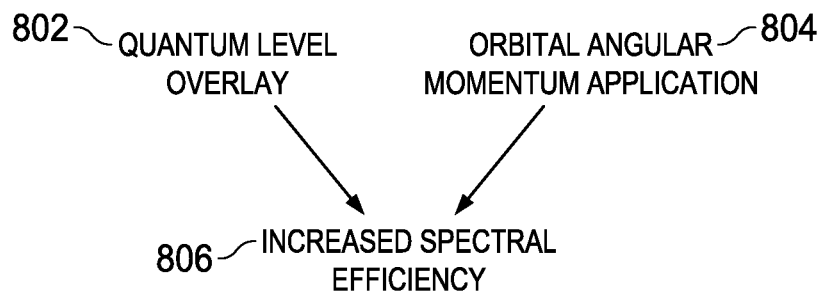
FIG. 8 illustrates a particular technique for increasing spectral efficiency within a transmitted signal.

Referring now to FIG. 8, the communication system configuration introduces two techniques, one from the signal processing techniques 704 category and one from the creation of new eigen channels 706 category that are entirely independent from each other. Their combination provides a unique manner to disrupt the access part of an end to end communications system from twisted pair and cable to fiber optics, to free space optics, to RF used in cellular, backhaul and satellite. The first technique involves the use of a new signal processing technique using new orthogonal signals to upgrade QAM modulation using non sinusoidal functions. This particular embodiment is referred to as quantum level overlay (QLO) 802. The second embodiment involves the application of new electromagnetic wavefronts using a property of electromagnetic waves or photon, called orbital angular momentum (QAM) 704. Application of each of the quantum level overlay techniques 802 and orbital angular momentum application 804 uniquely offers orders of magnitude higher spectral efficiency 806 within communication systems in their combination.

With respect to the quantum level overlay technique 802, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 804, this embodiment introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 802 and orbital angular momentum application 804, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular/backhaul and satellites.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 802 has an advantage that the independent channels are created within the symbols without needing new antennas. This will have a tremendous cost and time benefit compared to other techniques. Also, the quantum layer overlay technique 802 is a physical layer technique, which means there are other techniques at higher layers of the protocol that can all ride on top of the QLO techniques 802 and thus increase the spectral efficiency even further. QLO technique 802 uses standard QAM modulation used in OFDM based multiple access technologies such as WIMAX or LTE. QLO technique 802 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 9:
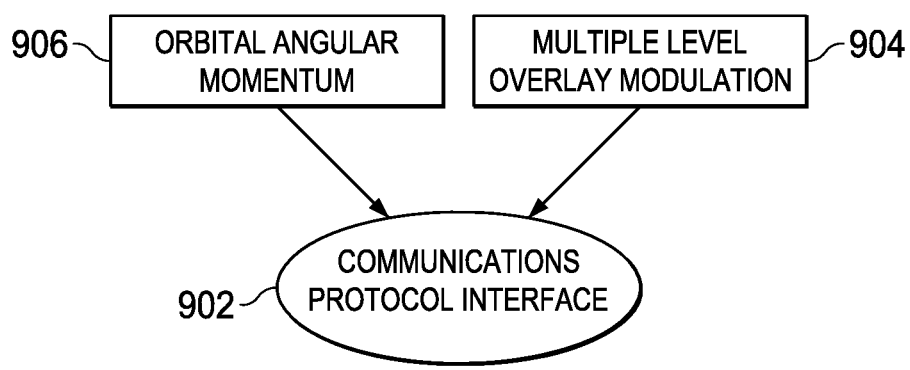
FIG. 9 illustrates a general overview of the manner for providing communication bandwidth between various communication protocol interfaces.

Referring now more particularly to FIG. 9, there is illustrated a general overview of the manner for providing improved communication bandwidth within various communication protocol interfaces 902, using a combination of multiple level overlay modulation 904 and the application of orbital angular momentum 906 to increase the number of communications channels.

The various communication protocol interfaces 902 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 904 with orbital angular momentum (OAM) technique 906, a higher throughput over various types of communication links 902 may be achieved. The use of multiple level overlay modulation alone without OAM increases the spectral efficiency of communication links 902, whether wired, optical, or wireless. However, with OAM, the increase in spectral efficiency is even more significant.

Multiple overlay modulation techniques 904 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 904. Within the multiple level overlay modulation technique 904, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 906 provides a twist to wave fronts of the electromagnetic fields carrying the data stream that may enable the transmission of multiple data streams on the same frequency, wavelength, or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 10:
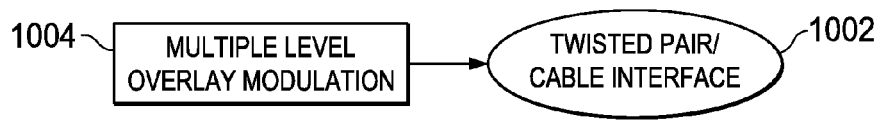
FIG. 10 illustrates the manner for utilizing multiple level overlay modulation with twisted pair/cable interfaces.

Referring now to FIG. 10, there is illustrated a further communication implementation technique using the above described techniques as twisted pairs or cables carry electrons (not photons). Rather than using each of the multiple level overlay modulation 904 and orbital angular momentum techniques 906, only the multiple level overlay modulation 904 can be used in conjunction with a single wireline interface and, more particularly, a twisted pair communication link or a cable communication link 1002. The operation of the multiple level overlay modulation 1004, is similar to that discussed previously with respect to FIG. 9, but is used by itself without the use of orbital angular momentum techniques 906, and is used with either a twisted pair communication link or cable interface communication link 1002.

Figure 11:
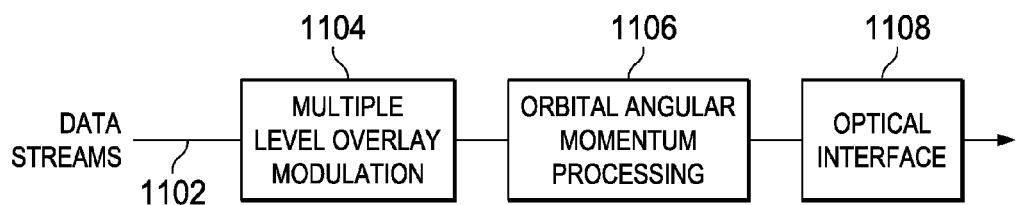
FIG. 11 illustrates a general block diagram for processing a plurality of data streams within an optical communication system.

Referring now to FIG. 11, there is illustrated a general block diagram for processing a plurality of data streams 1102 for transmission in an optical communication system. The multiple data streams 1102 are provided to the multi-layer overlay modulation circuitry 1104 wherein the signals are modulated using the multi-layer overlay modulation technique. The modulated signals are provided to orbital angular momentum processing circuitry 1106 which applies a twist to each of the wave fronts being transmitted on the wavelengths of the optical communication channel. The twisted waves are transmitted through the optical interface 1108 over an optical communications link such as an optical fiber or free space optics communication system. FIG. 11 may also illustrate an RF mechanism wherein the interface 1108 would comprise and RF interface rather than an optical interface.

Figure 12:
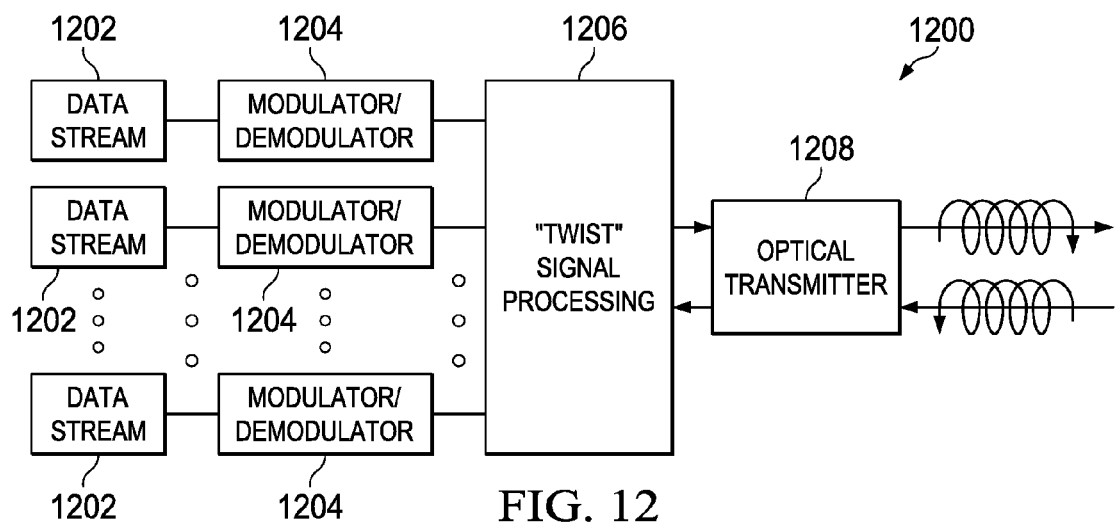
FIG. 12 is a functional block diagram of a system for generating orbital angular momentum within a communication system.

Referring now more particularly to FIG. 12, there is illustrated a functional block diagram of a system for generating the orbital angular momentum "twist" within a communication system, such as that illustrated with respect to FIG. 9, to provide a data stream that may be combined with multiple other data streams for transmission upon a same wavelength or frequency. Multiple data streams 1202 are provided to the transmission processing circuitry 1200. Each of the data streams 1202 comprises, for example, an end to end link connection carrying a voice call or a packet connection transmitting non-circuit switch packed data over a data connection. The multiple data streams 1202 are processed by modulator/demodulator circuitry 1204. The modulator/demodulator circuitry 1204 modulates the received data stream 1202 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1206. Each of the modulated data streams from the modulator/demodulator 1204 are provided a different orbital angular momentum by the orbital angular momentum electromagnetic block 1206 such that each of the modulated data streams have a unique and different orbital angular momentum associated therewith. Each of the modulated signals having an associated orbital angular momentum are provided to an optical transmitter 1208 that transmits each of the modulated data streams having a unique orbital angular momentum on a same wavelength. Each wavelength has a selected number of bandwidth slots B and may have its data transmission capability increase by a factor of the number of degrees of orbital angular momentum l that are provided from the OAM electromagnetic block 1206. The optical transmitter 1208 transmitting signals at a single wavelength could transmit B groups of information. The optical transmitter 1208 and OAM electromagnetic block 1206 may transmit l×B groups of information according to the configuration described herein.

In a receiving mode, the optical transmitter 1208 will have a wavelength including multiple signals transmitted therein having different orbital angular momentum signals embedded therein. The optical transmitter 1208 forwards these signals to the OAM signal processing block 1206, which separates each of the signals having different orbital angular momentum and provides the separated signals to the demodulator circuitry 1204. The demodulation process extracts the data streams 1202 from the modulated signals and provides it at the receiving end using the multiple layer overlay demodulation technique.

Figure 13:
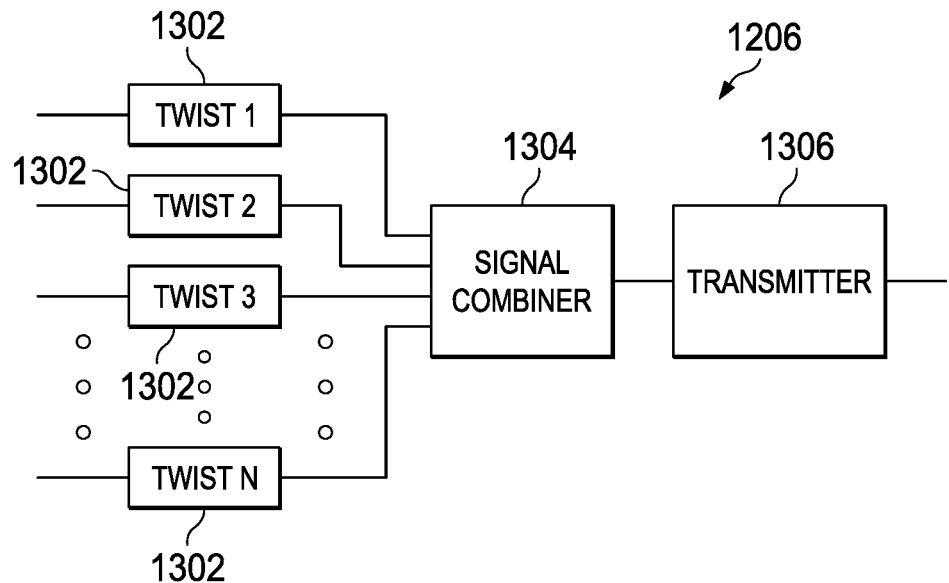
FIG. 13 is a functional block diagram of the orbital angular momentum signal processing block of FIG. 6.

Referring now to FIG. 13, there is provided a more detailed functional description of the OAM signal processing block 1206. Each of the input data streams are provided to OAM circuitry 1302. Each of the OAM circuitry 1302 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1302 are unique to the data stream that is provided thereto. An infinite number of orbital angular momentums may be applied to different input data streams using many different currents. Each of the separately generated data streams are provided to a signal combiner 1304, which combines the signals onto a wavelength for transmission from the transmitter 1306.

Figure 14:
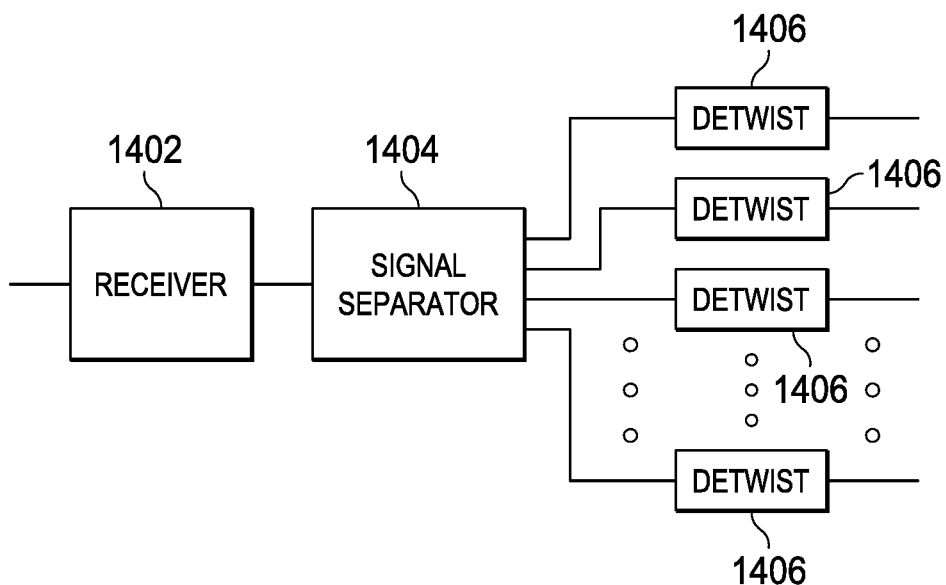
FIG. 14 is a functional block diagram illustrating the manner for removing orbital angular momentum from a received signal including a plurality of data streams.

Referring now to FIG. 14, there is illustrated the manner in which the OAM processing circuitry 1206 may separate a received signal into multiple data streams. The receiver 1402 receives the combined OAM signals on a single wavelength and provides this information to a signal separator 1404. The signal separator 1404 separates each of the signals having different orbital angular momentums from the received wavelength and provides the separated signals to OAM de-twisting circuitry 1406. The OAM de-twisting circuitry 1406 removes the associated OAM twist from each of the associated signals and provides the received modulated data stream for further processing. The signal separator 1404 separates each of the received signals that have had the orbital angular momentum removed therefrom into individual received signals. The individually received signals are provided to the receiver 1402 for demodulation using, for example, multiple level overlay demodulation as will be more fully described herein below.

Figure 15:
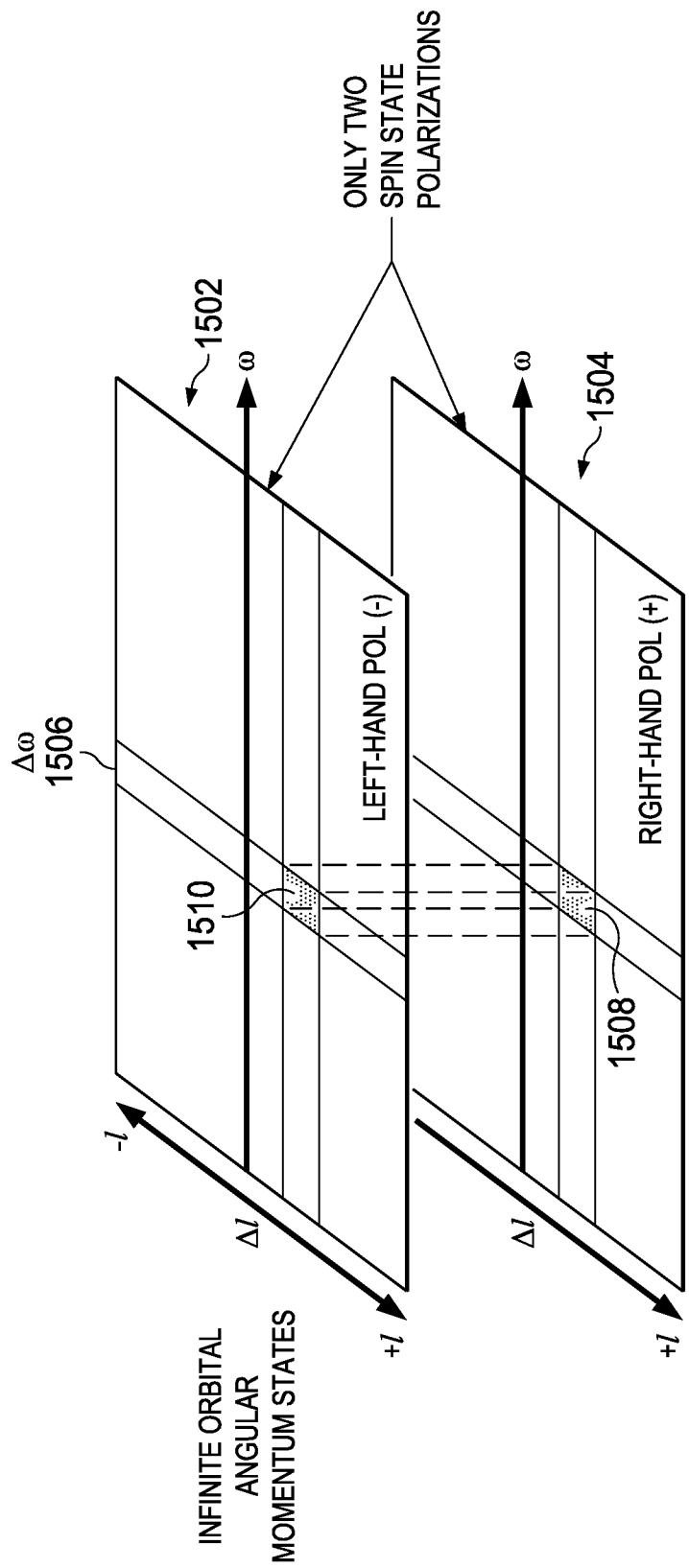
FIG. 15 illustrates a single wavelength having two quanti-spin polarizations providing an infinite number of signals having various orbital angular momentums associated therewith.

FIG. 15 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 1502 represents the potentially available signals for a left handed signal polarization, while the bottom grid 1504 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 1506 in both the left handed polarization plane 1502 and the right handed polarization plane 1504 can provide an infinite number of signals at different orbital angular momentum states Δl. Blocks 1508 and 1510 represent a particular signal having an orbital angular momentum Δl at a frequency Δω or wavelength in both the right handed polarization plane 1504 and left handed polarization plane 1510, respectively. By changing to a different orbital angular momentum within the same frequency Δω or wavelength 1506, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 15, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \cdot E = -\frac{\partial B}{\partial t}$$

$$\nabla \cdot B = 0$$

$$\nabla \cdot B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electronic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2) \quad \text{Hamiltonian (total energy)}$$

$$\frac{dU^{mech}}{dt} + \frac{dU^{em}}{dt} + \oint_{s'} d^2 x' \hat{n}' \cdot S = 0 \quad \text{conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \quad \text{linear momentum}$$

$$\frac{dp^{mech}}{dt} + \frac{dp^{em}}{dt} + \oint_{s'} d^2 x' \hat{n}' \cdot T = 0 \quad \text{conservation of linear momentum}$$

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E|^2 + c^2 |B|^2)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0 \quad \text{conservation of angular momentum}$$

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i$$

For each singular Fourier mode in real valued representation:

$$J^{em} = -i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em} = L^{em} + S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \tfrac{1}{4}(E \times H^* + E^* \times H),$$

and U is the energy density $$U = \tfrac{1}{4}(\varepsilon |E|^2 + \mu_0 |H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right)$$

Figure 16A:
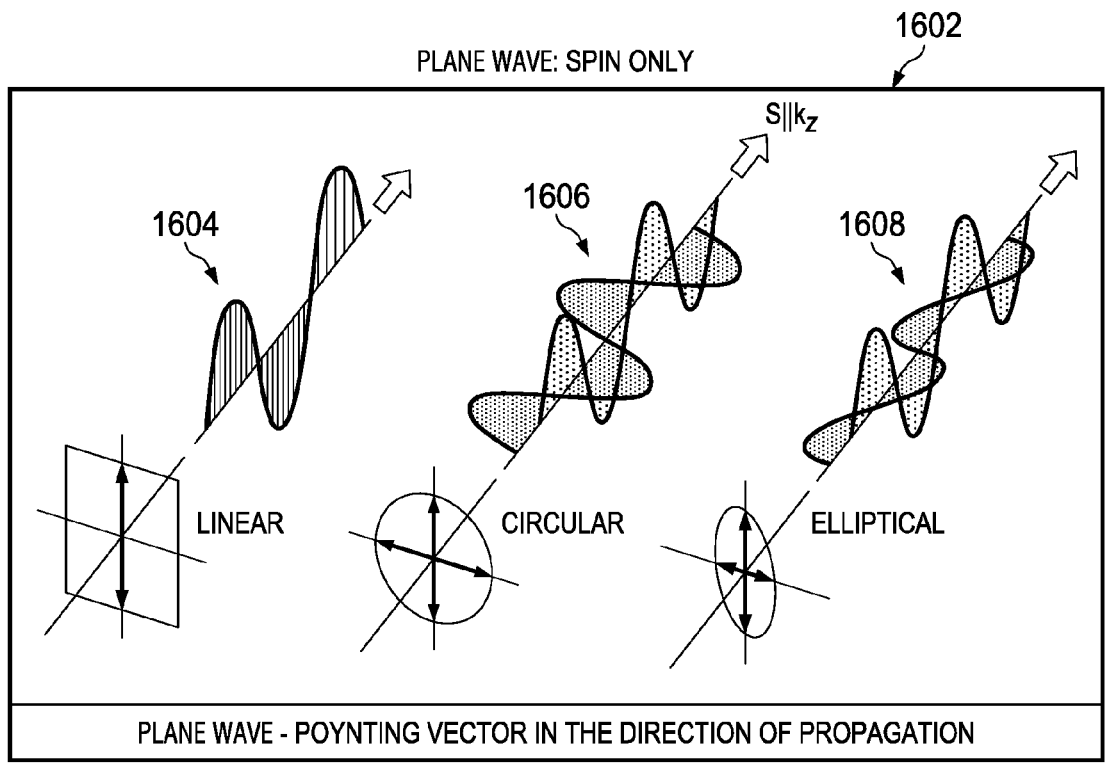
FIG. 16A illustrates a plane wave having only variations in the spin angular momentum.
Figure 16B:
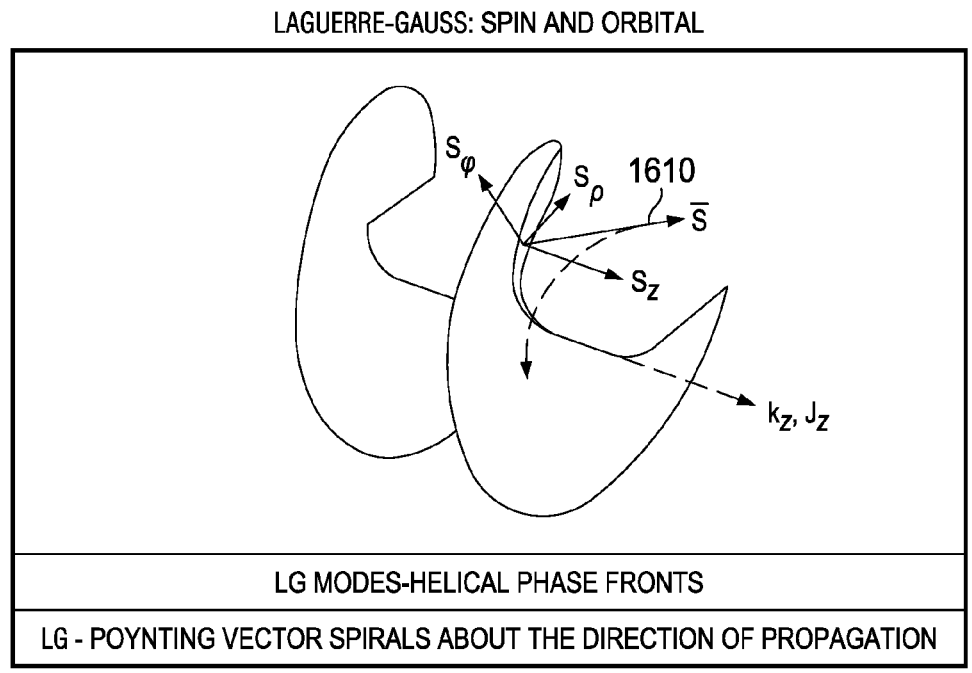
FIG. 16B illustrates a signal having both spin and orbital angular momentum applied thereto.

Referring now to FIGS. 16A and 16B, there is illustrated the manner in which a signal and its associated Poynting vector in a plane wave situation. In the plane wave situation illustrated generally at 1602, the transmitted signal may take one of three configurations. When the electric field vectors are in the same direction, a linear signal is provided, as illustrated generally at 1604. Within a circular polarization 1606, the electric field vectors rotate with the same magnitude. Within the elliptical polarization 1608, the electric field vectors rotate but have differing magnitudes. The Poynting vector remains in a constant direction for the signal configuration to FIG. 16A and always perpendicular to the electric and magnetic fields. Referring now to FIG. 16B, when a unique orbital angular momentum is applied to a signal as described here and above, the Poynting vector S 1610 will spiral about the direction of propagation of the signal. This spiral may be varied in order to enable signals to be transmitted on the same frequency as described herein.

Figure 17A:
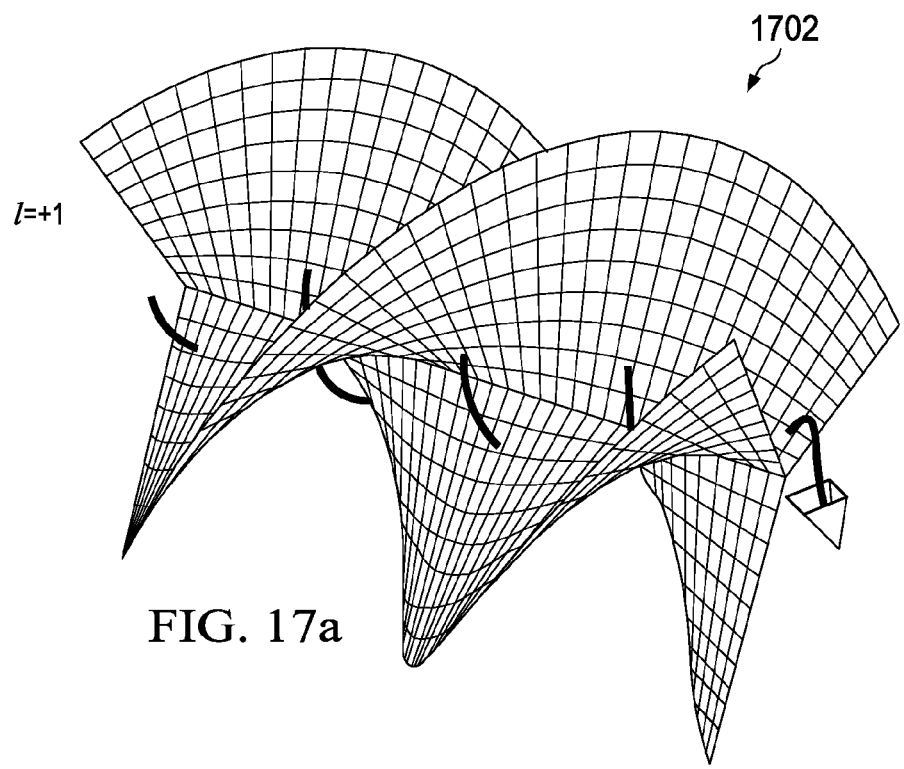
FIGS. 17A-17C illustrate various signals having different orbital angular momentum applied thereto.
Figure 17B:
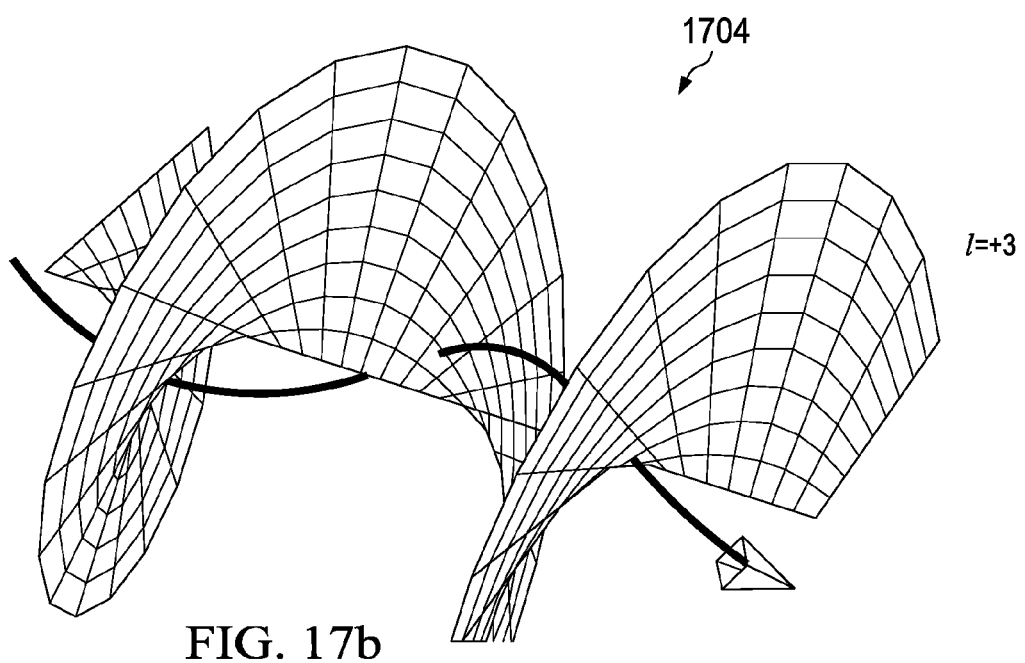
Figure 17C:
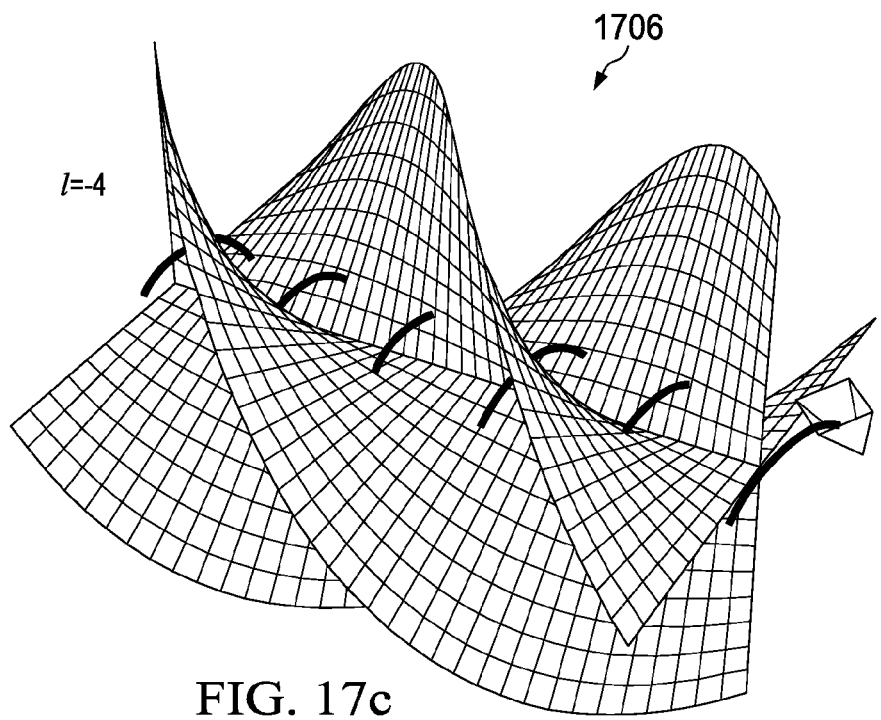

FIGS. 17A through 17C illustrate the differences in signals having different helicity (i.e., orbital angular momentums). Each of the spiraling Poynting vectors associated with the signals 1702, 1704, and 1706 provide a different shaped signal. Signal 1702 has an orbital angular momentum of +1, signal 1704 has an orbital angular momentum of +3, and signal 1706 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 17D:
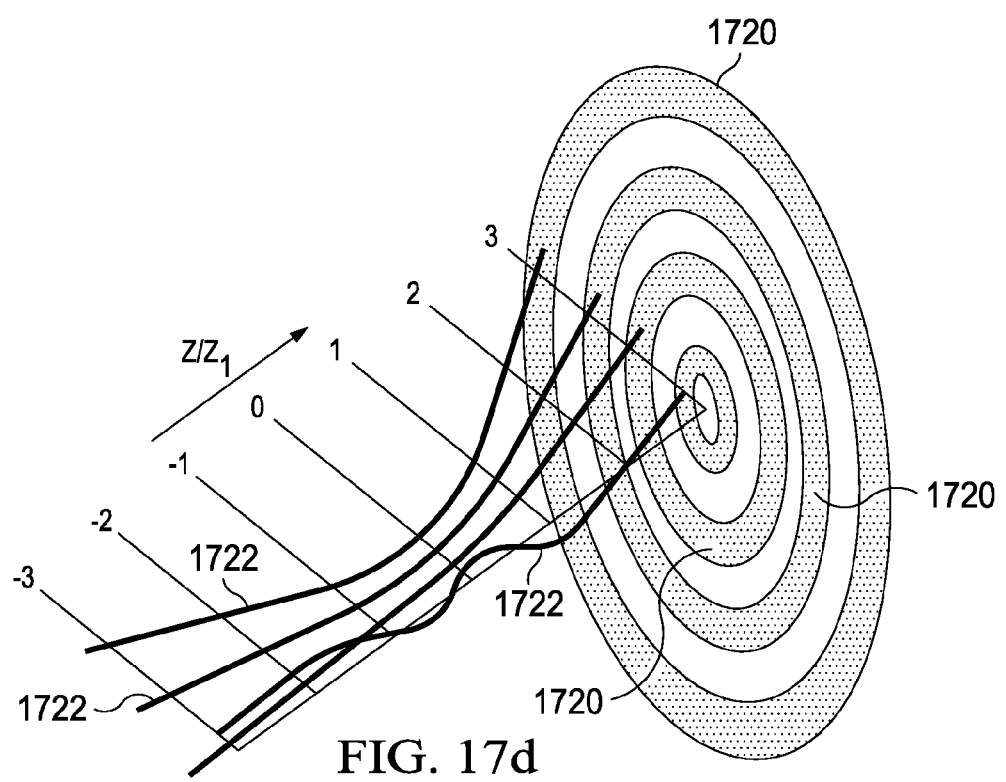
FIG. 17D illustrates a propagation of Poynting vectors for various Eigen modes.

FIG. 17D illustrates the propagation of Poynting vectors for various Eigen modes. Each of the rings 1720 represents a different Eigen mode or twist representing a different orbital angular momentum within the same frequency. Each of these rings 1720 represents a different orthogonal channel. Each of the Eigen modes has a Poynting vector 1722 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. The helicity index may be positive or negative. In RF, different topological charges can be created and muxed together and de-muxed to separate the topological charges.

Figure 17E:
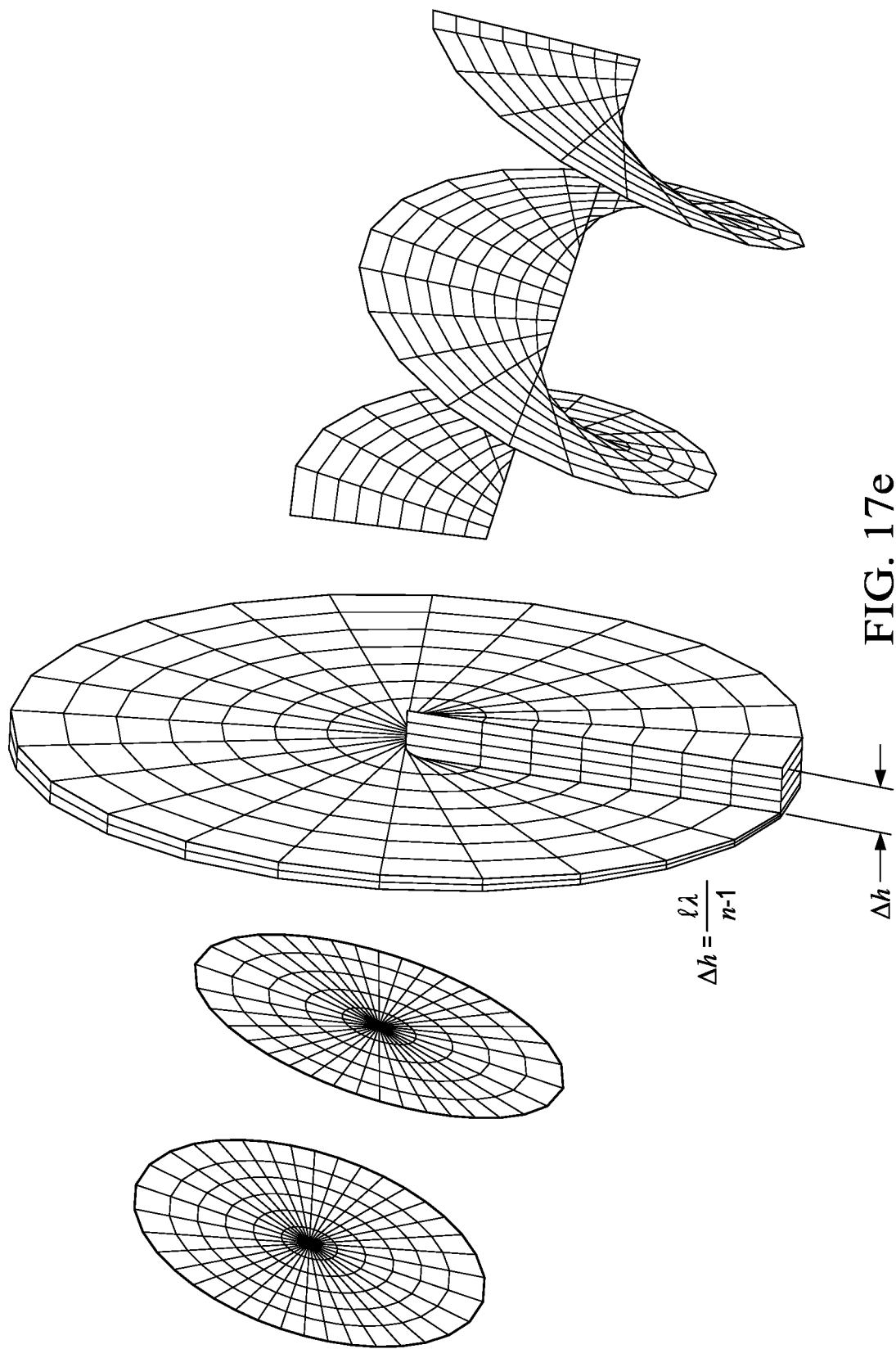
FIG. 17E illustrates a spiral phase plate.

The topological charges l s can be created using Spiral Phase Plates (SPPs) as shown in FIG. 17E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

As described previously with respect to FIG. 17, each of the multiple data streams applied within the processing circuitry has a multiple layer overlay modulation scheme applied thereto.

Figure 18:
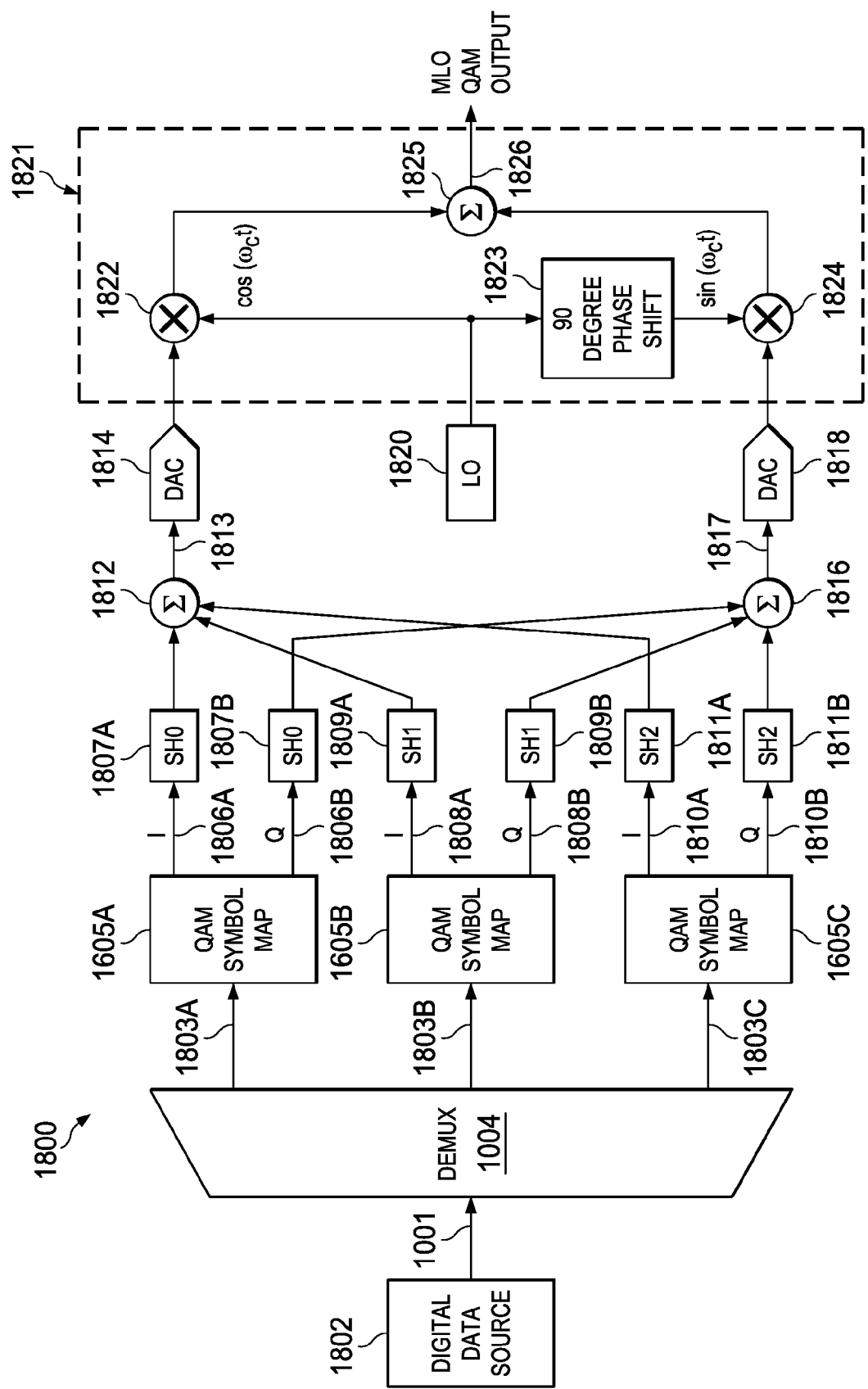
FIG. 18 illustrates a multiple level overlay modulation system.

Referring now to FIG. 18, the reference number 1800 generally indicates an embodiment of a multiple level overlay (MLO) modulation system, although it should be understood that the term MLO and the illustrated system 1800 are examples of embodiments. The MLO system may comprise one such as that disclosed in U.S. Pat. No. 8,503,546 entitled Multiple Layer Overlay Modulation which is incorporated herein by reference. In one example, the modulation system 1800 would be implemented within the multiple level overlay modulation box 504 of FIG. 17. System 1800 takes as input an input data stream 1801 from a digital source 1802, which is separated into three parallel, separate data streams, 1803A-1803C, of logical 1s and 0s by input stage demultiplexer (DEMUX) 1004. Data stream 1001 may represent a data file to be transferred, or an audio or video data stream. It should be understood that a greater or lesser number of separated data streams may be used. In some of the embodiments, each of the separated data streams 1803A-1803C has a data rate of 1/N of the original rate, where N is the number of parallel data streams. In the embodiment illustrated in FIG. 18, N is 3.

Each of the separated data streams 1803A-1803C is mapped to a quadrature amplitude modulation (QAM) symbol in an M-QAM constellation, for example, 16 QAM or 64 QAM, by one of the QAM symbol mappers 1805A-C. The QAM symbol mappers 1805A-C are coupled to respective outputs of DEMUX 1804, and produced parallel in phase (I) 1806A, 1808A, and 1810A and quadrature phase (Q) 1806B, 1808B, and 1810B data streams at discrete levels. For example, in 64 QAM, each I and Q channel uses 8 discrete levels to transmit 3 bits per symbol. Each of the three I and Q pairs, 1806A-1806B, 1808A-1808B, and 1810A-1810B, is used to weight the output of the corresponding pair of function generators 1807A-1807B, 1809A-1809B, and 1811A-1811B, which in some embodiments generate signals such as the modified Hermite polynomials described above and weights them based on the amplitude value of the input symbols. This provides 2 N weighted or modulated signals, each carrying a portion of the data originally from income data stream 1801, and is in place of modulating each symbol in the I and Q pairs, 1806A-1806B, 1808A-1808B, and 1810A-1810B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

The weighted signals are not subcarriers, but rather are sublayers of a modulated carrier, and are combined, superimposed in both frequency and time, using summers 1812 and 1816, without mutual interference in each of the I and Q dimensions, due to the signal orthogonality. Summers 1812 and 1816 act as signal combiners to produce composite signals 1813 and 1817. The weighted orthogonal signals are used for both I and Q channels, which have been processed equivalently by system 1800, and are summed before the QAM signal is transmitted. Therefore, although new orthogonal functions are used, some embodiments additionally use QAM for transmission. Because of the tapering of the signals in the time domain, as will be shown in FIGS. 16A through 16K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1813 and 1817 are converted to analogue signals 1815 and 1819 using digital to analogue converters 1814 and 1818, and are then used to modulate a carrier signal at the frequency of local oscillator (LO) 1820, using modulator 1821. Modulator 1821 comprises mixers 1822 and 1824 coupled to DACs 1814 and 1818, respectively. Ninety degree phase shifter 1823 converts the signals from LO 1820 into a Q component of the carrier signal. The output of mixers 1822 and 1824 are summed in summer 1825 to produce output signals 1826.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, cable, fiber optic, satellite, broadcast, free-space optics, and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE.

Figure 19:
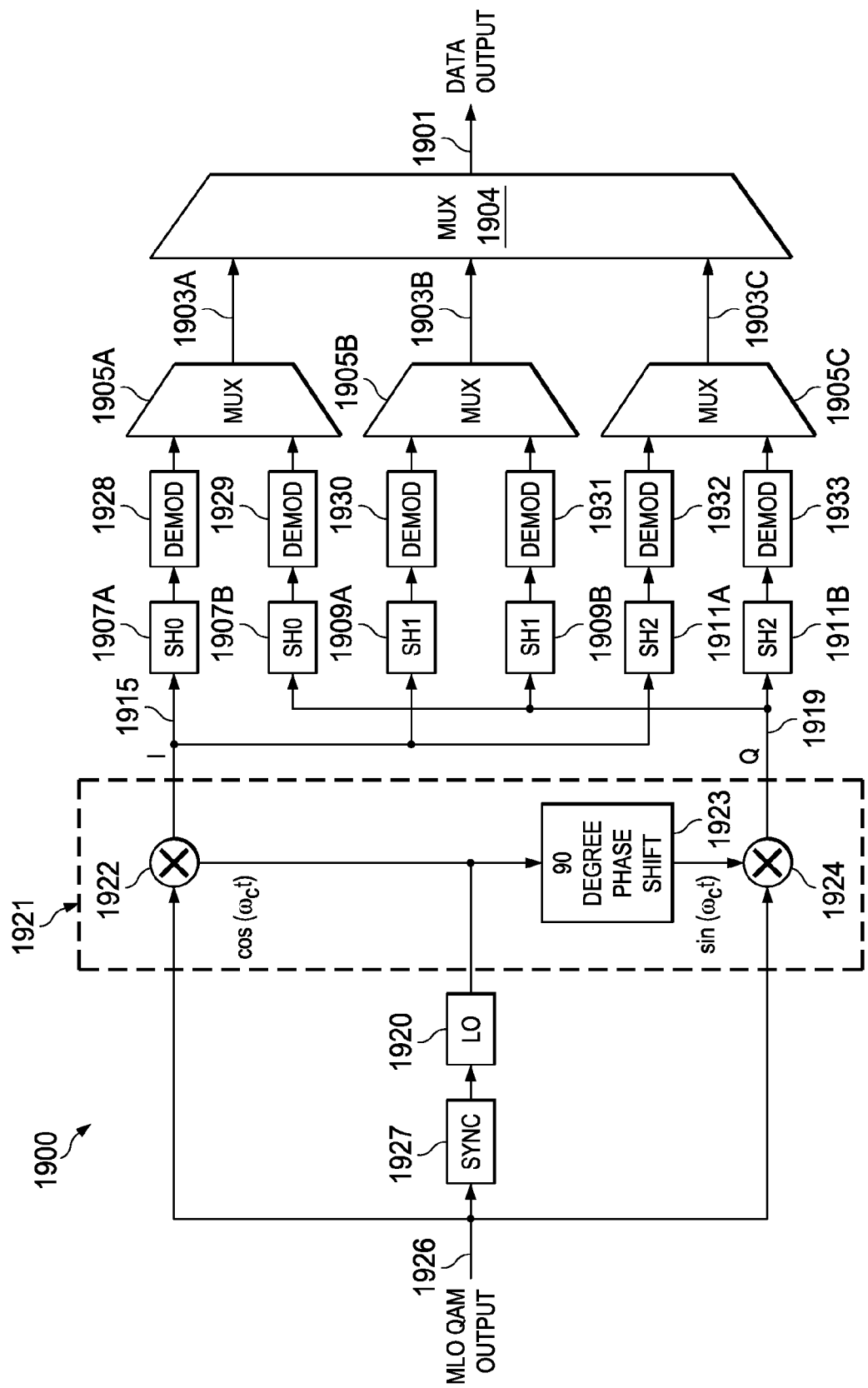
FIG. 19 illustrates a multiple level overlay demodulator.

Referring now to FIG. 19, an MLO demodulator 1900 is illustrated, although it should be understood that the term MLO and the illustrated system 1900 are examples of embodiments. The modulator 1900 takes as input an MLO signal 1126 which may be similar to output signal 1826 from system 1800. Synchronizer 1927 extracts phase information, which is input to local oscillator 1920 to maintain coherence so that the modulator 1921 can produce base band to analogue I signal 1915 and Q signal 1919. The modulator 1921 comprises mixers 1922 and 1924, which, coupled to OL1920 through 90 degree phase shifter 1923. I signal 1915 is input to each of signal filters 1907A, 1909A, and 1911A, and Q signal 1919 is input to each of signal filters 1907B, 1909B, and 1911B. Since the orthogonal functions are known, they can be separated using correlation or other techniques to recover the modulated data. Information in each of the I and Q signals 1915 and 1919 can be extracted from the overlapped functions which have been summed within each of the symbols because the functions are orthogonal in a correlative sense.

In some embodiments, signal filters 1907A-1907B, 1909A-1909B, and 1911A-1911B use locally generated replicas of the polynomials as known signals in match filters. The outputs of the match filters are the recovered data bits, for example, equivalence of the QAM symbols 1906A-1906B, 1908A-1908B, and 1910A-1910B of system 1900. Signal filters 1907A-1907B, 1909A-1909B, and 1911A-1911B produce 2 n streams of n, I, and Q signal pairs, which are input into demodulators 1928-1933. Demodulators 1928-1933 integrate the energy in their respective input signals to determine the value of the QAM symbol, and hence the logical 1s and 0s data bit stream segment represented by the determined symbol. The outputs of the modulators 1928-1933 are then input into multiplexers (MUXs) 1905A-1905C to generate data streams 1903A-1903C. If system 1900 is demodulating a signal from system 1800, data streams 1903A-1903C correspond to data streams 1803A-1803C. Data streams 1903A-1903C are multiplexed by MUX 1904 to generate data output stream 1901. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 20:
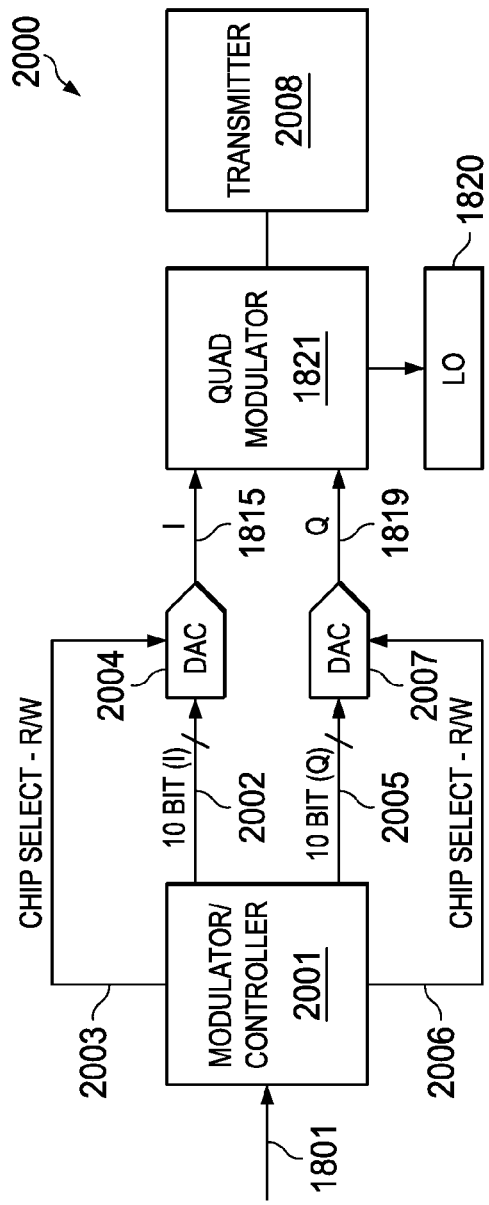
FIG. 20 illustrates a multiple level overlay transmitter system.

FIG. 20 illustrates an embodiment of an MLO transmitter system 2000, which receives input data stream 2001. System 2000 represents a modulator/controller 2001, which incorporates equivalent functionality of DEMUX 1804, QAM symbol mappers 1805A-C, function generators 1807A-1807B, 1809A-1809B, and 1811A-1811B, and summers 1818 and 1816 of system 1800, shown in FIG. 18. However, it should be understood that modulator/controller 2001 may use a greater or lesser quantity of signals than the three illustrated in system 1800. Modulator/controller 2001 may comprise an application specific integrated circuit (ASIC), a field programmable gate array (FPGA), and/or other components, whether discrete circuit elements or integrated into a single integrated circuit (IC) chip.

Modulator/controller 2001 is coupled to DACs 2004 and 2007, communicating a 10 bit I signal 2002 and a 10 bit Q signal 2005, respectively. In some embodiments, I signal 2002 and Q signal 2005 correspond to composite signals 1813 and 1817 of system 1800. It should be understood, however, that the 10 bit capacity of I signal 2002 and Q signal 2005 is merely representative of an embodiment. As illustrated, modulator/controller 2001 also controls DACs 2004 and 2007 using control signals 2003 and 2006, respectively. In some embodiments, DACs 2004 and 2007 each comprise an AD5433, complementary metal oxide semiconductor (CMOS) 10 bit current output DAC. In some embodiments, multiple control signals are sent to each of DACs 2004 and 2007.

DACs 2004 and 2007 output analogue signals 1815 and 1819 to quadrature modulator 1821, which is coupled to LO 1820. The output of modulator 1820 is illustrated as coupled to a transmitter 2008 to transmit data wirelessly, although in some embodiments, modulator 1821 may be coupled to a fiber-optic modem, a twisted pair, a coaxial cable, or other suitable transmission media.

Figure 21:
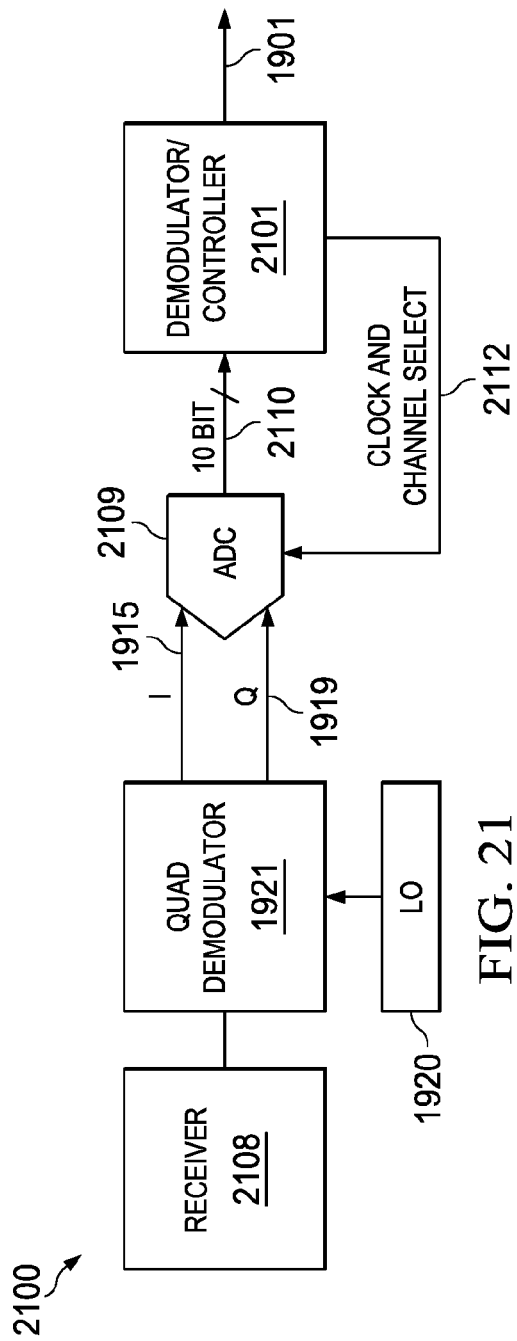
FIG. 21 illustrates a multiple level overlay receiver system.

FIG. 21 illustrates an embodiment of an MLO receiver system 2100 capable of receiving and demodulating signals from system 2000. System 2100 receives an input signal from a receiver 2108 that may comprise input medium, such as RF, wired or optical. The modulator 1921 driven by LO 1920 converts the input to baseband I signal 1915 and Q signal 1919. I signal 1915 and Q signal 1919 are input to analogue to digital converter (ADC) 2109.

ADC 2109 outputs 10 bit signal 2110 to demodulator/controller 2101 and receives a control signal 2112 from demodulator/controller 2101. Demodulator/controller 2101 may comprise an application specific integrated circuit (ASIC), a field programmable gate array (FPGA), and/or other components, whether discrete circuit elements or integrated into a single integrated circuit (IC) chip. Demodulator/controller 2101 correlates received signals with locally generated replicas of the signal set used, in order to perform demodulation and identify the symbols sent. Demodulator/controller 2101 also estimates frequency errors and recovers the data clock, which is used to read data from the ADC 2109. The clock timing is sent back to ADC 2109 using control signal 2112, enabling ADC 2109 to segment the digital I and Q signals 1915 and 1919. In some embodiments, multiple control signals are sent by demodulator/controller 2101 to ADC 2109. Demodulator/controller 2101 also outputs data signal 1901.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4 n, and are defined by:

$$\psi_n(t, \xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi) dt d\xi$$

The Hermite polynomial is defined by the contour integral:

$$H_n(z) = \frac{n!}{2\pi i}\oint e^{-t^2+2tz} t^{-n-1} dt,$$

where the contour encloses the origin and is traversed in a counterclockwise direction. Hermite polynomials are described in Mathematical Methods for Physicists, by George Arfken, for example on page 416, the disclosure of which is incorporated by reference.

Figure 22A:
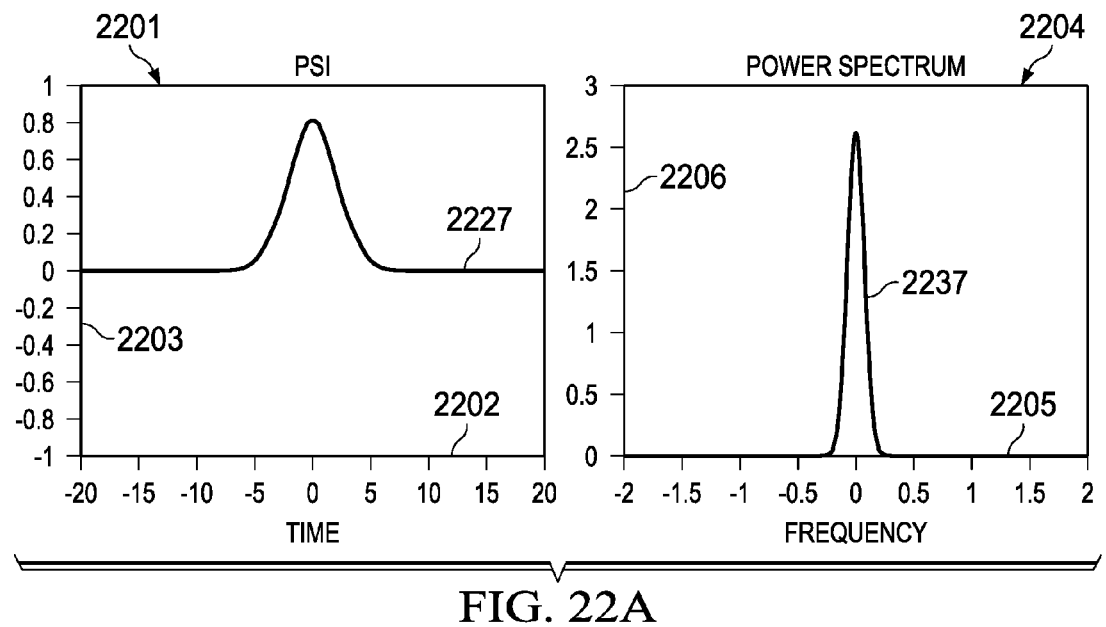
FIGS. 22A-22K illustrate representative multiple level overlay signals and their respective spectral power densities.
Figure 22B:
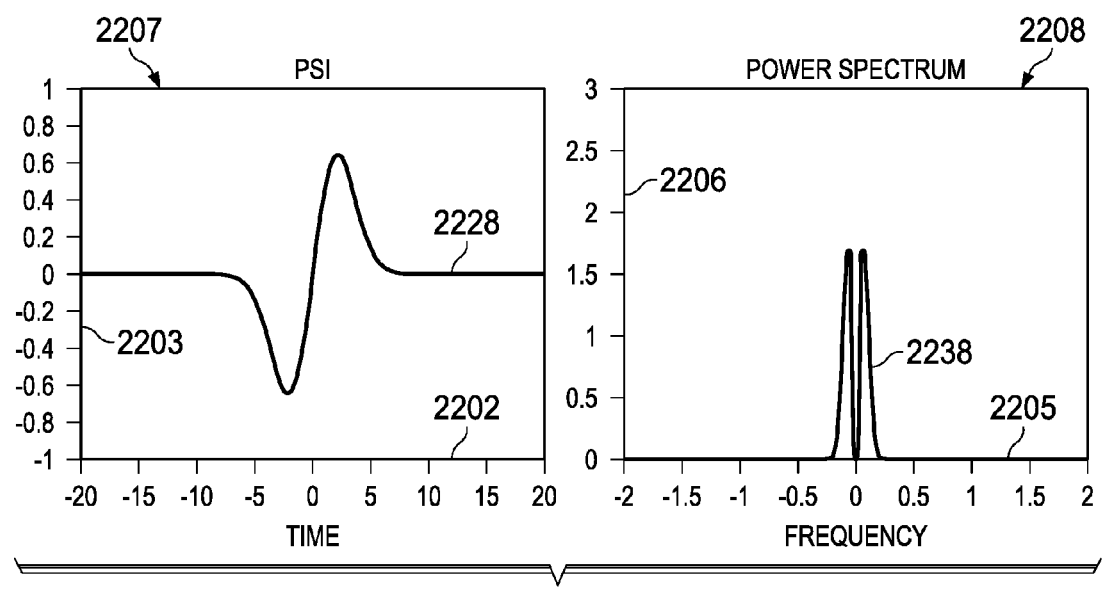
Figure 22C:
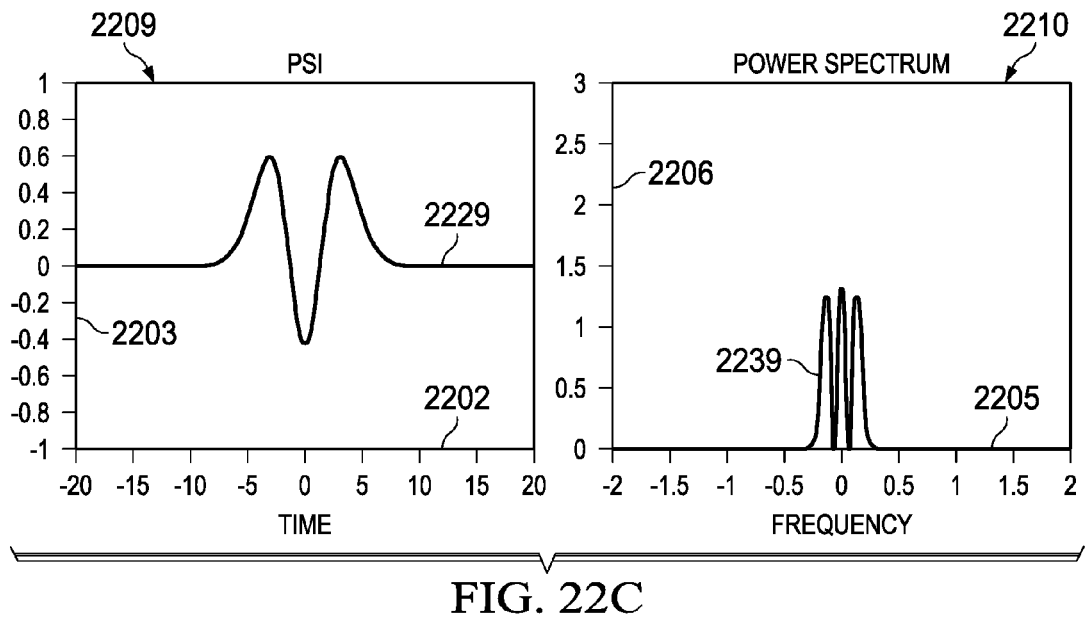
Figure 22D:
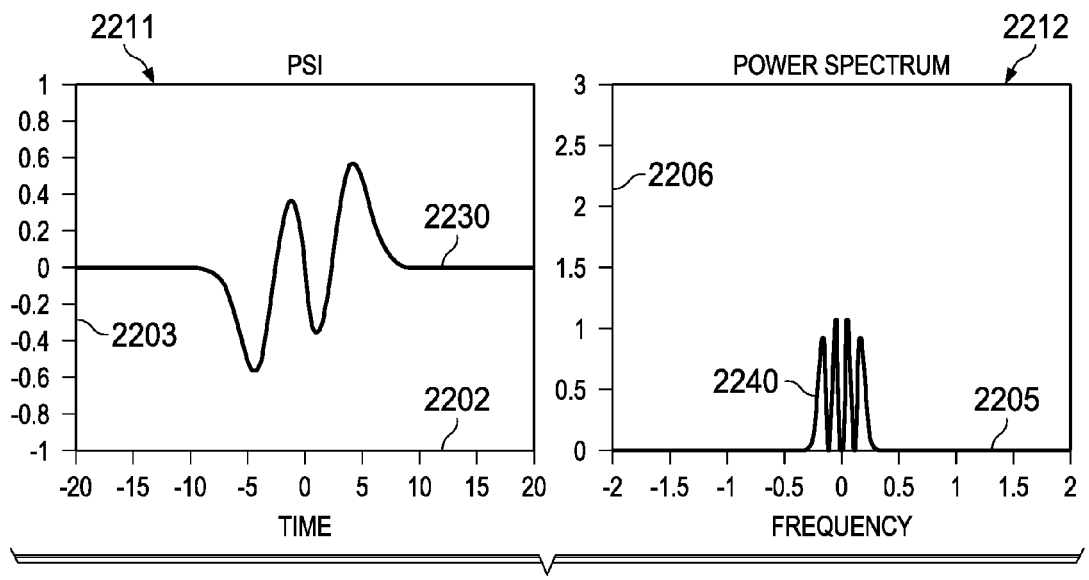
Figure 22E:
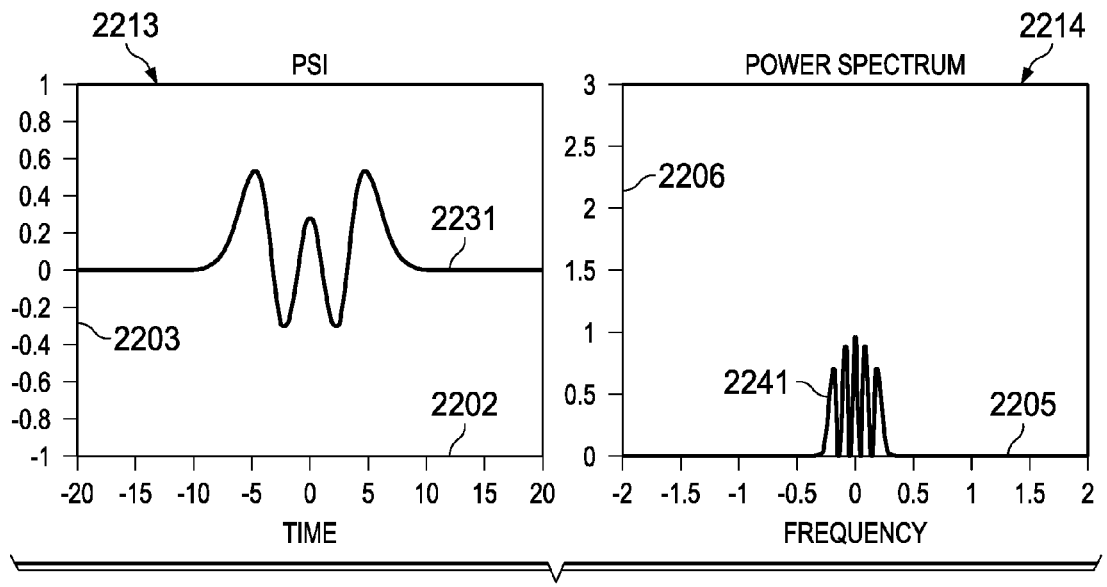
Figure 22F:
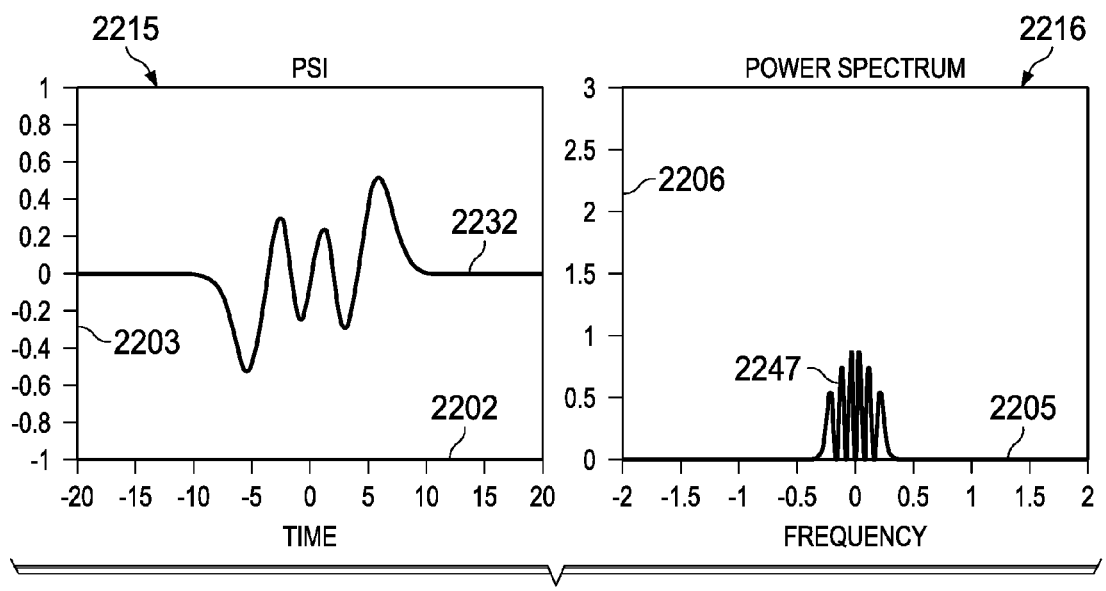
Figure 22G:
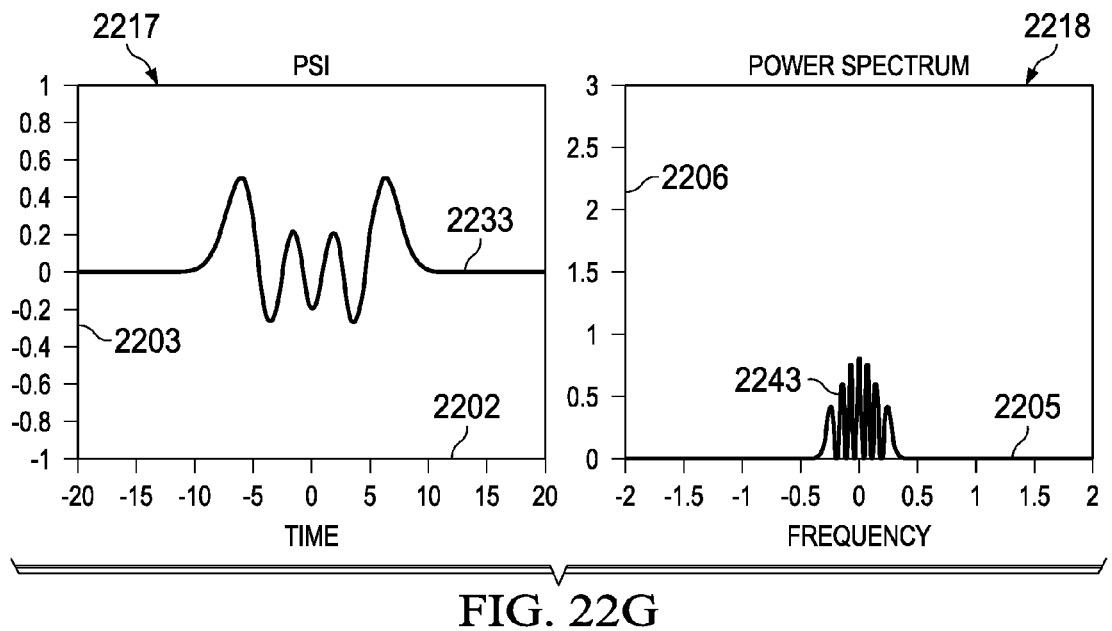
Figure 22H:
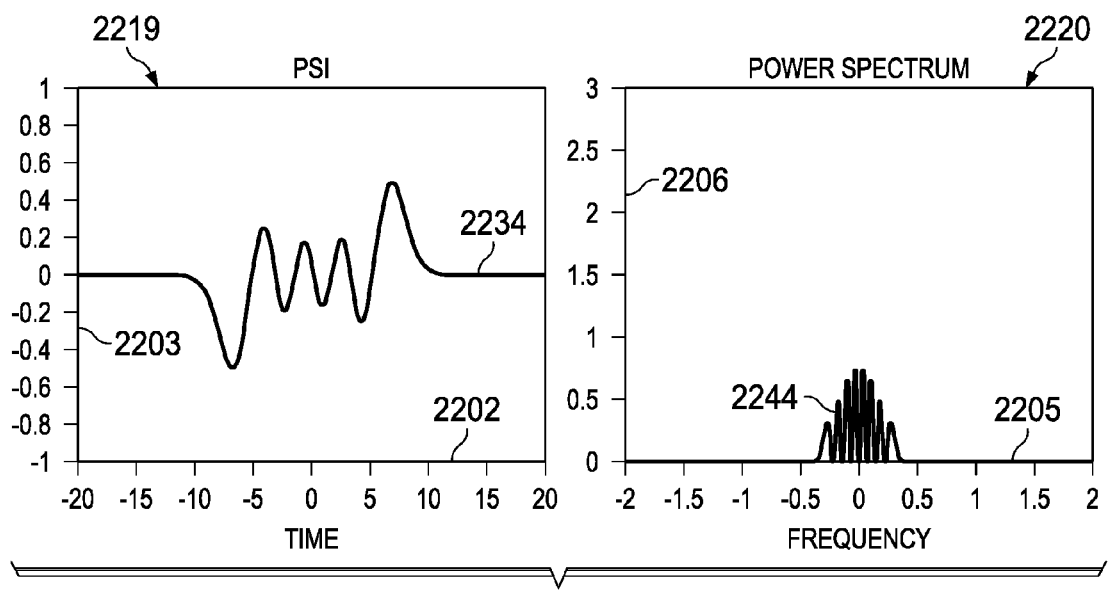
Figure 22I:
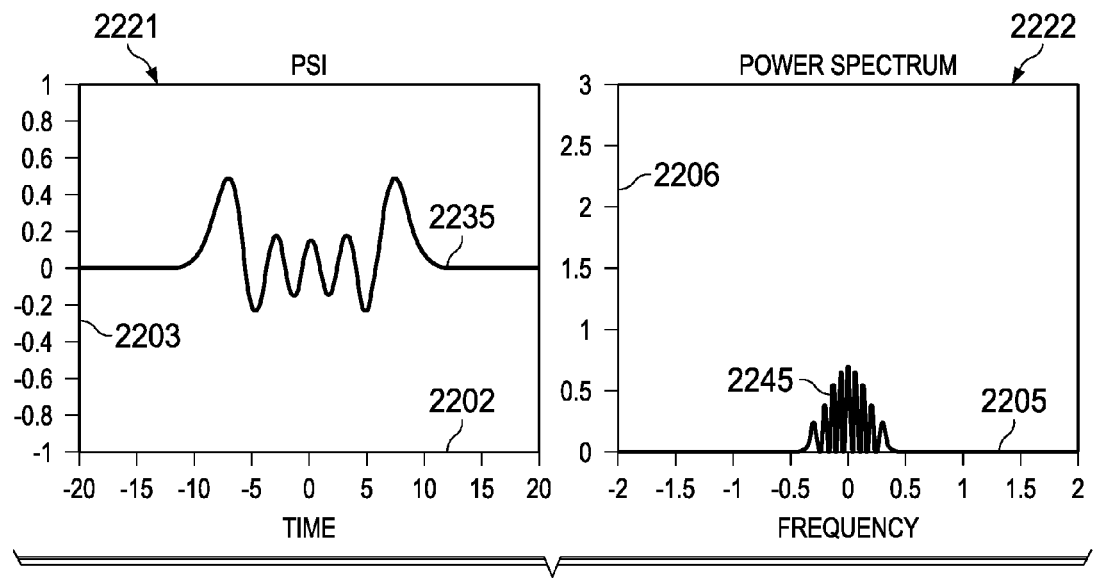
Figure 22J:
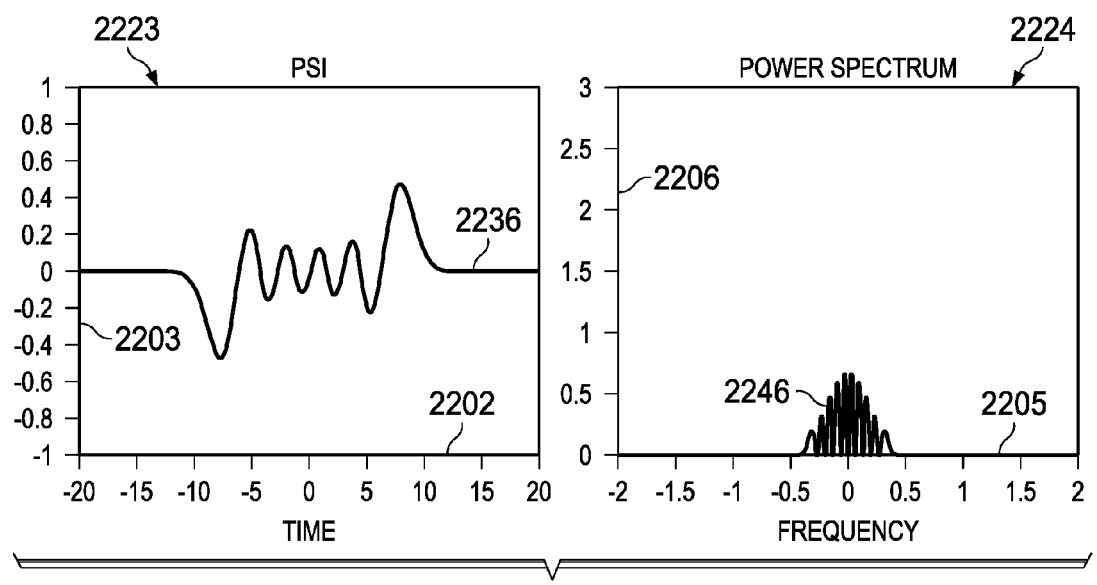

FIGS. 22A-22K illustrate representative MLO signals and their respective spectral power densities based on the modified Hermite polynomials $\Psi_n$ for n ranging from 0 to 9. FIG. 22A shows plots 2201 and 2204. Plot 2201 comprises a curve 2227 representing $\Psi_0$ plotted against a time axis 2202 and an amplitude axis 2203. As can be seen in plot 2201, curve 2227 approximates a Gaussian curve. Plot 2204 comprises a curve 2237 representing the power spectrum of $\Psi_0$ plotted against a frequency axis 2205 and a power axis 2206. As can be seen in plot 2204, curve 2237 also approximates a Gaussian curve. Frequency domain curve 2207 is generated using a Fourier transform of time domain curve 2227. The units of time and frequency on axis 2202 and 2205 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 2227, i.e., the time period at which curve 2227 is above 0 would be compressed to the appropriate length calculated using the inverse of the desired symbol rate. For an available bandwidth in the megahertz range, the non-0 duration of a time domain signal will be in the microsecond range.

FIGS. 22B-22J show plots 2207-2224, with time domain curves 2228-2236 representing $\Psi_1$ through $\Psi_9$, respectively, and their corresponding frequency domain curves 2238-2246. As can be seen in FIGS. 22A-22J, the number of peaks in the time domain plots, whether positive or negative, corresponds to the number of peaks in the corresponding frequency domain plot. For example, in plot 2223 of FIG. 22J, time domain curve 2236 has five positive and five negative peaks. In corresponding plot 2224 therefore, frequency domain curve 2246 has ten peaks.

Figure 22K:
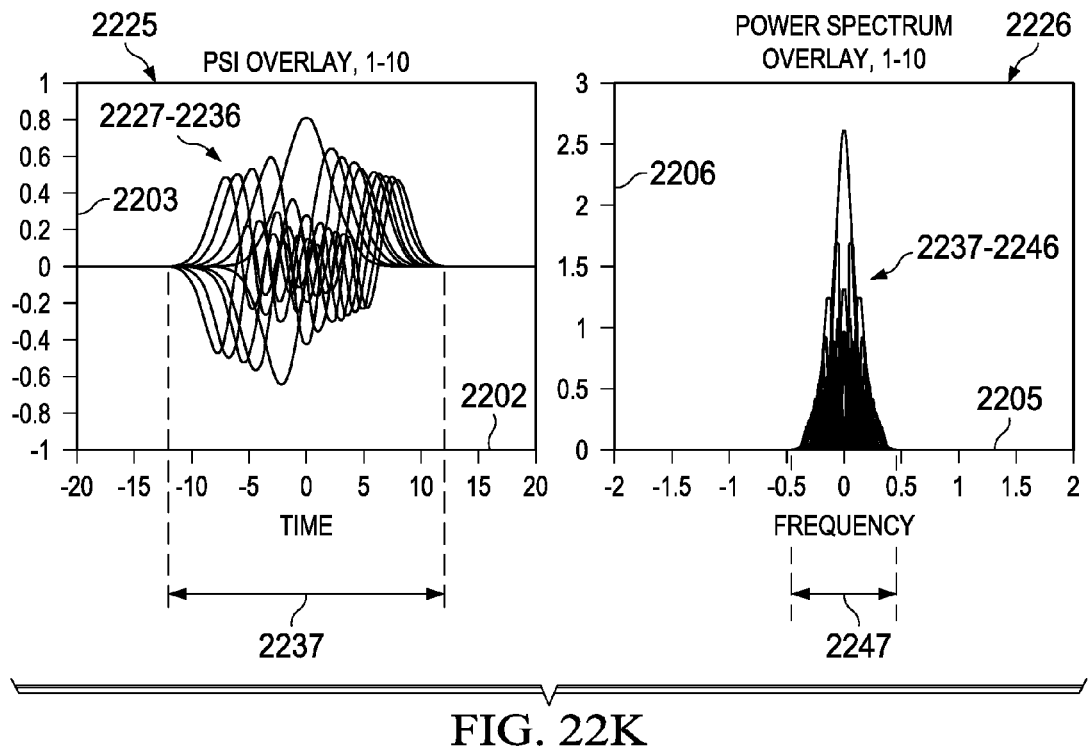

FIG. 22K shows overlay plots 2225 and 2226, which overlay curves 2227-2236 and 2237-2246, respectively. As indicated in plot 2225, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 22A-22K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 23:
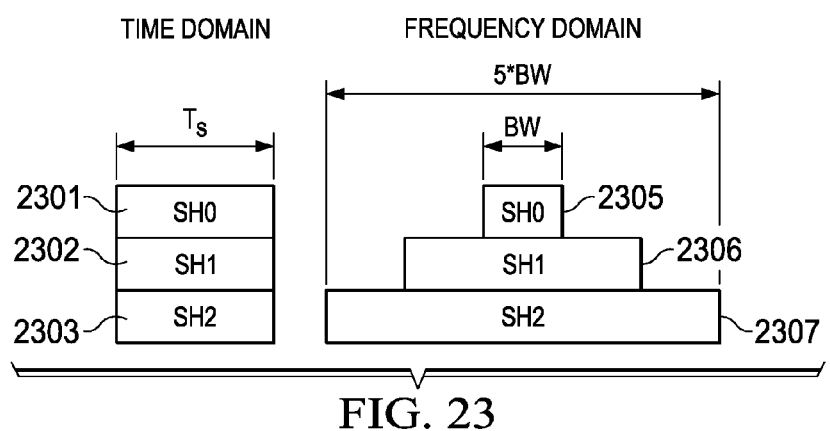
FIG. 23 illustrates comparisons of multiple level overlay signals within the time and frequency domain.

FIG. 23 illustrates a comparison of MLO signal widths in the time and frequency domains. Time domain envelope representations 2301-2303 of signals SH0-SH3 are illustrated as all having a duration $T_S$. SH0-SH3 may represent $PSI_0$-$PSI_2$, or may be other signals. The corresponding frequency domain envelope representations are 2305-2307, respectively. SH0 has a bandwidth BW, SH1 has a bandwidth three times BW, and SH2 has a bandwidth of 5 BW, which is five times as great as that of SH0. The bandwidth used by an MLO system will be determined, at least in part, by the widest bandwidth of any of the signals used. If each layer uses only a single signal type within identical time windows, the spectrum will not be fully utilized, because the lower order signals will use less of the available bandwidth than is used by the higher order signals.

FIG. 24 illustrates a spectral alignment of MLO signals that accounts for the differing bandwidths of the signals, and makes spectral usage more uniform, using SH0-SH3. Blocks 2401-2404 are frequency domain blocks of an OFDM signal with multiple subcarriers. Block 2403 is expanded to show further detail. Block 2403 comprises a first layer 2403x comprised of multiple SH0 envelopes 2403a-2403o. A second layer 2403y of SH1 envelopes 2403p-2403t has one third the number of envelopes as the first layer. In the illustrated example, first layer 2403x has 15 SH0 envelopes, and second layer 2403y has five SH1 envelopes. This is because, since the SH1 bandwidth envelope is three times as wide as that of SH0, 15 SH0 envelopes occupy the same spectral width as five SH1 envelopes. The third layer 2403z of block 2403 comprises three SH2 envelopes 2403u-2403w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15 BW, which is a block in the frequency domain. The OFDM-MLO signal can have multiple blocks, and the spectral efficiency of this illustrated implementation is proportional to (15+5+3)/15.

FIG. 25 illustrates another spectral alignment of MLO signals, which may be used alternatively to alignment scheme shown in FIG. 24. In the embodiment illustrated in FIG. 25, the OFDM-MLO implementation stacks the spectrum of SH0, SH1, and SH2 in such a way that the spectrum in each layer is utilized uniformly. Layer 2500A comprises envelopes 2501A-2501D, which includes both SH0 and SH2 envelopes. Similarly, layer 2500C, comprising envelopes 2503A-2503D, includes both SH0 and SH2 envelopes. Layer 2500B, however, comprising envelopes 2502A-2502D, includes only SH1 envelopes. Using the ratio of envelope sizes described above, it can be easily seen that BW+5 BW=3 BW+3 BW. Thus, for each SH0 envelope in layer 2500A, there is one SH2 envelope also in layer 2500C and two SH1 envelopes in layer 2500B.

Three Scenarios Compared:

1) MLO with 3 Layers defined by:

$$f_0(t) = W_0 e^{-\frac{t^2}{4}}, W_0 = 0.6316$$

$$f_1(t) = W_1 t e^{-\frac{t^2}{4}}, W_1 \approx 0.6316$$

$$f_2(t) = W_2(t^2 - 1)e^{-\frac{t^2}{4}}, W_2 \approx 0.4466$$

(The current FPGA implementation uses the truncation interval of [−6, 6].)

2) Conventional scheme using rectangular pulse

3) Conventional scheme using a square-root raised cosine (SRRC) pulse with a roll-off factor of 0.5

For MLO pulses and SRRC pulse, the truncation interval is denoted by [−t1, t1] in the following figures. For simplicity, we used the MLO pulses defined above, which can be easily scaled in time to get the desired time interval (say micro-seconds or nano-seconds). For the SRRC pulse, we fix the truncation interval of [−3T, 3T] where T is the symbol duration for all results presented in this document.

Bandwidth Efficiency

The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Truncation of MLO pulses introduces inter-layer interferences (ILI). However, the truncation interval of [−6, 6] yields negligible ILI while [−4, 4] causes slight tolerable ILI.

The bandwidth efficiency of MLO may be enhanced by allowing inter-symbol interference (ISI). To realize this enhancement, designing transmitter side parameters as well as developing receiver side detection algorithms and error performance evaluation can be performed.

Figure 26:
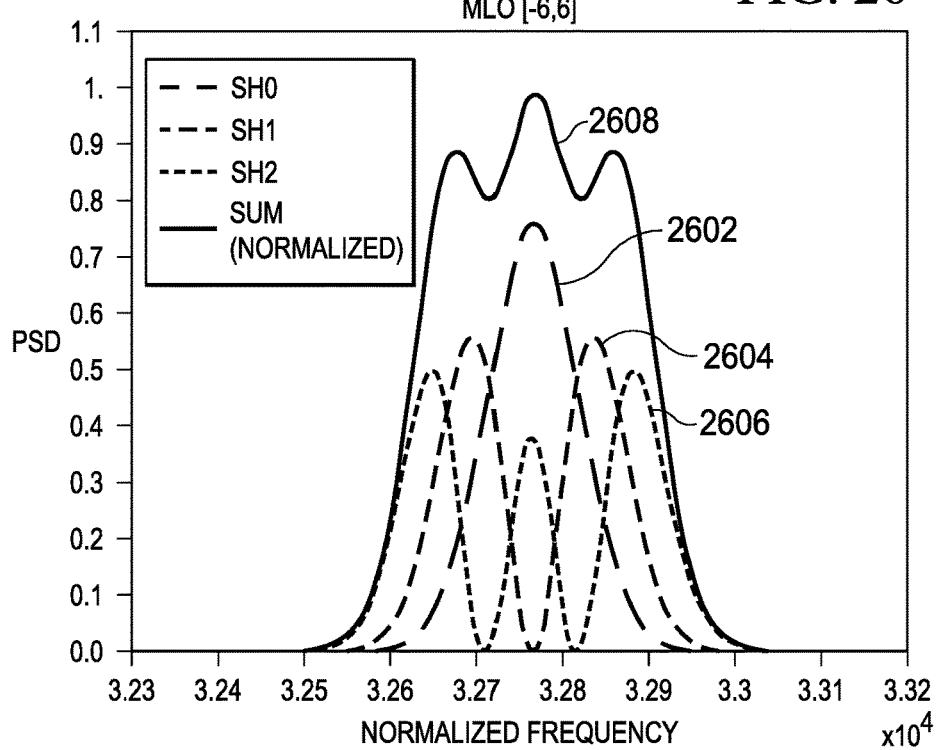
FIG. 26 illustrates power spectral density for various signal layers using a combined three layer multiple level overlay technique.

Referring now to FIG. 26, there is illustrated the power spectral density of each layer SH0-SH2 within MLO and also for the combined three layer MLO. 2602 illustrates the power spectral density of the SH0 layer; 2604 illustrates the power spectral density of the SH1 layer; 2606 illustrates the power spectral density of the SH2 layer, and 2608 illustrates the combined power spectral density of each layer.

Figure 27:
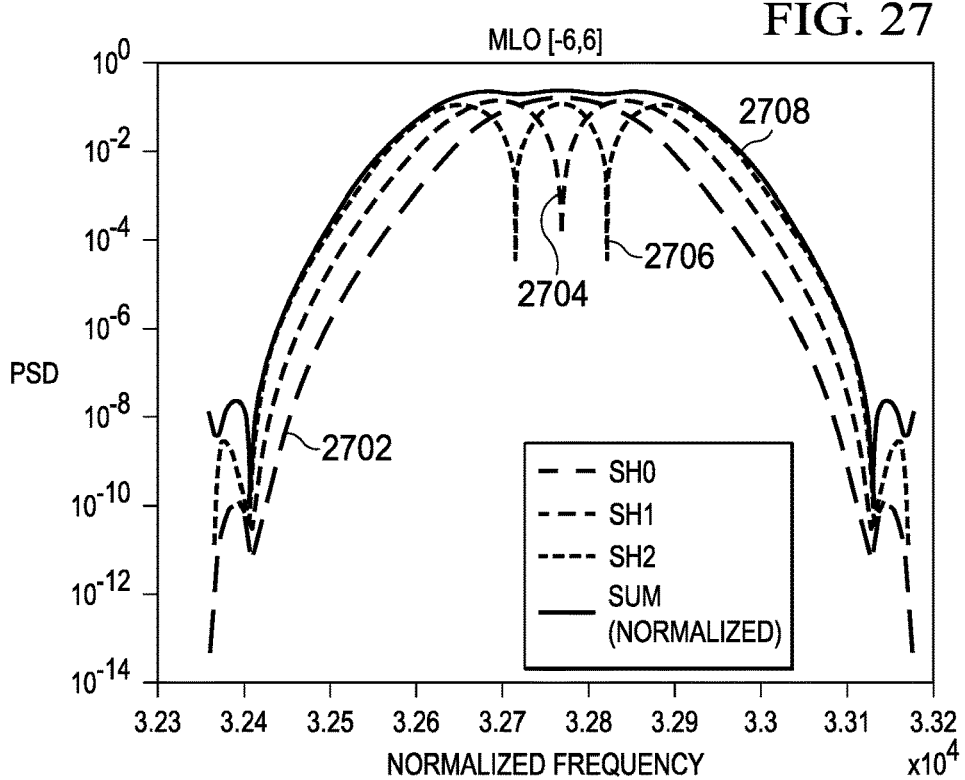
FIG. 27 illustrates power spectral density on a log scale for layers using a combined three layer multiple level overlay modulation.

Referring now to FIG. 27, there is illustrated the power spectral density of each layer as well as the power spectral density of the combined three layer in a log scale. 2702 represents the SH0 layer. 2704 represents the SH1 layer. 2706 represents the SH2 layer. 2708 represents the combined layers.

Figure 28:
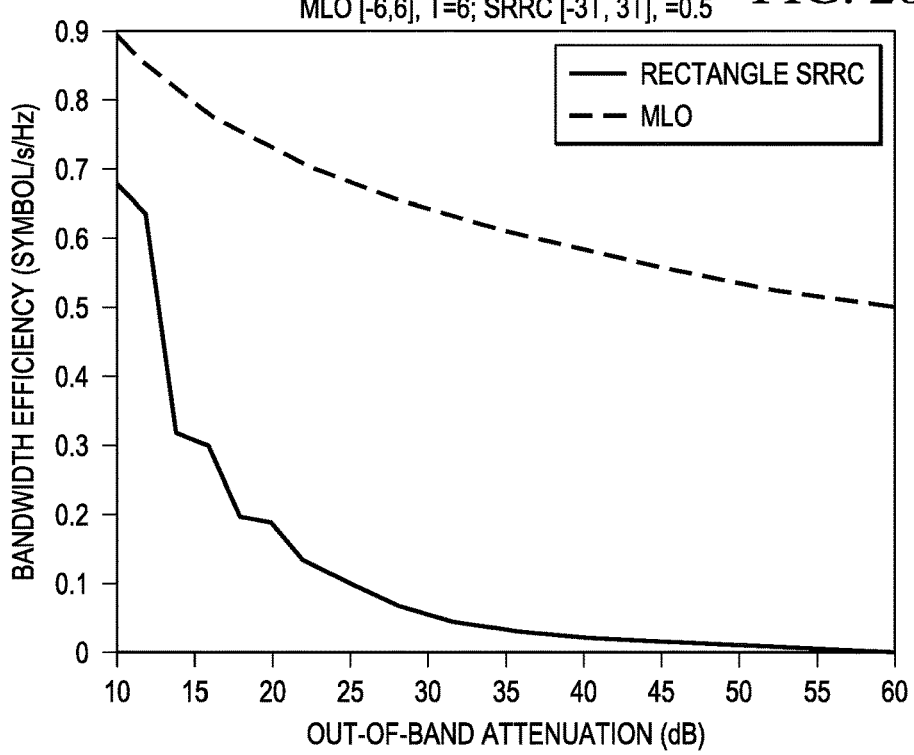
FIG. 28 illustrates a bandwidth efficiency comparison for square root raised cosine versus multiple layer overlay for a symbol rate of 1/6.
Figure 29:
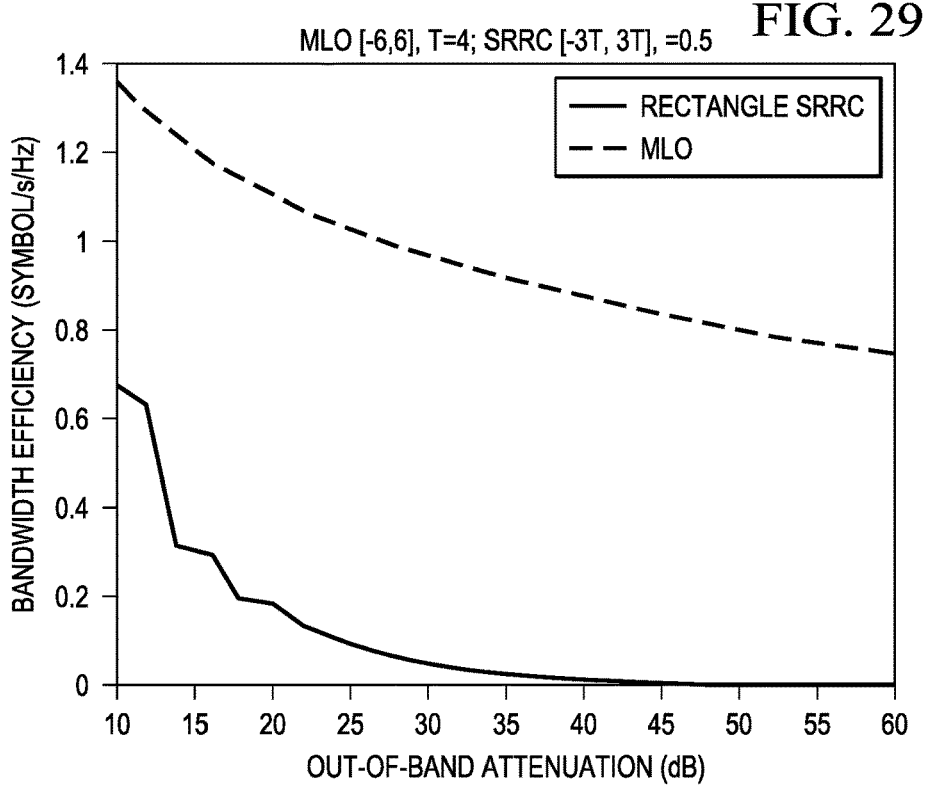
FIG. 29 illustrates a bandwidth efficiency comparison between square root raised cosine and multiple layer overlay for a symbol rate of 1/4.

Referring now to FIG. 28, there is a bandwidth efficiency comparison versus out of band attenuation (X-dB) where quantum level overlay pulse truncation interval is [−6,6] and the symbol rate is 1/6. Referring also to FIG. 29, there is illustrated the bandwidth efficiency comparison versus out of band attenuation (X-dB) where quantum level overlay pulse truncation interval is [−6,6] and the symbol rate is 1/4.

The QLO signals are generated from the Physicist's special Hermite functions:

$$f_n(t, \alpha) = \sqrt{\frac{\alpha}{\sqrt{\pi}\, n!\, 2^n}}\, H_n(\alpha t)\, e^{-\frac{\alpha^2 t^2}{2}},$$

$$\alpha > 0$$

Note that the initial hardware implementation is using $$\alpha = \frac{1}{\sqrt{2}}$$

and for consistency with his part, $$\alpha = \frac{1}{\sqrt{2}}$$

is used in all figures related to the spectral efficiency.

Let the low-pass-equivalent power spectral density (PSD) of the combined QLO signals be X(f) and its bandwidth be B. Here the bandwidth is defined by one of the following criteria.

ACLR1 (First Adjacent Channel Leakage Ratio) in dBc equals:

$$ACLR1 = \frac{\int_{B/2}^{3B/2} X(f)df}{\int_{-\infty}^{\infty} X(f)df}$$

ACLR2 (Second Adjacent Channel Leakage Ratio) in dBc equals:

$$ACLR2 = \frac{\int_{3B/2}^{5B/2} X(f)df}{\int_{-\infty}^{\infty} X(f)df}$$

Out-of-Band Power to Total Power Ratio is:

$$\frac{2\int_{B/2}^{\infty} X(f)df}{\int_{-\infty}^{\infty} X(f)df}$$

The Band-Edge PSD in dBc/100 kHz equals:

$$\frac{\int_{B/2}^{\frac{B}{2}+10^5} X(f)df}{\int_{-\infty}^{\infty} X(f)df}$$

Figure 30:
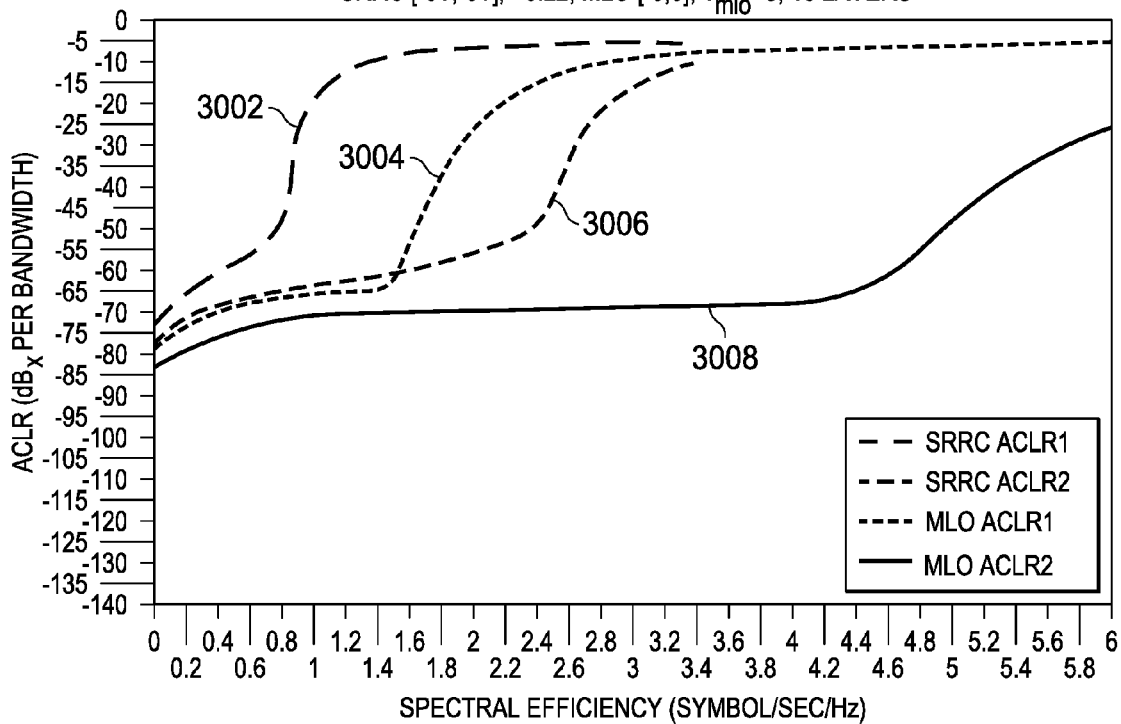
FIG. 30 illustrates a performance comparison between square root raised cosine and multiple level overlay using ACLR.

Referring now to FIG. 30 there is illustrated a performance comparison using ACLR1 and ACLR2 for both a square root raised cosine scheme and a multiple layer overlay scheme. Line 3002 illustrates the performance of a square root raised cosine 3002 using ACLR1 versus an MLO 3004 using ACLR1. Additionally, a comparison between a square root raised cosine 3006 using ACLR2 versus MLO 3008 using ACLR2 is illustrated. Table A illustrates the performance comparison using ACLR.

TABLE A

| Criteria: ACLR1 ≤ −30 dBc per bandwidth ACLR2 ≤ −43 dBc per bandwidth | | | Spectral Efficiency (Symbol/sec/Hz) | Gain |
|---|---|---|---|---|
| SRRC [−8T, 8T] β = 0.22 | | | 0.8765 | 1.0 |
| | N Layers | Symbol Duration (Tmol) | | |
| QLO [−8, 8] | N = 3 | Tmol = 4 | 1.133 | 1.2926 |
| | N = 4 | Tmol = 5 | 1.094 | 1.2481 |
| | | Tmol = 4 | 1.367 | 1.5596 |
| | N = 10 | Tmol = 8 | 1.185 | 1.3520 |
| | | Tmol = 7 | 1.355 | 1.5459 |
| | | Tmol = 6 | 1.580 | 1.8026 |
| | | Tmol = 5 | 1.896 | 2.1631 |
| | | Tmol = 4 | 2.371 | 2.7051 |

Figure 31:
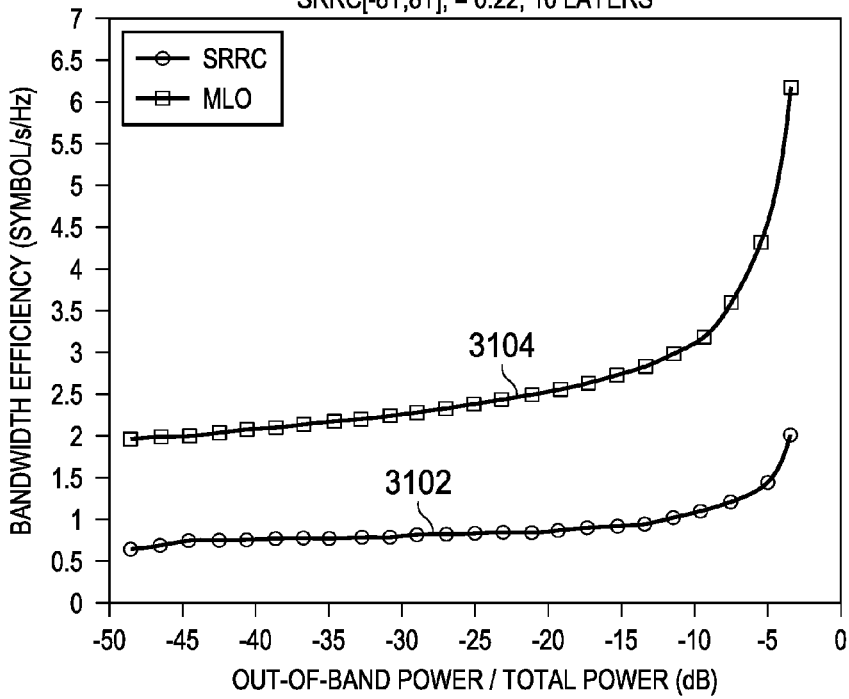
FIG. 31 illustrates a performance comparison between square root raised cosine and multiple lever overlay using out of band power.

Referring now to FIG. 31, there is illustrated a performance comparison between a square root raised cosine 3102 and a MLO 3104 using out-of-band power. Referring now also to Table B, there is illustrated a more detailed comparison of the performance using out-of-band power.

TABLE B

| Table 3: Performance Comparison Using Out-of-Band Power | | | | |
|---|---|---|---|---|
| Criterion: Out-of-band Power/ Total Power ≤ −30 dB | | | Spectral Efficiency (Symbol/sec/Hz) | Gain |
| SRRC [−8T, 8T] β = 0.22 | | | 0.861 | 1.0 |
| | N Layers | Symbol Duration (Tmol) | | |
| QLO [−8, 8] | N = 3 | Tmol = 4 | 1.080 | 1.2544 |
| | N = 4 | Tmol = 5 | 1.049 | 1.2184 |
| | | Tmol = 4 | 1.311 | 1.5226 |
| | N = 10 | Tmol = 8 | 1.152 | 1.3380 |
| | | Tmol = 7 | 1.317 | 1.5296 |
| | | Tmol = 6 | 1.536 | 1.7840 |
| | | Tmol = 5 | 1.844 | 2.1417 |
| | | Tmol = 4 | 2.305 | 2.6771 |

Figure 32:
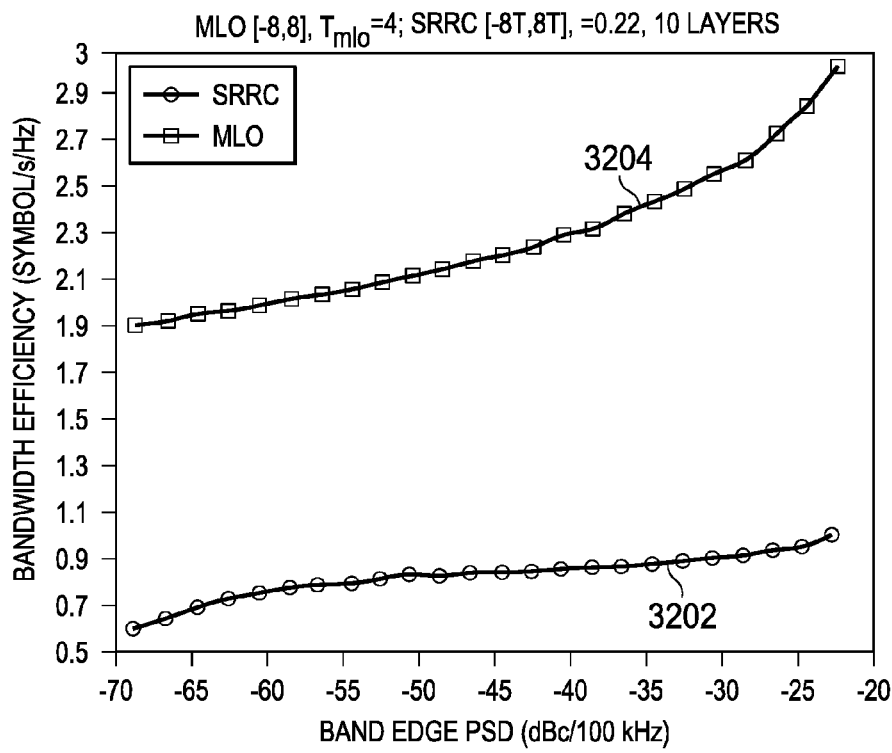
FIG. 32 illustrates a performance comparison between square root raised cosine and multiple lever overlay using band edge PSD.

Referring now to FIG. 32, there is further provided a performance comparison between a square root raised cosine 3202 and a MLO 3204 using band-edge PSD. A more detailed illustration of the performance comparison is provided in Table C.

TABLE C

| Table 4: Performance Comparison Using Band-Edge PSD | | | | |
|---|---|---|---|---|
| Criterion: Band-Edge PSD = −50 dBc/100 kHz | | | Spectral Efficiency (Symbol/sec/Hz) | Gain |
| SRRC [−8T, 8T] β = 0.22 | | | 0.810 | 1.0 |
| | N Layers | Symbol Duration (Tmol) | | |
| QLO [−8, 8] | N = 3 | Tmol = 4 | 0.925 | 1.1420 |
| | N = 4 | Tmol = 5 | 0.912 | 1.1259 |
| | | Tmol = 4 | 1.14 | 1.4074 |
| | N = 10 | Tmol = 8 | 1.049 | 1.2951 |
| | | Tmol = 7 | 1.198 | 1.4790 |
| | | Tmol = 6 | 1.398 | 1.7259 |

TABLE C-continued

Table 4: Performance Comparison Using Band-Edge PSD

| Criterion:<br>Band-Edge PSD = −50 dBc/100 kHz | Spectral Efficiency<br>(Symbol/sec/Hz) | Gain |
|---|---|---|
| Tmol = 5 | 1.678 | 2.0716 |
| Tmol = 4 | 2.097 | 2.5889 |

Figure 33:
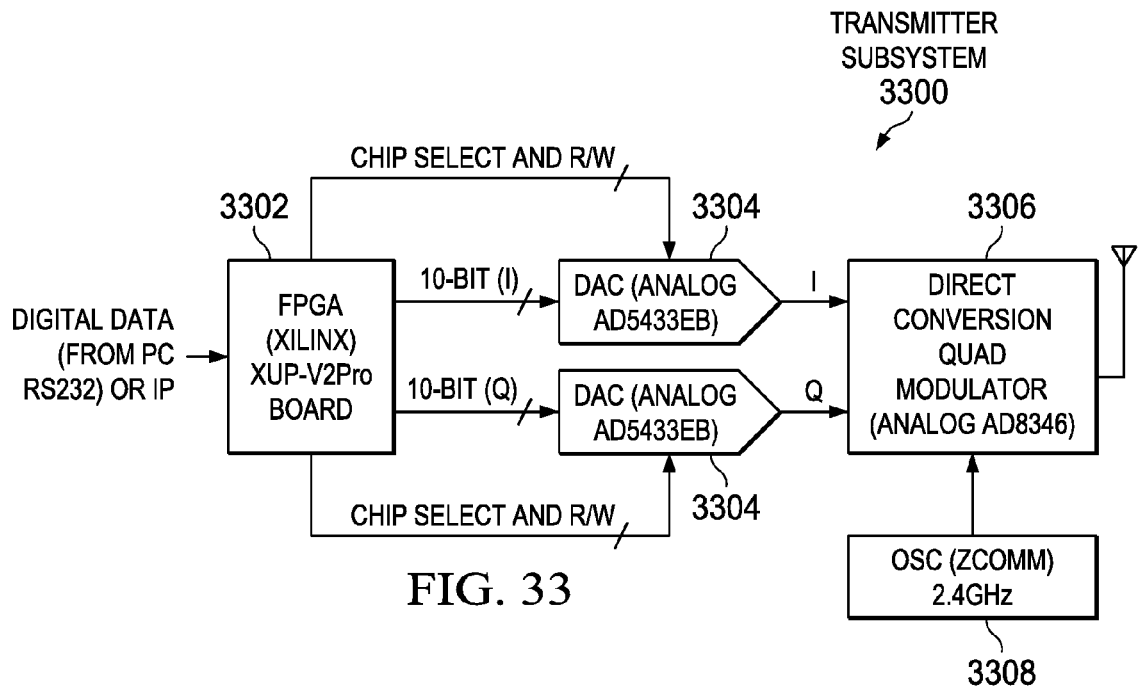
FIG. 33 is a block diagram of a transmitter subsystem for use with multiple level overlay.
Figure 34:
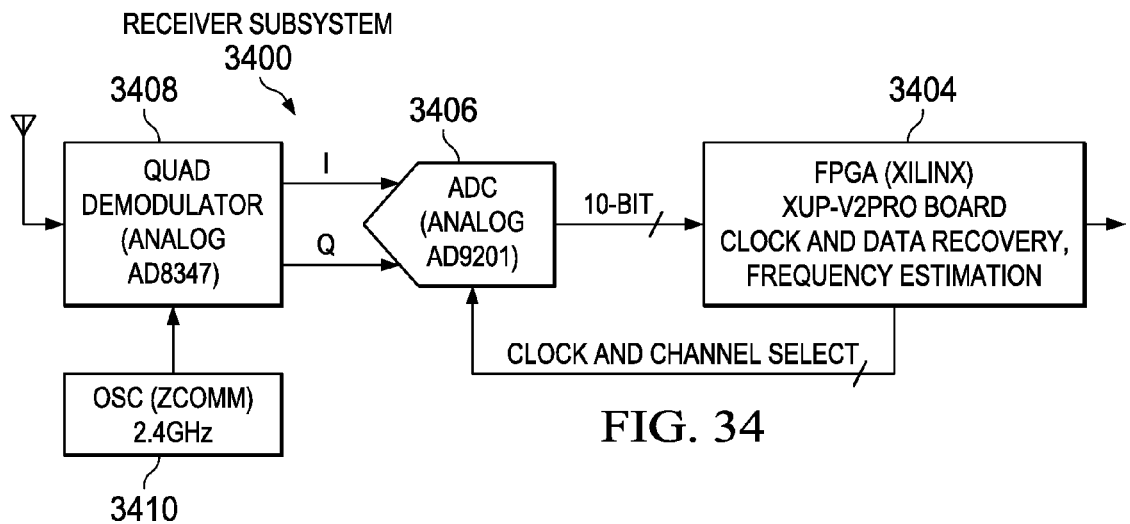
FIG. 34 is a block diagram of a receiver subsystem using multiple level overlay.

Referring now to FIGS. 33 and 34, there are more particularly illustrated the transmit subsystem (FIG. 33) and the receiver subsystem (FIG. 34). The transceiver is realized using basic building blocks available as Commercially Off The Shelf products. Modulation, demodulation and Special Hermite correlation and de-correlation are implemented on a FPGA board. The FPGA board 3402 at the receiver 3400 estimated the frequency error and recovers the data clock (as well as data), which is used to read data from the analog-to-digital (ADC) board 3406. The FGBA board 3400 also segments the digital I and Q channels.

On the transmitter side 3300, the FPGA board 3302 realizes the special hermite correlated QAM signal as well as the necessary control signals to control the digital-to-analog (DAC) boards 3304 to produce analog I&Q baseband channels for the subsequent up conversion within the direct conversion quad modulator 3306. The direct conversion quad modulator 3306 receives an oscillator signal from oscillator 3308.

The ADC 3406 receives the I&Q signals from the quad demodulator 3408 that receives an oscillator signal from 3410.

Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 35:
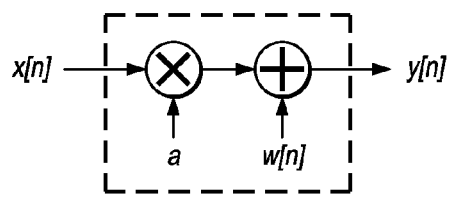
FIG. 35 illustrates an equivalent discreet time orthogonal channel of modified multiple level overlay.

Referring now to FIG. 35, consider the equivalent discrete time system, and obtain the Shannon capacity for that system (will be denoted by Cd). Regarding the discrete time system, for example, for conventional QAM systems in AWGN, the system will be:

$$y[n]=ax[n]+w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d = \log_2(1+|a|^2/\sigma^2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W=C_d/(TW) \text{ bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 36:
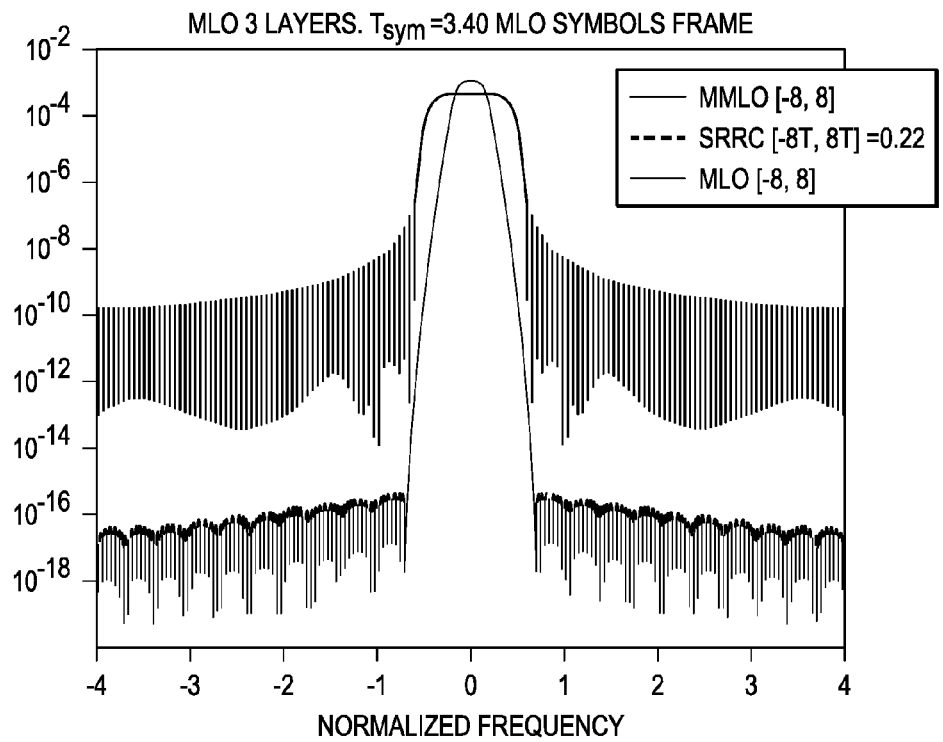
FIG. 36 illustrates the PSDs of multiple layer overlay, modified multiple layer overlay and square root raised cosine.
Figure 37:
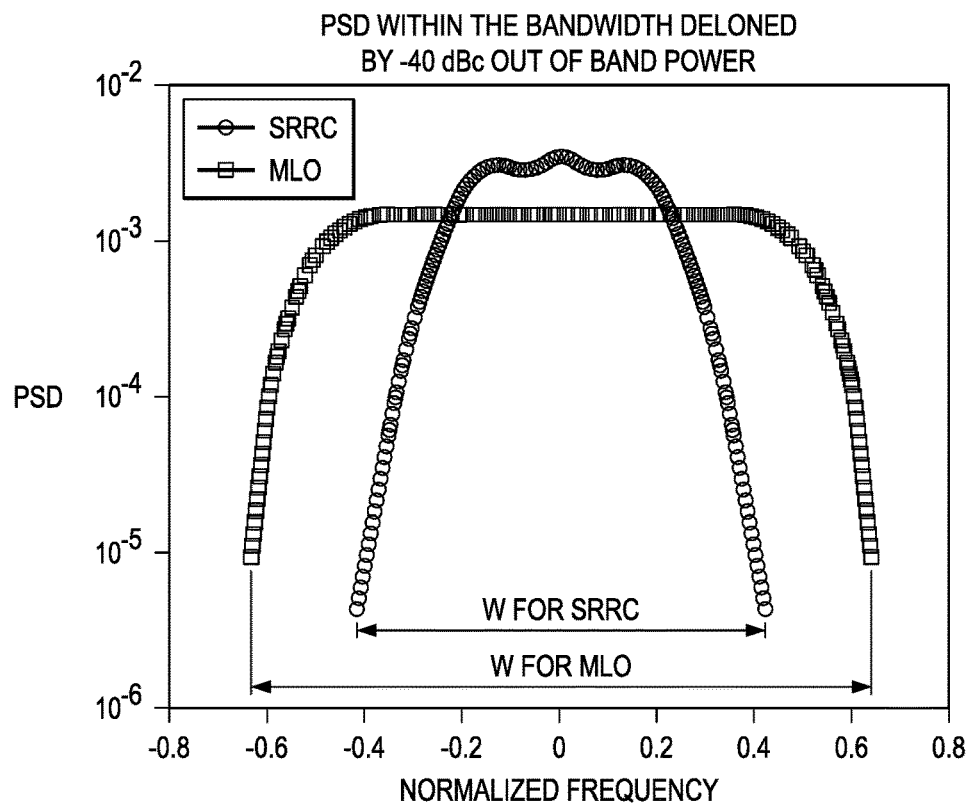
FIG. 37 illustrates a bandwidth comparison based on −40 dBc out of band power bandwidth between multiple layer overlay and square root raised cosine.

Referring now to FIG. 36, there is illustrated a PSD plot (BLANK) of MLO, modified MLO (MMLO) and square root raised cosine (SRRC). From the illustration in FIG. 36, demonstrates the better localization property of MLO. An advantage of MLO is the bandwidth. FIG. 36 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 37. The ratio of the bandwidths is about 1.536. Thus, there is significant room for improvement in spectral efficiency.

Figure 38:
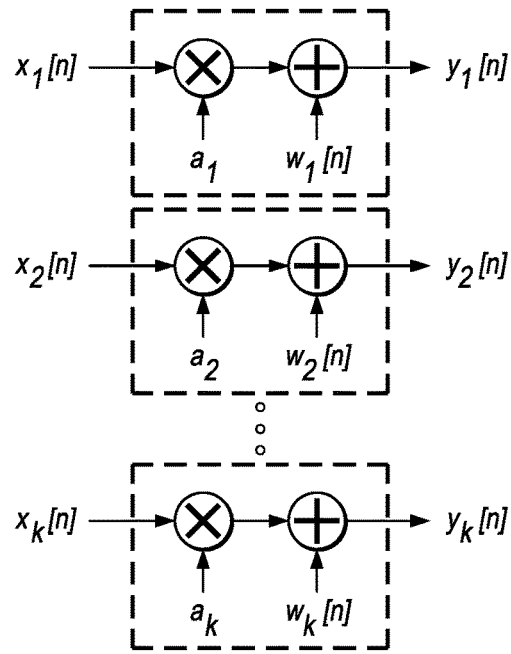
FIG. 38 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 38. The outputs provide equivalent discrete time parallel orthogonal channels of MMLO.

Figure 39:
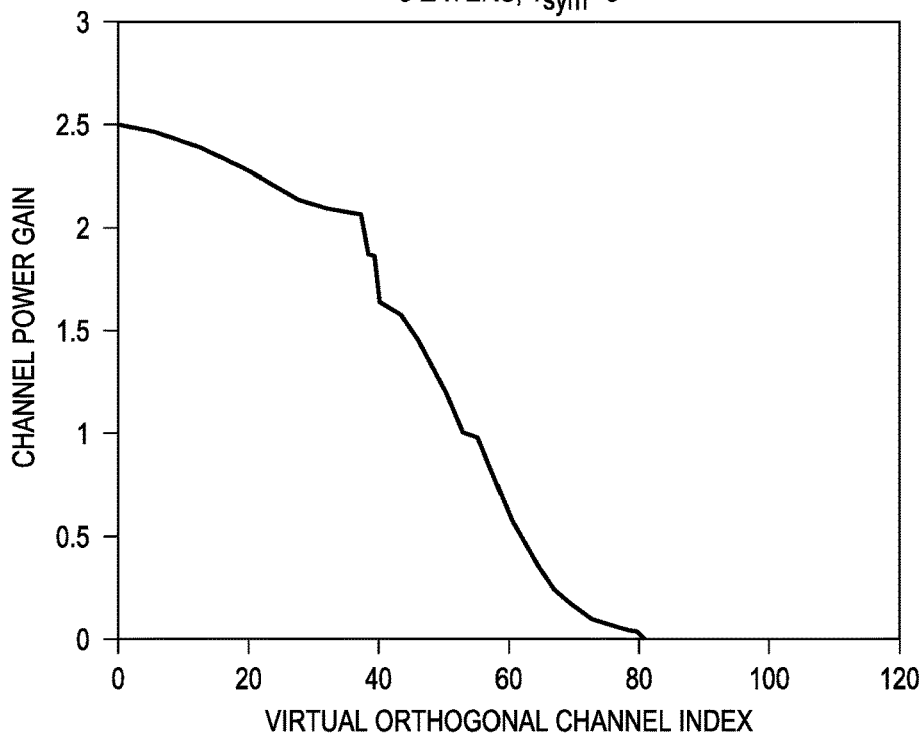
FIG. 39 illustrates the channel power gain of the parallel orthogonal channels of modified multiple layer overlay with three layers and $T_{sym}=3$.

Note that the intersymbol interference caused pulse overlapping of MLO has been addressed by the parallel orthogonal channel conversion. As an example, the power gain of a parallel orthogonal virtual channel of MMLO with three layers and 40 symbols per block is illustrated in FIG. 39. FIG. 39 illustrates the channel power gain of the parallel orthogonal channels of MMLO with three layers and $T_{sim}$=3. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d = \sum_{k=1}^{k} \log_2\left(1 + \frac{P_k|a_k|^2}{\sigma_k^2}\right) \text{ bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block} = (N-1)T_{mlo} + 2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo} T_{block}} = \frac{1}{W_{mmlo}\{(N-1)T_{mlo} + 2t_1\}} \sum_{k=1}^{K} \log_2\left(1 + \frac{P_k|a_k|^2}{\sigma_k^2}\right) \frac{bps}{Hz}$$

Figure 40:
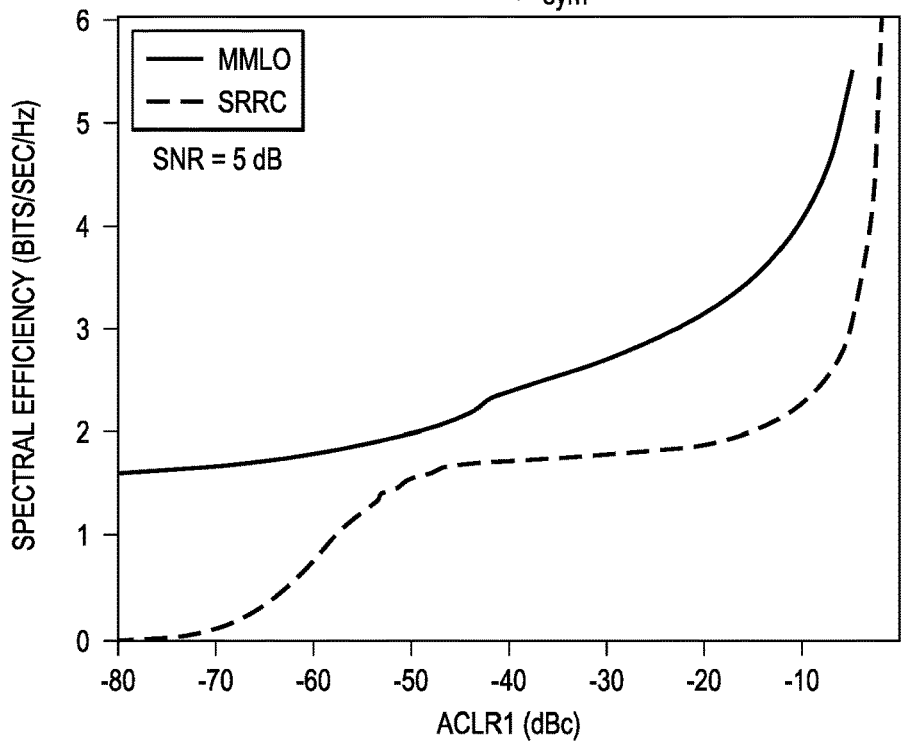
FIG. 40 illustrates a spectral efficiency comparison based on ACLR1 between modified multiple layer overlay and square root raised cosine.
Figure 41:
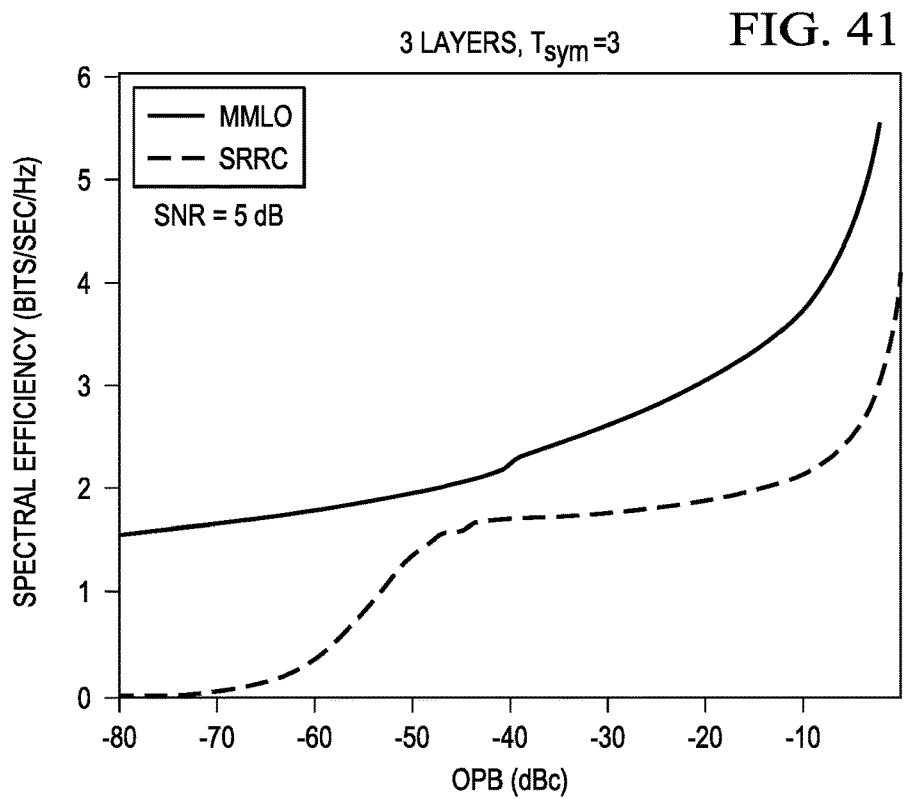
FIG. 41 illustrates a spectral efficiency comparison between modified multiple layer overlay and square root raised cosine based on OBP.

FIGS. 40-41 show the spectral efficiency comparison of MMLO with N=40 symbols per block, L=3 layers, $T_{mlo}$=3, $t_1$=8, and SRRC with duration [−8T, 8T], T=1, and the roll-off factor β=0.22, at SNR of 5 dB. Two bandwidth definitions based on ACLR1 (first adjacent channel leakage power ratio) and OBP (out of band power) are used.

Figure 42:
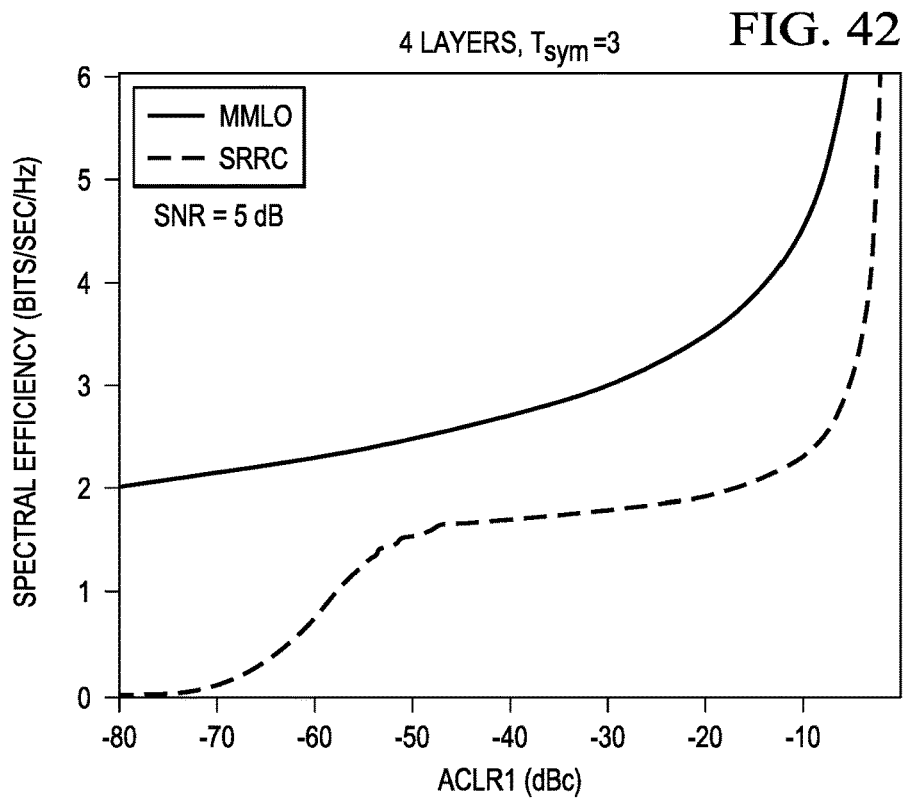
FIG. 42 illustrates a spectral efficiency comparison based on ACLR1 between modified multiple layer overlay and square root raised cosine.
Figure 43:
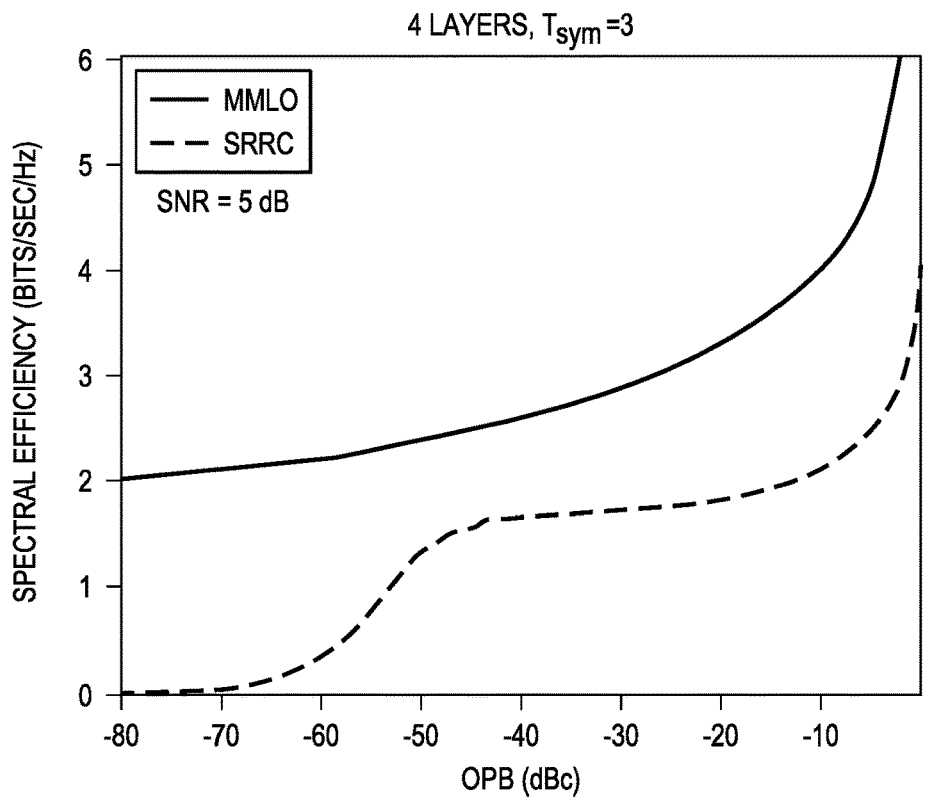
FIG. 43 illustrates a spectral efficiency comparison based on OBP between modified multiple layer overlay and square root raised cosine.

FIGS. 42-43 show the spectral efficiency comparison of MMLO with L=4 layers. The spectral efficiencies and the gains of MMLO for specific bandwidth definitions are shown in the following tables.

TABLE D

|  | Spectral Efficiency (bps/Hz) based on ACLR1 ≤ 30 dBc per bandwidth | Gain with reference to SRRC |
|---|---|---|
| SRRC | 1.7859 | 1 |
| MMLO (3 layers, Tmlo = 3) | 2.7928 | 1.5638 |
| MMLO (4 layers, Tmlo = 3) | 3.0849 | 1.7274 |

TABLE E

|  | Spectral Efficiency (bps/Hz) based on OBP ≤ −40 dBc | Gain with reference to SRRC |
|---|---|---|
| SRRC | 1.7046 | 1 |
| MMLO (3 layers, Tmlo = 3) | 2.3030 | 1.3510 |
| MMLO (4 layers, Tmlo = 3) | 2.6697 | 1.5662 |

Figure 44:
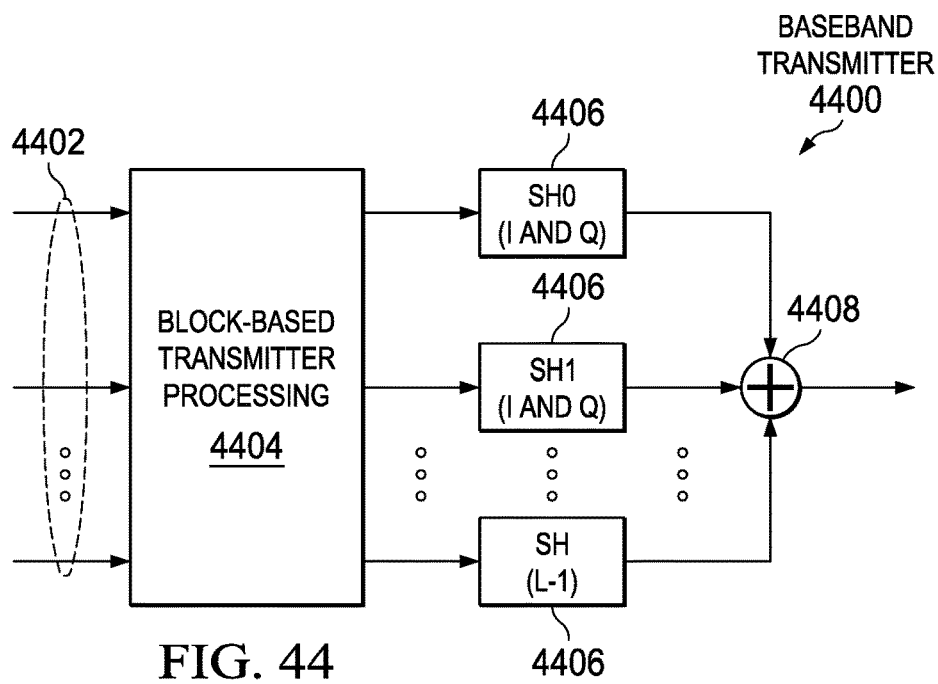
FIG. 44 illustrates a block diagram of a baseband transmitter for a low pass equivalent modified multiple layer overlay system.
Figure 45:
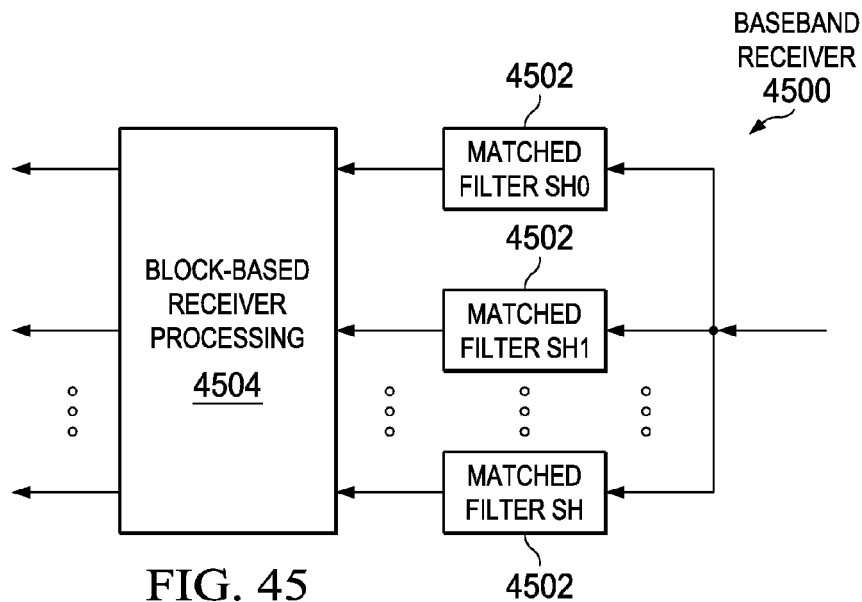
FIG. 45 illustrates a block diagram of a baseband receiver for a low pass equivalent modified multiple layer overlay system.

Referring now to FIGS. 44 and 45, there are provided basic block diagrams of low-pass-equivalent MMLO transmitters (FIG. 44) and receivers (FIG. 45). The low-pass-equivalent MMLO transmitter 4400 receives a number of input signals 4402 at a block-based transmitter processing 4404. The transmitter processing outputs signals to the SH(L−1) blocks 4406 which produce the I&Q outputs. These signals are then all combined together at a combining circuit 4408 for transmission.

Within the baseband receiver (FIG. 45) 4500, the received signal is separated and applied to a series of match filters 4502. The outputs of the match filters are then provided to the block-based receiver processing block 4504 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), . . . , c(L−1, 0), c(0,1), c(1,1), . . . , c(L−1, 1), . . . , c(L−1, N−1)]T. Then the outputs of the receiver matched filters for that transmitted block in an AWGN channel, defined by the column vector y of length NL, can be given as y=H c+n, where H is an NL×NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly-varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi}\, n!\, 2^n}} H_n(\alpha t) e^{-\frac{\alpha^2 t^2}{2}}$$

where Hn(αt) is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE F

| % of Pulse Overlapping | $T_{sym}$ | $T_p$ |
|---|---|---|
| 0% | 16 | 16 |
| 12.5% | 14 | 16 |
| 18.75% | 13 | 16 |
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t)$$

where $s(t) \equiv$ real signal $\sigma(t) \equiv$ imaginary signal (quadrature)

$$\sigma(t) = \frac{1}{\pi}\int_{-\infty}^{\infty} s(\tau)\frac{d\tau}{\tau - t}$$

$$s(t) = -\frac{1}{\pi}\int_{-\infty}^{\infty} \sigma(\tau)\frac{d\tau}{\tau - t}$$

Where s(t) and σ(t) are Hilbert transforms of one another and since σ(t) is quadratures of s(t), they have similar spectral components. That is if they were the amplitudes of sound waves, the ear could not distinguish one form from the other.

Let us also define the Fourier transform pairs as follows:

$$\psi(t) = \frac{1}{\pi}\int_{-\infty}^{\infty} \varphi(f)e^{j\omega t}df$$

$$\varphi(f) = \frac{1}{\pi}\int_{-\infty}^{\infty} \psi(t)e^{-j\omega t}dt$$

$\psi^*(t)\psi(t) = [s(t)]^2 + [\sigma(t)]^2 + \ldots \equiv$ signal power

Let's also normalize all moments to $M_0$:

$$M_0 = \int_0^T s(t)dt$$

$$M_0 = \int_0^T \varphi^*\varphi df$$

Then the moments are as follows:

$$M_0 = \int_0^T s(t)dt$$

$$M_1 = \int_0^T ts(t)dt$$

$$M_2 = \int_0^T t^2 s(t)dt$$

$$M_{N-1} = \int_0^T t^{N-1} s(t)dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore we can now represent the above moments using the orthogonal function ψ with the following moments:

$$\bar{t} = \frac{\int \psi^*(t)t\psi(t)dt}{\int \psi^*(t)\psi(t)dt}$$

$$\overline{t^2} = \frac{\int \psi^*(t)t^2\psi(t)dt}{\int \psi^*(t)\psi(t)dt}$$

$$\overline{t^n} = \frac{\int \psi^*(t)t^n\psi(t)dt}{\int \psi^*(t)\psi(t)dt}$$

Similarly, $$\bar{f} = \frac{\int \varphi^*(f)f\varphi(f)df}{\int \varphi^*(f)\varphi(f)df}$$

$$\overline{f^2} = \frac{\int \varphi^*(f)f^2\varphi(f)df}{\int \varphi^*(f)\varphi(f)df}$$

$$\overline{f^n} = \frac{\int \varphi^*(f)f^n\varphi(f)df}{\int \varphi^*(f)\varphi(f)df}$$

If we did not use complex signal, then:

$$\bar{f} = 0$$

To represent the mean values from time to frequency domains, replace:

$$\varphi(f) \to \psi(t)$$

$$f \to \frac{1}{2\pi j}\frac{d}{dt}$$

These are equivalent to somewhat mysterious rule in quantum mechanics where classical momentum becomes an operator:

$$P_x \to \frac{h}{2\pi j}\frac{\partial}{\partial x}$$

Therefore using the above substitutions, we have:

$$\bar{f} = \frac{\int \varphi^*(f)f\varphi(f)df}{\int \varphi^*(f)\varphi(f)df} = \frac{\int \psi^*(t)\left(\frac{1}{2\pi j}\right)\frac{d\psi(t)}{dt}dt}{\int \psi^*(t)\psi(t)dt} = \left(\frac{1}{2\pi j}\right)\frac{\int \psi^* \frac{d\psi}{dt}dt}{\int \psi^*\psi dt}$$

And:

$$\overline{f^2} = \frac{\int \varphi^*(f)f^2\varphi(f)df}{\int \varphi^*(f)\varphi(f)df} = \frac{\int \psi^*\left(\frac{1}{2\pi j}\right)^2\frac{d^2}{dt^2}dt}{\int \psi^*\psi dt} = -\left(\frac{1}{2\pi j}\right)^2\frac{\int \psi^*\frac{d^2}{dt^2}dt}{\int \psi^*\psi dt}$$

$$\overline{t^2} = \frac{\int \psi^* t^2 \psi dt}{\int \psi^*\psi dt}$$

We can now define an effective duration and effective bandwidth as:

$$\Delta t = \sqrt{2\pi \overline{(t-\bar{t})^2}} = 2\pi \cdot \text{rms in time}$$

$$\Delta f = \sqrt{2\pi \overline{(f-\bar{f})^2}} = 2\pi \cdot \text{rms in frequency}$$

But we know that:

$$\overline{(t-\bar{t})^2} = \overline{t^2} - (\bar{t})^2$$

$$\overline{(f-\bar{f})^2} = \overline{f^2} - (\bar{f})^2$$

We can simplify if we make the following substitutions:

$$\tau = t - \bar{t}$$

$$\Psi(\tau) = \psi(t)e^{-j\omega_0 \tau}$$

$$\omega_0 = \bar{\omega} = 2\pi\bar{f} = 2\pi f_0$$

We also know that:

$$(\Delta t)^2(\Delta f)^2 = (\Delta t \Delta f)^2$$

And therefore:

$$(\Delta t \Delta f)^2 = \frac{1}{4}\left[4\frac{\int \Psi^*(\tau)\tau^2 \Psi(\tau)d\tau \int \frac{d\Psi^*}{d\tau}\frac{d\Psi}{d\tau}d\tau}{(\int \Psi^*(\tau)\psi(\tau)d\tau)^2}\right] \geq \left(\frac{1}{4}\right)$$

-continued $$(\Delta t \Delta f) \geq \left(\frac{1}{2}\right)$$

Now instead of $$(\Delta t \Delta f) \geq \left(\frac{1}{2}\right)$$

we are interested to force the equality $$(\Delta t \Delta f) = \left(\frac{1}{2}\right)$$

and see what signals satisfy the equality. Given the fixed bandwidth Δf, the most efficient transmission is one that minimizes the time-bandwidth product $$(\Delta t \Delta f) = \left(\frac{1}{2}\right)$$

For a given bandwidth Δf, the signal that minimizes the transmission in minimum time will be a Gaussian envelope. However, we are often given not the effective bandwidth, but always the total bandwidth $f_2-f_1$. Now, what is the signal shape which can be transmitted through this channel in the shortest effective time and what is the effective duration?

$$\Delta t == \frac{\frac{1}{(2\pi)^2}\int_{f_1}^{f_2}\frac{d\varphi^*}{df}\frac{d\varphi}{df}}{\int_{f_1}^{f_2}\varphi^*\varphi df} \to \min$$

Where φ(f) is zero outside the range $f_2-f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2}\left(\frac{d\varphi^*}{df}\frac{d\varphi}{df} + \Lambda \varphi^*\varphi\right)df = 0$$

First Trem $$\delta \int_{f_1}^{f_2}\frac{d\varphi^*}{df}\frac{d\varphi}{df}df =$$

$$\int\left(\frac{d\varphi^*}{df}\delta\frac{d\varphi}{df} + \frac{d\varphi}{df}\delta\frac{d\varphi^*}{df}\right)df = \int\left(\frac{d\varphi^*}{df}\frac{d\delta\varphi}{df} + \frac{d\varphi}{df}\frac{d\delta\varphi^*}{df}\right)df =$$

$$\left[\frac{d\varphi^*}{df}\delta\varphi + \frac{d\varphi}{df}\delta\varphi^*\right]_{f_1}^{f_2} - \int\left(\frac{d^2\varphi^*}{df^2}\delta\varphi + \frac{d^2\varphi}{df^2}\delta\varphi^*\right)df =$$

$$\int\left(\frac{d^2\varphi^*}{df^2}\delta\varphi + \frac{d^2\varphi}{df^2}\delta\varphi^*\right)df$$

Second Trem $$\delta \int_{f_1}^{f_2}(\Lambda \varphi^*\varphi)df = \Lambda \int_{f_1}^{f_2}(\varphi^*\delta\varphi + \varphi\delta\varphi^*)df$$

-continued

Both Trems $$= \int \left[ \left( \frac{d^2\varphi^*}{df^2} + \Lambda\varphi^* \right)\delta\varphi + \left( \frac{d^2\varphi}{df^2} + \Lambda\varphi \right)\delta\varphi^* \right] df = 0$$

This is only possible if and only if:

$$\left( \frac{d^2\varphi}{df^2} + \Lambda\varphi \right) = 0$$

The solution to this is of the form $$\varphi(f) = \sin k\pi \left( \frac{f - f_1}{f_2 - f_1} \right)$$

Now if we require that the wave vanishes at infinity, but still satisfy the minimum time-bandwidth product:

$$(\Delta t \Delta f) = \left( \frac{1}{2} \right)$$

Then we have the wave equation of a Harmonic Oscillator:

$$\frac{d^2 \Psi(\tau)}{d\tau^2} + (\lambda - \alpha^2 \tau^2)\Psi(\tau) = 0$$

which vanishes at infinity only if:

$$\lambda = \alpha(2n+1)$$

$$\psi_n = e^{-\frac{1}{2}\omega^2 \tau^2} \frac{d^n}{d\tau^n} e^{-\alpha^2 \tau^2} \propto H_n(\tau)$$

Where $H_n(\tau)$ is the Hermit functions and:

$(\Delta t \Delta f) = \frac{1}{2}(2n+1)$

So Hermit functions $H_n(\tau)$ occupy information blocks of 1/2, 3/2, 5/2, . . . with 1/2 as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\hbar}} \left( x + \frac{ip}{m\omega'} \right)$$

$$b^+ = \sqrt{\frac{m\omega'}{2\hbar}} \left( x - \frac{ip}{m\omega'} \right)$$

$[b, b^+] = 1$ $a = \lambda b - \mu b^+$ $a^+ = \lambda b^+ - \mu b$

Now we are ready to define $\Delta x$ and $\Delta p$ as:

$$(\Delta x)^2 = \frac{\hbar}{2m\omega}\left(\frac{\omega}{\omega'}\right) = \frac{\hbar}{2m\omega}(\lambda - \mu)^2$$

$$(\Delta p)^2 = \frac{\hbar m \omega}{2}\left(\frac{\omega'}{\omega}\right) = \frac{\hbar m \omega}{2}(\lambda + \mu)^2$$

$$(\Delta x)^2 (\Delta p)^2 = \frac{\hbar^2}{4}(\lambda^2 - \mu^2)^2$$

$$\Delta x \Delta p = \frac{\hbar}{2}(\lambda^2 - \mu^2) = \frac{\hbar}{2}$$

Now let parameterize differently and instead of two variables $\lambda$ and $\mu$, we would use only one variable $\xi$ as follows:

$\lambda = \sin h\xi$ $\mu = \cos h\xi$ $\lambda + \mu = e^\xi$ $\lambda - \mu = -e^{-\xi}$ Now the Eigen states of the squeezed case are:

$b|\beta\rangle = \beta|\beta\rangle$ $(\lambda a + \mu a^+)|\beta\rangle = \beta|\beta\rangle$ $b = UaU^+$ $U = e^{\xi/2(a^2 - a^{+2})}$ $U^+(\xi)aU(\xi) = a\cos h\xi - a^+ \sin h\xi$ $U^+(\xi)a^+U(\xi) = a^+ \cos h\xi - a \sin h\xi$ We can now consider the squeezed operator:

$|\alpha, \xi\rangle = U(\xi)D(\alpha)|0\rangle$ $$D(\alpha) = e^{\frac{-|\alpha|^2}{2}} e^{\alpha a^+} e^{-\alpha^* a}$$

$$|\alpha\rangle = \sum_{n=0}^{\infty} \frac{\alpha^n}{\sqrt{n!}} e^{\frac{-|\alpha|^2}{2}} |n\rangle$$

$$|\alpha\rangle = e^{\frac{-|\alpha|^2}{2} + \alpha a^+} |0\rangle$$

For a distribution P(n) we would have:

$P(n) = |\langle n||\beta, \xi\rangle|^2$ $$\langle \alpha||\beta, \xi\rangle = \sum_{n=0}^{\infty} \frac{\alpha^n}{\sqrt{n!}} e^{\frac{-|\alpha|^2}{2}} \langle n||\beta, \xi\rangle$$

$$e^{2zt - t^2} = \sum_{n=0}^{\infty} \frac{H_n(z) t^n}{n!}$$

Therefore the final result is:

$$\boxed{\langle n||\beta, \xi\rangle = \frac{(\tanh \xi)^{n/2}}{2^{n/2}(n!\cosh\xi)^{\frac{1}{2}}} e^{-1/2(|\beta|^2 - \beta^2 \tanh\xi)} H_n\left(\frac{\beta}{2\sinh\xi \cosh\xi}\right)}$$

Free Space Communications

Figure 46:
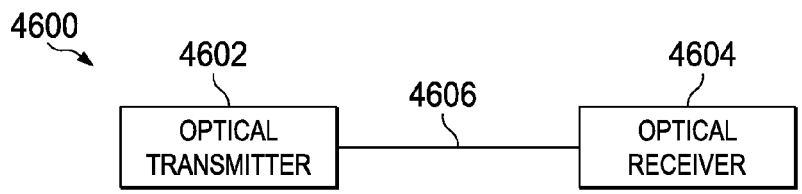
FIG. 46 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 46, there is illustrated an example of the operation of a free-space communication system. The free-space communication system utilizes a free-space optics transmitter 4602 that transmits a light beam 4606 to a free-space optics receiver 4604. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 4602 and a receiver 4604. Free-space optics uses the same concepts as fiber-optics, except without the use of a fiber-optic cable. Free-space optics systems provide the light beam 4606 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground based lasers were seen from 6,000,000 kilometers by the outbound probe in 1992. Researchers used a white LED based space lighting system for indoor local area network communications.

Figure 47:
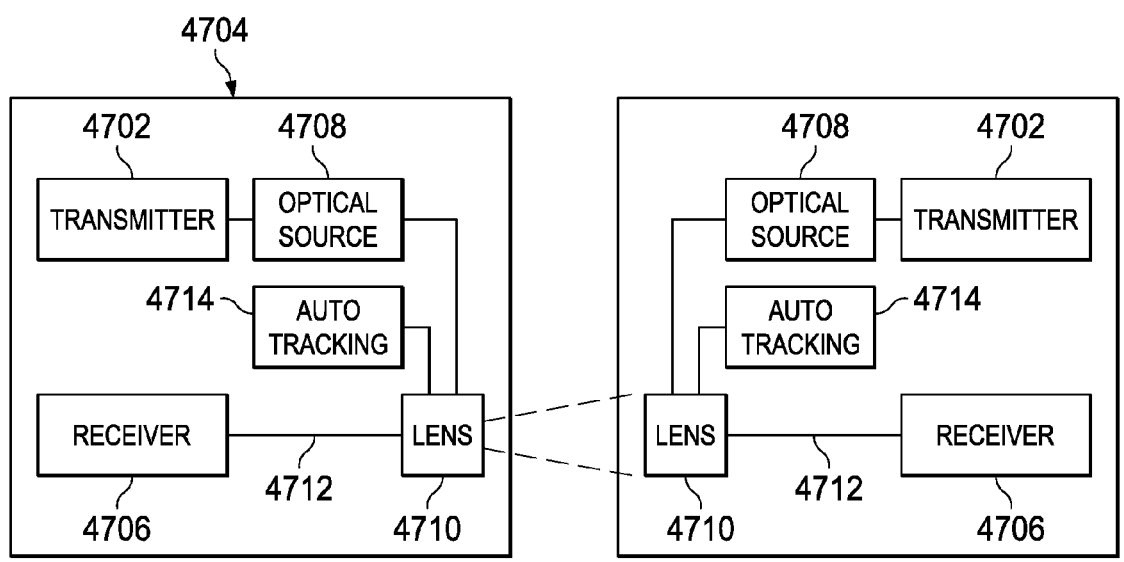
FIG. 47 illustrates a block diagram of a free-space optics system using orbital angular momentum and multi-level overlay modulation.

Referring now to FIG. 47, there is illustrated a block diagram of a free-space optics system using orbital angular momentum and multilevel overlay modulation according to the present disclosure. The OAM twisted signals, in addition to being transmitted over fiber, may also be transmitted using free optics. In this case, the transmission signals are generated within transmission circuitry 4702 at each of the FSO transceivers 4704. Free-space optics technology is based on the connectivity between the FSO based optical wireless units, each consisting of an optical transceiver 4704 with a transmitter 4702 and a receiver 4706 to provide full duplex open pair and bidirectional closed pairing capability. Each optical wireless transceiver unit 4704 additionally includes an optical source 4708 plus a lens or telescope 4710 for transmitting light through the atmosphere to another lens 4710 receiving the information. At this point, the receiving lens or telescope 4710 connects to a high sensitivity receiver 4706 via optical fiber 4712. The transmitting transceiver 4704a and the receiving transceiver 4704b have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 4714 that maintains a tightly focused beam on the receiving transceiver 3404b, even when the transceivers are mounted on tall buildings or other structures that sway.

The modulated light source used with optical source 4708 is typically a laser or light emitting diode (LED) providing the transmitted optical signal that determines all the transmitter capabilities of the system. Only the detector sensitivity within the receiver 4706 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 4708 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 4708.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 4708. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 4714. Class 1 lasers are safe under reasonably foreseeable operating conditions including the use of optical instruments for intrabeam viewing. Class 1 systems can be installed at any location without restriction.

Another potential optical source 4708 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 4708 are illustrated in Table G below.

TABLE G

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradeable and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter, but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Referring now to FIGS. 48A through 48D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

Figure 48A:
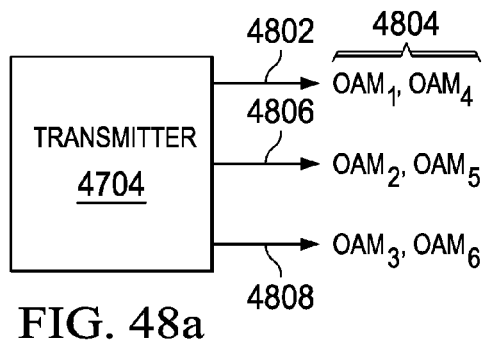
FIGS. 48A-48C illustrate the manner for multiplexing multiple data channels into optical links to achieve higher data capacity.
Figure 48B:
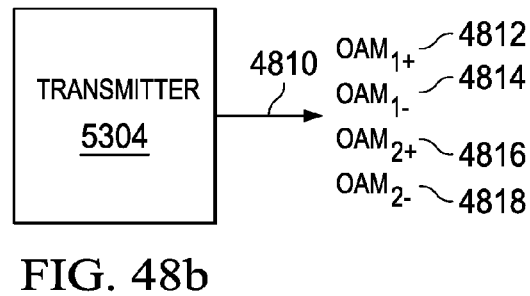

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 48A through 48D include a combination of multiple beams 4802 having multiple different OAM values 4804 on each wavelength. Thus, beam 4802 includes OAM values, OAM1 and OAM4. Beam 4806 includes OAM value 2 and OAM value 5. Finally, beam 4808 includes OAM3 value and OAM6 value. Referring now to FIG. 48B, there is illustrated a single beam wavelength 4810 using a first group of OAM values 4812 having both a positive OAM value 4812 and a negative OAM value 4814. Similarly, OAM2 value may have a positive value 4816 and a negative value 4818 on the same wavelength 4810.

Figure 48C:
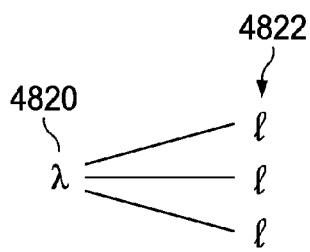
Figure 48D:
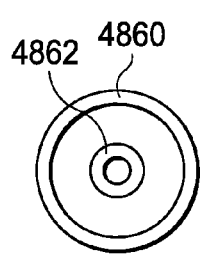
FIG. 48D illustrates groups of concentric rings for a wavelength having multiple OAM valves.

FIG. 48C illustrates the use of a wavelength 4820 having polarization multiplexing of OAM value. The wavelength 4820 can have multiple OAM values 4822 multiplexed thereon. The number of available channels can be further increased by applying left or right handed polarization to the OAM values. Finally, FIG. 48D illustrates two groups of concentric rings 4860, 4862 for a wavelength having multiple OAM values.

Figure 49:
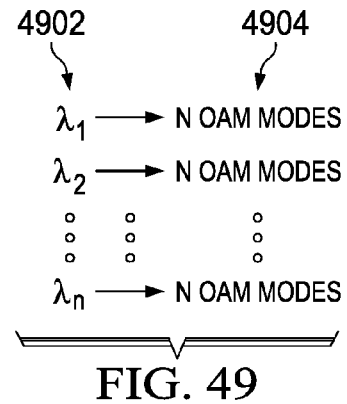
FIG. 49 illustrates a WDM channel containing many orthogonal OAM beams.

Wavelength distribution multiplexing (WDM) has been widely used to improve the optical communication capacity within both fiber-optic systems and free-space communication system. OAM mode multiplexing and WDM are mutually orthogonal such that they can be combined to achieve a dramatic increase in system capacity. Referring now to FIG. 49, there is illustrated a scenario where each WDM channel 4902 contains many orthogonal OAM beam 4904. Thus, using a combination of orbital angular momentum with wave division multiplexing, a significant enhancement in communication link to capacity may be achieved.

Current optical communication architectures have considerable routing challenges. A routing protocol for use with free-space optic system must take into account the line of sight requirements for optical communications within a free-space optics system. Thus, a free-space optics network must be modeled as a directed hierarchical random sector geometric graph in which sensors route their data via multi-hop paths to a base station through a cluster head. This is a new efficient routing algorithm for local neighborhood discovery and a base station uplink and downlink discovery algorithm. The routing protocol requires order $O \log(n)$ storage at each node versus order $O(n)$ used within current techniques and architectures.

Current routing protocols are based on link state, distance vectors, path vectors, or source routing, and they differ from the new routing technique in significant manners. First, current techniques assume that a fraction of the links are bidirectional. This is not true within a free-space optic network in which all links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 50:
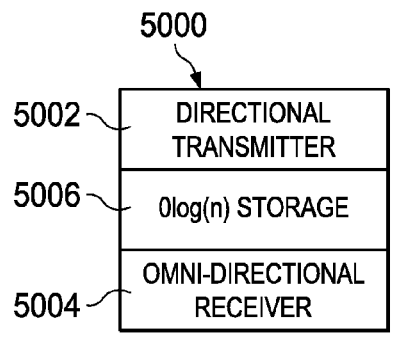
FIG. 50 illustrates a node of a free-space optical system.

Recent studies have considered the effect of unidirectional links and report that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Referring now to FIG. 50, the simplest and most efficient solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 51:
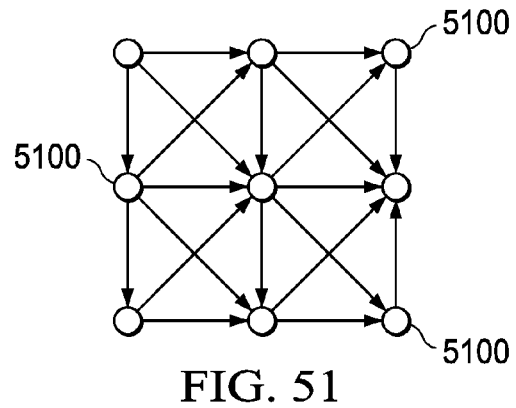
FIG. 51 illustrates a network of nodes within a free-space optical system.

Within a network using only unidirectional links such as a free-space optical network, systems such as that illustrated in FIGS. 50 and 51 would be more applicable. Nodes within a unidirectional network utilize a directional transmit 5002 transmitting from the node 5000 in a single, defined direction. Additionally, each node 5000 includes an omnidirectional receiver 5004 which can receive a signal coming to the node in any direction. Also, as discussed here and above, the node 5000 would also include a 0 log(n) storage 5006. Thus, each node 5000 provide only unidirectional communications links. Thus, a series of nodes 5100 as illustrated in FIG. 51 may unidirectionally communicate with any other node 5100 and forward communication from one desk location to another through a sequence of interconnected nodes.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 17E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave (l=0) to a twisted wave of a specific helicity (i.e. l=+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 52:
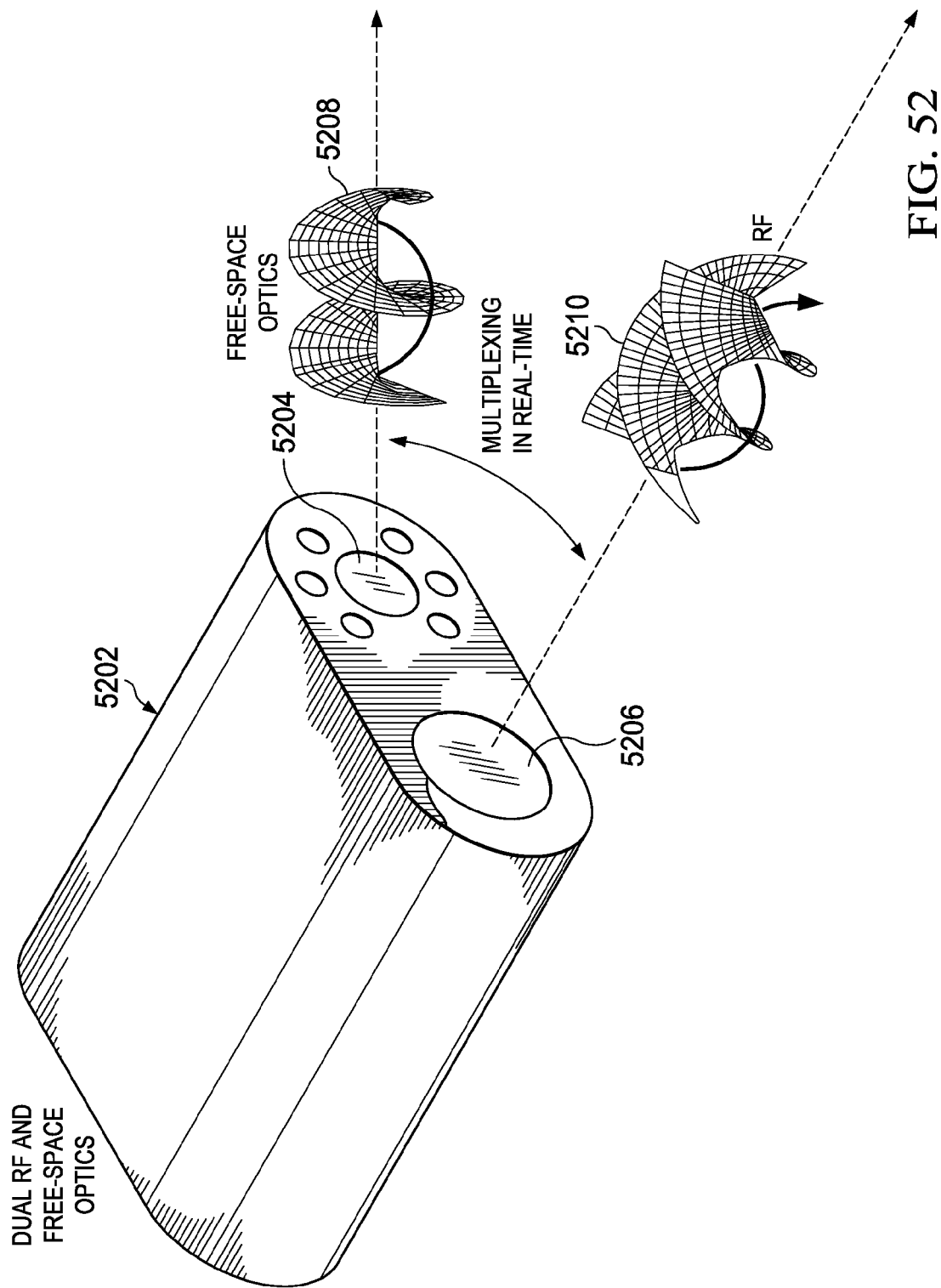
FIG. 52 illustrates a system for multiplexing between a free space signal and an RF signal.

In a further embodiment illustrated in FIG. 52, both RF signals and free space optics may be implemented within a dual RF and free space optics mechanism 5202. The dual RF and free space optics mechanism 5202 include a free space optics projection portion 5204 that transmits a light wave having an orbital angular momentum applied thereto with multilevel overlay modulation and a RF portion 5206 including circuitry necessary for transmitting information with orbital angular momentum and multilayer overlay on an RF signal 5210. The dual RF and free space optics mechanism 5202 may be multiplexed in real time between the free space optics signal 5208 and the RF signal 5210 depending upon operating conditions. In some situations, the free space optics signal 5208 would be most appropriate for transmitting the data. In other situations, the free space optics signal 5208 would not be available and the RF signal 5210 would be most appropriate for transmitting data. The dual RF and free space optics mechanism 5202 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 53:
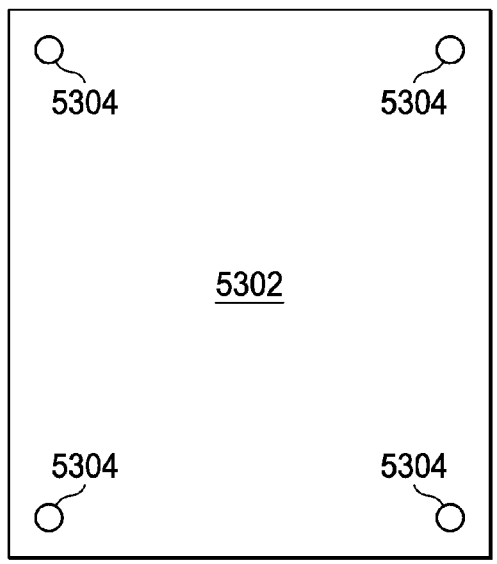
FIG. 53 illustrates alignment holes within a VCSEL.
Figure 54:
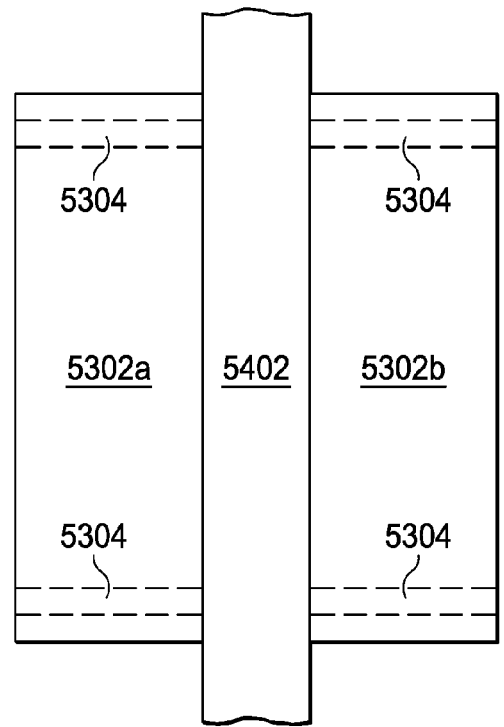
FIG. 54 illustrates the use of alignment holes for aligning optical circuits of VCSELs.

Referring now to referring now to FIG. 53, there is illustrated a VCSEL 5302. Since one VCSEL 5302 is located on the outside of a window and a second VCSEL is located on the inside of the window, there must be some manner for aligning the optical transmission links that are provided from one VCSEL to the other. One manner in which this alignment may be achieved is by having alignment holes 5304 located at multiple positions on the VCSEL 5302. In the embodiment illustrated in FIG. 53, the alignment holes 5304 are located at each corner of the VCSEL 5302. These alignment holes 5304 are used in the manner illustrated in FIG. 54 to align a first VCSEL 5302a with a second VCSEL 5302b. Thus, by visually aligning each of the alignment holes 5304 located at each corner of the VCSEL 5302a and VCSEL 5302b, the optical transmission circuitry within the VCSELs may be aligned.

Figure 55:
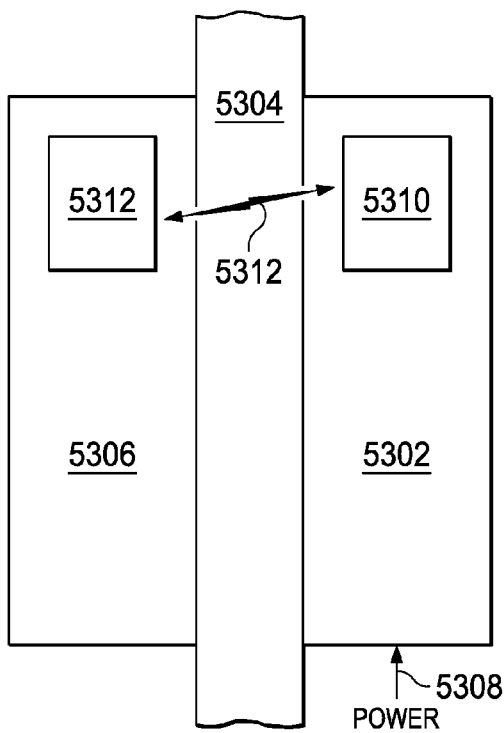
FIG. 55 illustrates optical power coupling between VCSELs.

Rather than using the external power inputs illustrated with respect to FIG. 53, the VCSEL 5302 located on a window may be powered using other methods as illustrated in FIG. 55, FIG. 53 illustrates a VCSEL 5302 on an interior of a window or wall 5304 and a VCSEL 5306 located on an exterior of a window or wall. Power 5308 is provided directly to the internal VCSEL 5302 via some type of input connection. A power coupling device 5310 within the internal VCSEL 5302 couples with a similar power coupling device 5312 within the external VCSEL 5306. If the VCSEL's 5302 and 5304 are located on a transparent window, a photo inductor or other type of optical power coupler may be utilized for power coupling devices 5310 and 5312. If the VCSEL's 5302 and 5304 are located on opposite sides of an opaque wall, inductive coupling devices such as coil and doctors may be used for power coupling devices 5310, 5312. In this manner, the power coupling devices 5310 provides power to the power coupling device 5312 to power the external VCSEL 5306.

Figure 56:
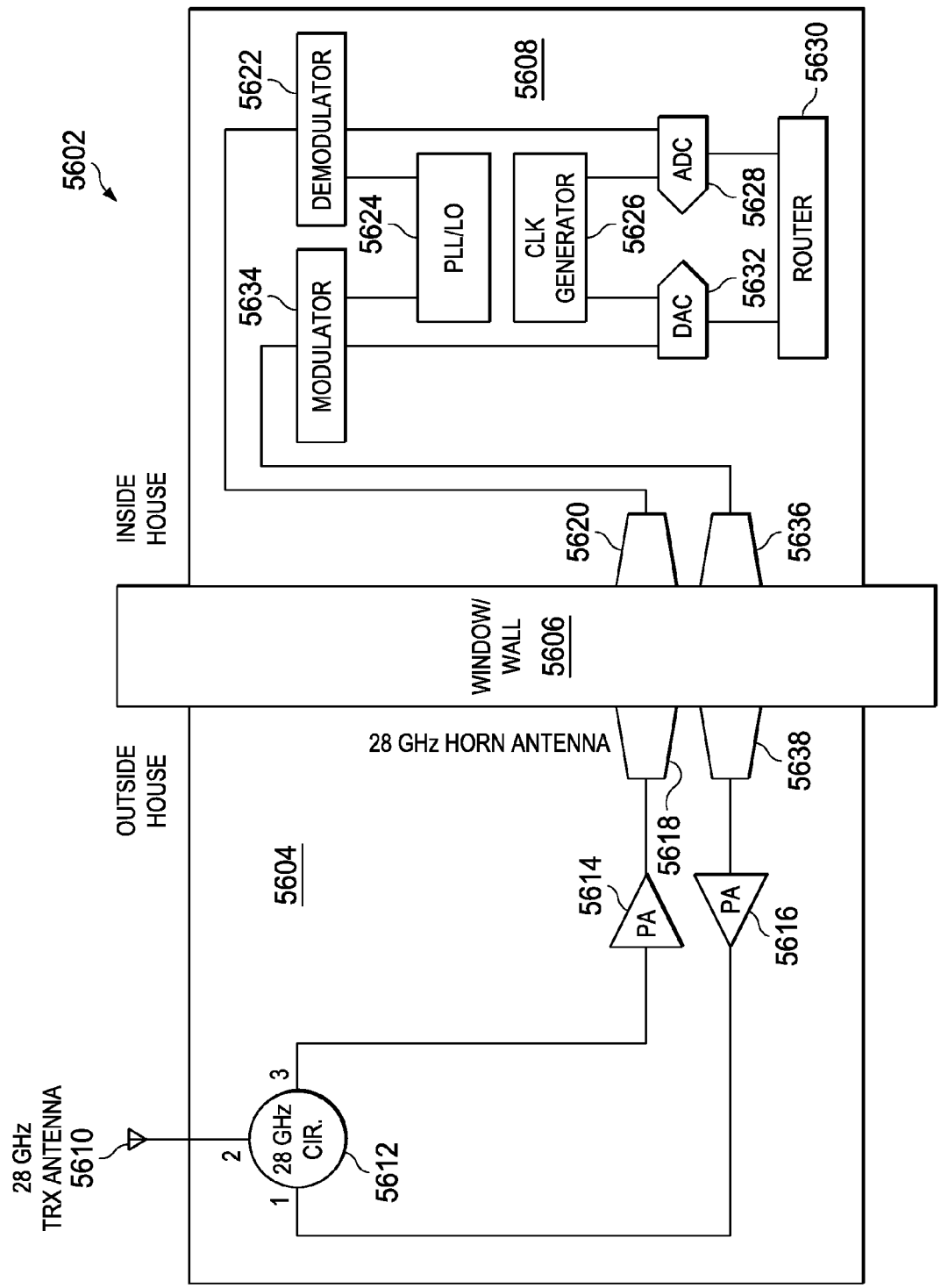
FIG. 56 illustrates an embodiment using horn antennas for transmitting data through a window or wall.

Referring now to FIG. 56, there is illustrated an alternative embodiment wherein rather than using a VCSEL for transmission of the signal through a window or wall, a horn or conical antenna is used for the transmission of signals through the window or wall. The signals transmitted via the horn antennas are amplified for transmission in order to overcome the losses caused by transmission of the signals through the window/wall. The device provides an optical or RF tunnel through the window or wall without requiring the drilling of any holes. The millimeter wave transmission system 5602 includes an exterior portion 5604 located on an exterior of a window or wall 5606 and an interior portion 5608 located on the interior of the wall or window. The exterior portion 5604 includes an antenna 5610 for transmitting and receiving signals to an exterior source. In a preferred embodiment, the antenna comprises a 28 GHz antenna. However, it will be realized by one skilled in the art that other antenna operating bandwidths may be utilized.

The transmitted and received signals are processed at a 28 GHz circulator 5612. The circulator 5612 comprises an RF switch for switching between three ports within the exterior portion 5604 and has good isolation. Within the circulator 5612 signals input at port 2 are output at port 3 and signals input at port 1 are output to port 2. Thus, the signals received by the antenna 5610 are provided to port 2 of the circulator 5612 and output to port 3. The port 3 signals are provided to the input of a power amplifier 5614. Similarly, the output of a power amplifier 5616 is connected to input port 1 such that signals to be transmitted are provided to port 2 of the circulator 5612 for transmission by antenna 5610.

The power amplifier 5612 boosts the signal strength for transmission through the window or wall. The signals output from the power amplifier 5614 are provided to a horn antenna 5618. The horn antenna 5618 transmits to the RF signals provided from the power amplifier 5614 through the window or wall 5606 to a receiving horn antenna 5620. The horn antennas may transmit/receive over a wide frequency band from 24 GHz up to e-band. Within this range a particular band of operation for the horn antennas is utilized. These bands include but are not limited to 24 GHz band; 28 GHz A1 band; 28 GHz B1, A3 and B2 bands; 31 GHz band and 39 GHz band. The horn antennas may also be of different sizes to provide for example 10 db or 20 dB of gain.

The received signals are output from the horn antenna 5620 to demodulator circuit 5622 for demodulation. The demodulator 5622, in addition to receiving the receive signal from for an antenna 5620, receives a signal output from a phase locked loop/local oscillator 5624. The phase locked loop/local oscillator 5624 is controlled responsive to a clock generation circuit 5626. The demodulated signal is provided from the demodulator 5622 to analog-to-digital converter 5628 to generate a digital output. The digital signal is routed via a router 5632 to the appropriate receiving party within the structure.

Signals to be transmitted are received from inside the building at the router 5630. The router 5630 provides digital signals to a digital to analog converter 5632 that converts the digital data signals into an analog format. The analog signals are next modulated by a modulator 5634. The modulator 5634 modulates the signals responsive to input from the phase locked loop/local oscillator 5624 under control of the clock generation circuit 5626. The modulated signals from modulator 5634 are transmitted through the window/wall 5606 using a horn antenna 5636. The signals transmitted by horn antenna 5636 are received by a receiving horn antenna 5638 located on the outside. The output of the horn antenna 5638 is provided to the input of power amplifier 5616 that amplifies the signal for transmission from the antenna 5610 after passing through circulator 5612. While the above discussion has been made with respect to the use of horn antennas for transmission through the window/wall, conical antennas may also be used for the transmissions through the window or wall.

Figure 57:
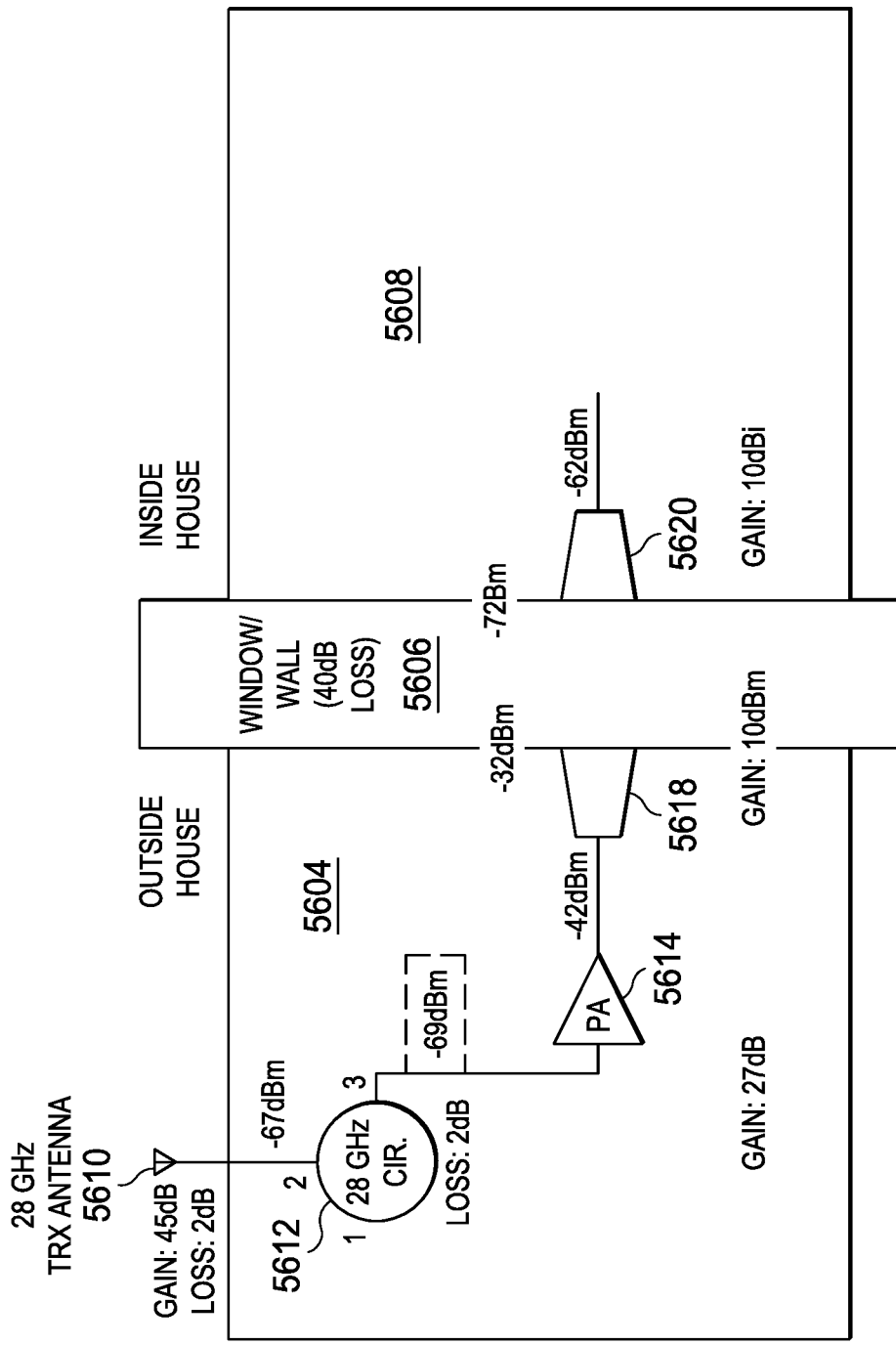
FIG. 57 illustrates a downlink losses in the embodiment of FIG. 56.

Referring now to FIG. 57, there is illustrated the downlink losses between the transmitting antenna 5610 and the receiving circuitry within the inside portion 5608. The signal is received at −110 dBm. The receiving antenna has a gain of 45 dB and a loss of 2 dB. Thus, the signal output from the receiving antenna 5610 has a strength of −67 dBm. The circulator 5612 has a 2 dB loss, and the signal from the circulator 5612 has a strength of −69 dBm. The power amplifier 5614 provides a 27 dB to boost the signal to −42 dBm for transmission across the window/wall. The horn antenna 5618 provides a gain of 10 dBi to transmit the signal at 32 dBm. The window/wall provides a 40 dB loss. The receive horn antenna 5620 receives the signal at −72 dBm and provides a gain of 10 dBi to output the received signal at −62 dBm to the interior circuit components.

Figure 58:
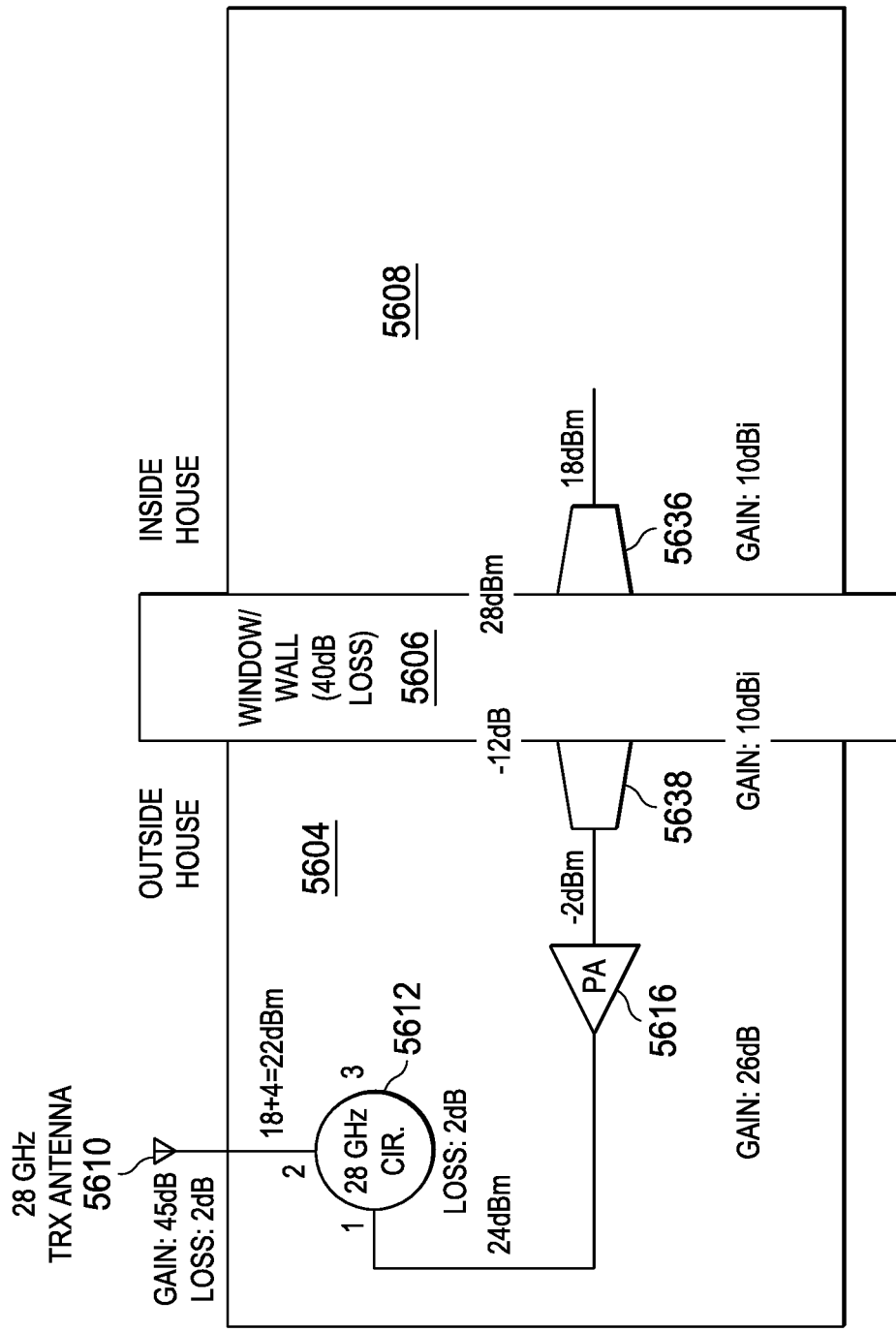
FIG. 58 illustrates up link signal strengths in the embodiment of FIG. 56.

Referring now to FIG. 58, there is illustrated the uplink signal strengths when a power amplifier is located outside the window/wall 5606. The transmitted signal has a strength of 18 dBm prior to reaching the input of the horn antenna 5636. The antenna 5636 provides a gain of 10 dBi to transmit the signal at 28 dBm. The window/wall 5606 causes a 40 dB total loss dropping the signal strength to −12 dB. The horn antenna 5638 provides a 10 dBi gain to the signal and outputs the signal at −2 dBm. The power amplifier 5616 provides a 26 dB gain to output the signal at 24 dBm to the port 1 input of the circulator 5612. The power circulator 5612 provides a further 2 dB loss to output the signal to the antenna 5610 at 22 dBm. The signal is transmitted from the antenna 5610 having a gain of 45 dB and a loss of 2 dB to provide a transmitted signal strength of 65 dBm.

Figure 59:
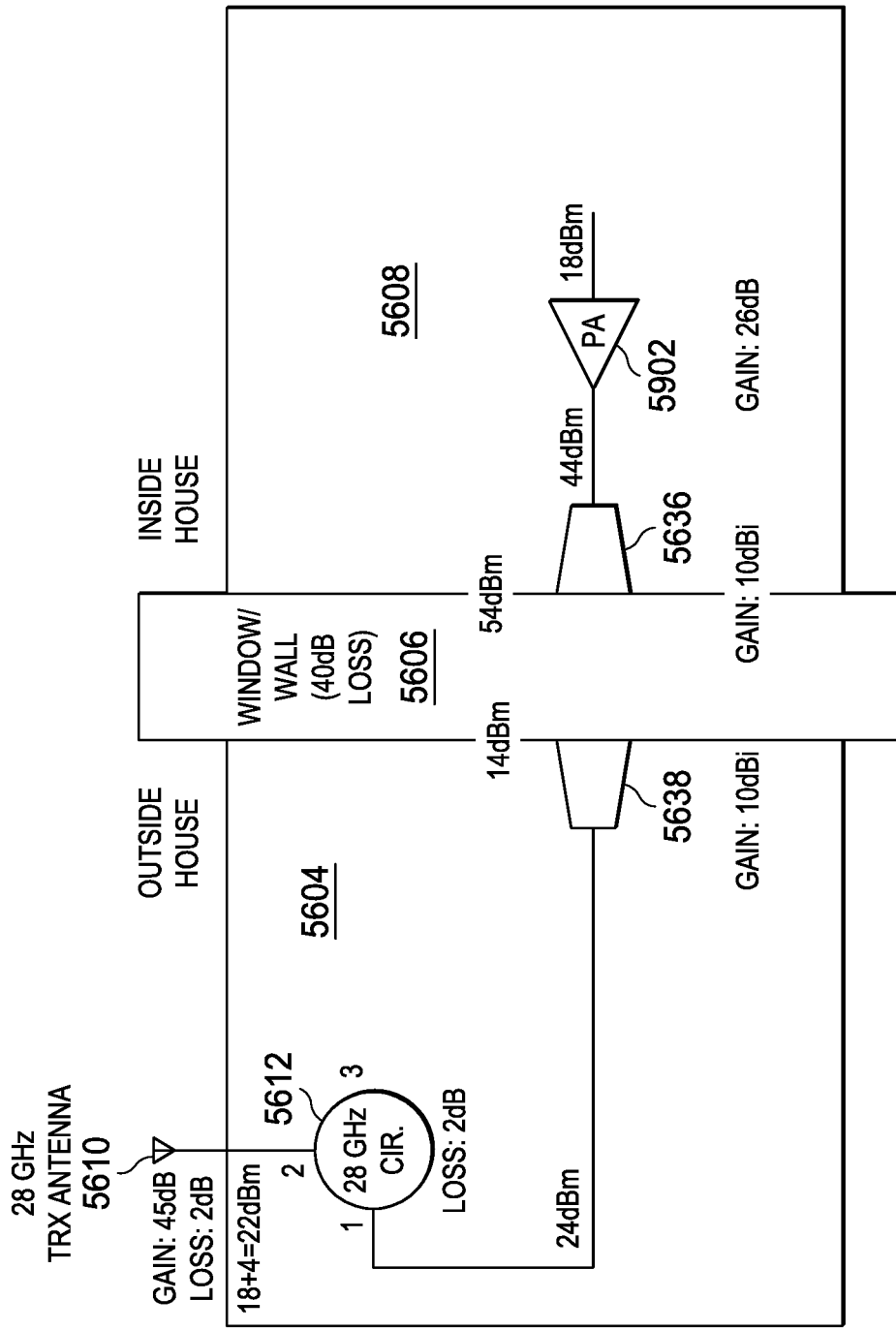
FIG. 59 illustrates up link signal strengths when a power amplifier is located inside of the building in the embodiment of FIG. 56.

Referring now to FIG. 59, there is illustrated the uplink signal strengths when the power amplifier 5902 is located inside of the building. The internal power amplifier 5902 is used when one needs more power to be transmitted from the inside terminal. Prior to input to the power amplifier 5902 the signal has a strength of 18 dBm within the building. The power amplifier 5902 provides a 26 dB gain to transmit the signal at 44 dBm to the input of the horn antenna 5636. The horn antenna 5636 provides a 10 dBi gain and the transmitted RF signal is at 54 dBm. The transmitted signal experiences a 40 dB loss through the window/wall 5604 that drops the signal strength to 14 dBm on the outside portion of the window/wall 5604. The receiving horn antenna 5638 provides a gain of 10 dBi to increase the signal strength to 24 dBm at the output of the horn antenna 5638 that is provided to port 1 of the circulator 5612. The circulator 5612 causes a 2 dB loss to drop the signal strength to 22 dBm. The transmitting antenna 5610 provides a further gain of 45 dB and loss off 2 dB to provide a transmitted output signal strength of 65 dBm.

Figure 60:
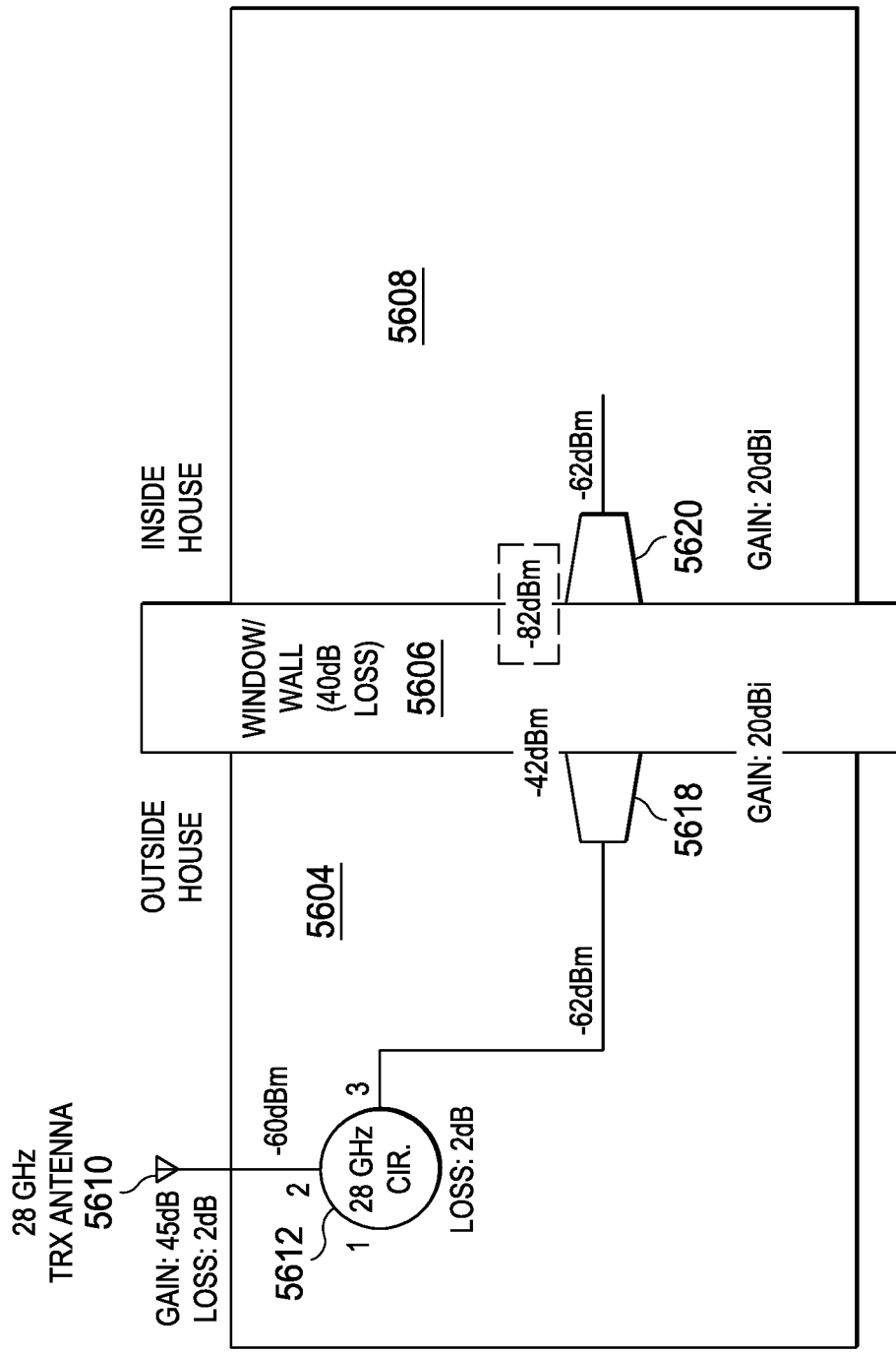
FIG. 60 illustrates gains and losses on a downlink of the embodiment of FIG. 59 when no power amplifier is incorporated.

Referring now to FIG. 60, there is illustrated the gains and losses on the downlink when no power amplifier is included. A signal having a −103 dBm strength is received by the antenna 5610. The antenna 5610 provides a gain of 45 dB and a loss of 2 dB. This provides a 60 DBM signal at the output of the antenna 5610 that is input to port 2 of the circulator 5612. The circulator 5612 provides a further 2 dB loss to the signal providing a −62 dBm signal from port 3 that is provided to the input of the horn antenna 5618 that provides a gain of the 20 dBi. A signal having a value of −42 dBm is transmitted from the horn antenna 5618 through the window/wall 5606. The window/wall 5606 provides a 40 dB loss to the transmitted signal providing a −82 dBm signal at the receiving horn antenna 5620. The horn antenna 5620 provides a further 20 dBi gain to the signal that is output at −62 dBm to the remaining circuitry of the inside portion 5608 of the device.

Figure 61:
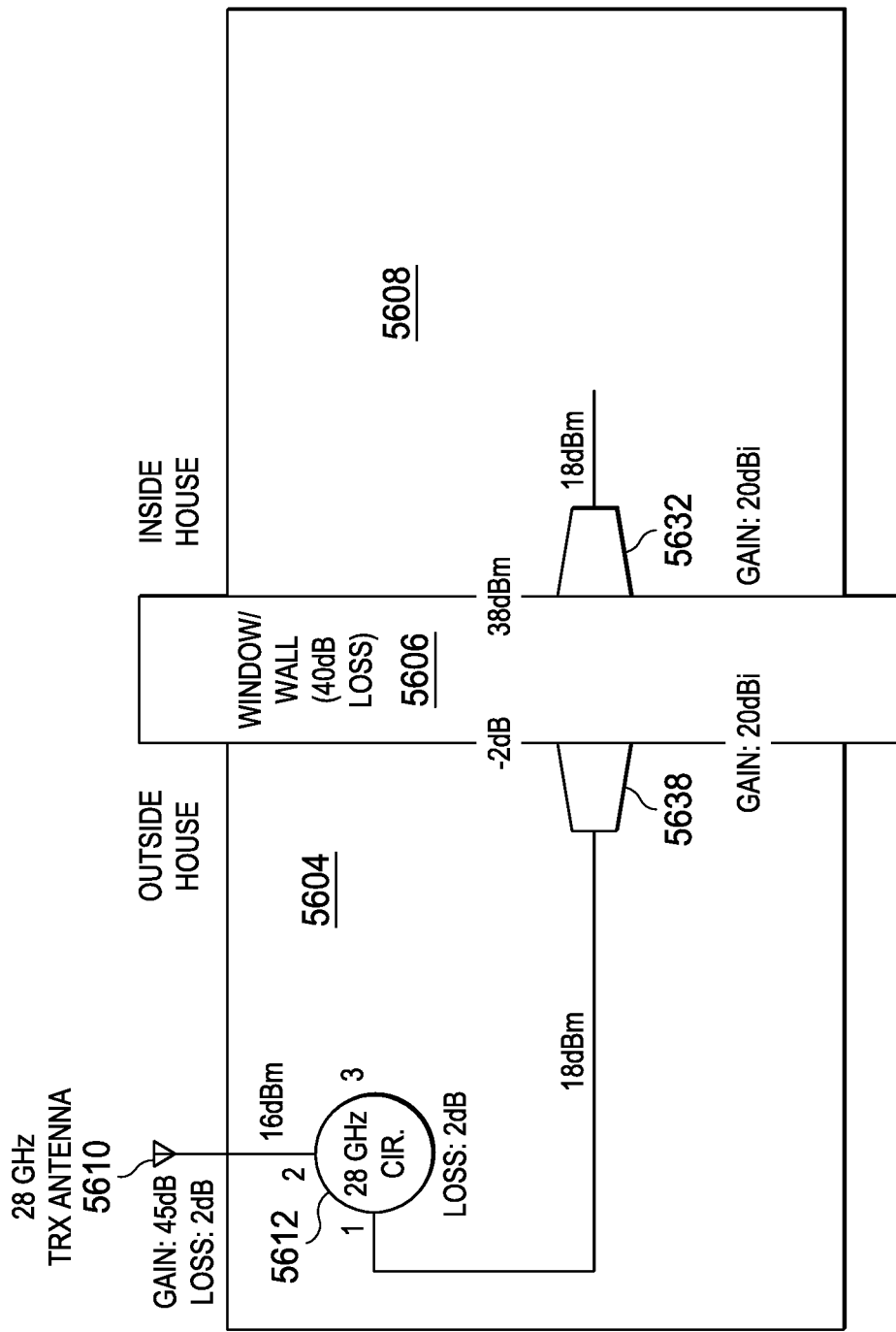
FIG. 61 illustrates signal strengths at various points of the uplink when no power amplifier is provided in the embodiment of FIG. 56.

Referring now to FIG. 61, there is illustrated the signal strengths at various points of an uplink when no power amplifier is provided. The transmitted signals are provided at a strength of 18 dBm to the input of the horn antenna 5632. The horn antenna 5632 provides a gain of 20 dBi to output a signal at 38 dBm through the window/wall 5606. The window/wall 5606 causes a 40 dB loss to the signal such that the receiving horn antenna 5638 receives a signal at −2 dB. The receiving horn antenna 5638 boosts the signal to 18 dBm with a gain of 20 dBi. The 18 dBm signal is input to port 1 of the circulator 5612. The circulator 5612 causes a 2 dB loss to the signal which is output through port 2 at 60 dBm. The transmitting antenna has a gain of 45 dB and a loss of two dB to cause a transmitted signal from the antenna at 59 dBm.

Figure 62:
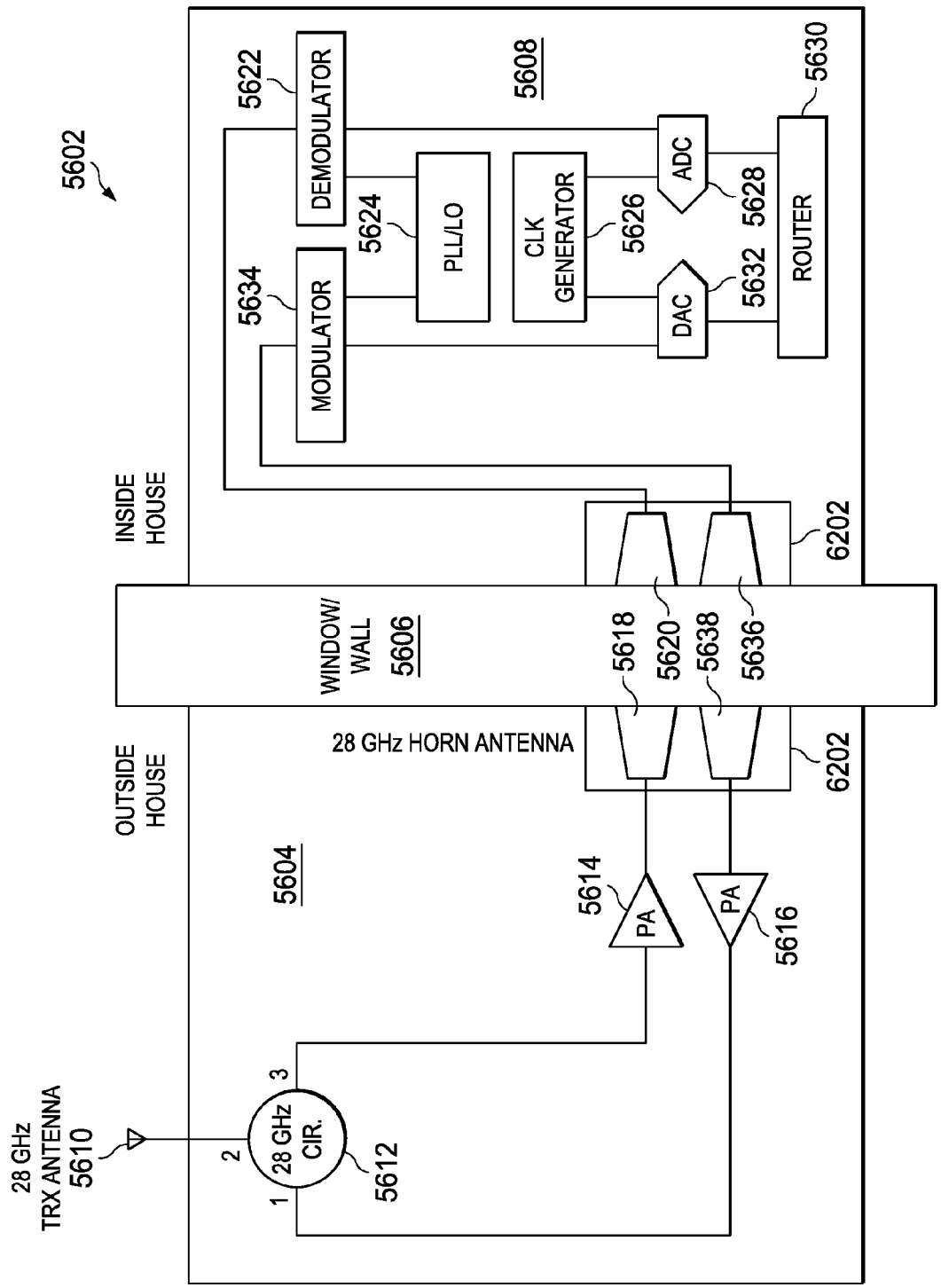
FIG. 62 illustrates shielding used incorporation with the embodiment of FIG. 56.

Referring now to FIG. 62, there is illustrated a further alternative embodiment using a horn antenna is used for the transmission of signals through the window or wall. As before, the millimeter wave transmission system 5602 includes an exterior portion 5604 located on an exterior of a window or wall 5606 and interior portion 5608 located on the interior of the wall or window. The exterior portion 5604 includes an antenna 5610 for transmitting and receiving signals to an exterior source.

The transmitted and received signals are processed at a 28 GHz circulator 5612. The port 3 signals are provided to the input of a power amplifier 5614. Similarly, the output of a power amplifier 5616 is connected to input port 1 such that signals to be transmitted are provided to port 2 of the circulator 5612 for transmission by antenna 5610. The signals output from the power amplifier 5614 are provided to a 28 GHz horn antenna 5618. The horn antenna 5618 transmitted to the RF signals provided from the power amplifier 5614 through the window or wall 5606 to a receiving horn antenna 5620. The receive signals are output from the horn antenna 5620 to a modulator circuit 5622 for demodulation. The demodulator 5622 in addition to receiving the receive signal from for an antenna 5620 receives a signal output from a phase locked loop/local oscillator 5624. The phase locked loop/local oscillator 5624 is controlled responsive to a clock generation circuit 5626. The demodulated signal is provided from the demodulator 5622 to analog-to-digital converter 5628. The digital signal is routed via a router 5632 the appropriate receiving party.

Signals to be transmitted are received from inside the building at the router 5630. In a one embodiment this will comprise a Wi-Fi router. The router 5630 provides digital signals to a digital to analog converter 5632 converts the signals into an analogue format. The analog signals are then modulated by a modulator 5634. The modulator 5634 modulates the signals responsive to input from the phase locked loop/local oscillator 5624 under control of the clock generation circuit 5626. The modulated signals from modulator 5634 are output through the window/wall 5606 through a horn antenna 5636. The signals transmitted by horn antenna 5636 or received by a receiving horn antenna 5638 located on the outside. The output of the horn antenna 5638 is provided to the input power amplifier 5616 that amplifies the signal for transmission from the antenna 5610 after passing through circulator 5612.

The horn antennas 5618, 5620, 5636 and 5638 can have high gains of up to 20 dB. The antenna patterns of these antennas will have side lobes and front lobes. The front lobes are projected toward a receiving antenna. In order to shield the surrounding environment from emissions from the side lobes of the horn antennas 5618, 5620, 5636 and 5638, shielding 6202 may be added over the horn antennas to provide adequate protection to the environment in the vicinity of the device. The shielding 6202 act as absorbers to block the signals from the surrounding environment and may comprise any material required to contain and absorb the emissions of the horn antennas to a localized area contained within the shielding enclosure 6202.

Figure 63:
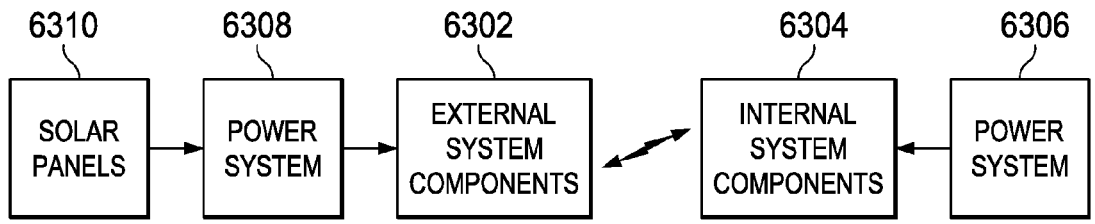
FIG. 63 illustrates a manner for powering external system components using solar panels.

Referring now to FIG. 63, there is illustrated the manner in which power may be provided to the external system component 6302 located within the external portion 5604 of the system and the internal system components 6304 located within the internal portion 5608. The internal system component 6304 comprises the horn antennas 5620, 5636 modulator 5634, demodulator 5622 and other components discussed with respect to FIG. 56 for generating signals for transmission and determining signals that have been received. The external system components 6302 consist of the circulator 5612, power amplifiers 5614, 5616 and horn antennas 5618, 5638 described with respect to FIG. 56. The internal system component 6304 are connected to an internal power system 6306 that may plug into the electrical power system located within the building. Since the internal system component 6304 and external system component 6302 are separated by a window/wall 5606, there must be some manner for transmitting or providing power to the external system components. One manner for doing so involves the use of a power system 6308 that is powered by a number of solar panels 6310 that are located on the exterior of the building to which the external system component 6302 are connected.

The power required from the power system 6308 to the external system components 6302 is approximately 0.76 W. One manner for providing this 0.76 W power is through the use of solar panels 6310. Solar panels providing 0.76 W or 1 W may be utilized for the solar panels 6310. With respect to a 0.76 W power provision system, 0.76 W for 24 hours would require 18.24 W hours of power. If 18.24 W hours are provided at an efficiency of 1.25%, this will require 22.8 W hours. If an efficiency of 22.8 W hours is divided by 3.5 hours (# number of daylight hours in winter), a total result of 6.52 W is provided. Similarly for a 1 W system, 1 W provided for 1 day requires 24 W hours. 24 W hours at a 1.25% efficiency requires 30 W hours. 30 W hours divided by 3.5 hours of sun available in the winter provides 8.57 W hours. The solar panels 6310 used for providing power may be similar to those solar panels used for charging smart phones and tablets. These type of panels include both 7 W charging panels and 9 W charging panels that meet the 0.76 W and 1 W energy levels requirements.

7 W portable solar chargers having high efficiency solar charging panels normally have a weight of 0.8 pounds.

These devices have general dimensions of 12.8×7.5×1.4 inches (32.5×19×3.5 cm). Other 7 W amorphous solar power battery charger panels have a size of 15.8×12.5×0.8 inches (40×31.75×2 cm) and a weight of 3 pounds. Alternative 9 W charging panels with monocrystalline cells have dimensions ranging from 8.7×10×0.2 inches (22×25.5×0.5 cm) and flexible solar panels have a size of 12×40 inches (30.5×100 cm). Other 9 W high-efficiency solar panels have sizes from 8.8×12.2×0.2 inches (22.35×31×0.5 cm).

Figure 64:
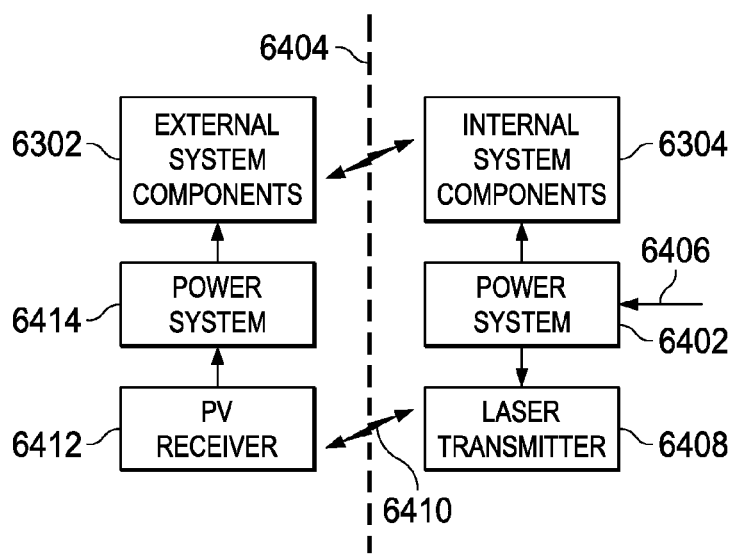
FIG. 64 illustrates a manner for powering external system components using lasers.

Referring now to FIG. 64, rather than utilizing solar panels, the external system components 6302 may utilize transmitted laser power for powering the external system components rather than utilizing a solar powered system. The internal system components 6304 have a power system 6402 that provides power for all components on the interior portion of a window or wall 6404. The power system 6402 has an internal power connection 6406 to for example, a power outlet located within the building. The power system 6402 provides system power to the internal system components 6304 in a known manner. Additionally, the power system 6402 provides power to a laser transmitter 6408. The laser transmitter 6408 generates a laser beam 6410 that is transmitted through a window 6404 to a photovoltaic receiver (PV receiver) 6412 located on the outside of the window 6404. The laser transmitter 6408 includes a set of optics to define the beam size that is to be transmitted to the PV receiver 6412. The generated laser power may be defined according to the following equations:

$$P_{Optic} = \frac{P_{Electric}}{Eff_{Optics} \times Eff_{PV\ Cells}(\eta)}$$

$$QE(Eff_{PV-Cell}), \eta = \frac{R_\lambda}{\lambda} \times \frac{hc}{e} \approx \frac{R_\lambda}{\lambda_{\mu m}} \times 1.24$$

$$\eta = R\frac{1.24}{\lambda_{\mu m}}$$

The optical power needed by the PV receiver that detects energy at 445 nm may be defined in the following manner:

λ=445 nm

This is the wavelength of the receiver laser.

$R = 0.25$ (Hamamatsu Si – photodiode)

$$\eta = R\frac{1.24}{\lambda_{\mu m}} = 0.69$$

$Eff_{Optics} = 0.64$ (Efficiency of Optics)

$$P_{Optic} = \frac{P_{Electric}}{Eff_{Optics} \times Eff_{PV\ Cells}(\eta)_{Optic}} = \frac{0.76}{0.64 \times 0.69} = 1.72\ W$$

Thus, in order to provide power at 445 nm a 2 W laser diode is needed. The PV receiver 6412 converts received laser light energy back into electricity. Power generated by the PV receiver 6412 responsive to the received laser beam 6410 is provided to the power system 6414. The power system 6414 and provides power to the external system component 6302 to enable their operation.

Figure 65:
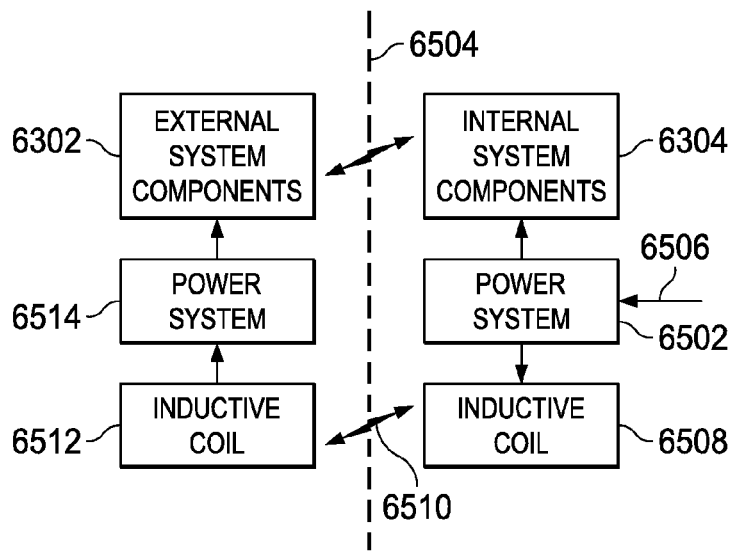
FIG. 65 illustrates a manner for powering exterior components from an interior power source using inductive coupling.

Referring now to FIG. 65, there is illustrated a further manner for powering exterior components from an interior power source using inductive coupling rather than utilizing solar panels or a laser source, the external system components 6302 may utilize power provided by inductive coupling to the internal power source through the window/wall 6504 for powering the external system components. The internal system components 6304 have a power system 6502 that provides power for all components on the interior portion of a window or wall 6504. The power system 6502 has an internal power connection 6506 to for example, a power outlet located within the building. The power system 6502 provides system power to the internal system components 6304 in a known manner. Additionally, the power system 6502 provides power to a inductive coil 6508. The inductive coil 6508 enables a magnetic connection with a second inductive coil 6512 located on the exterior of the window/wall 6504. The inductive coils 6508 and 6512 enable the inductive coupling of power from the internal power system 6502 to the external power system 6514. Power received at the inductive coil 6512 responsive to the received electromagnetic energy 6510 is provided to the power system 6514. The power system 6514 and provides power to the external system component 6302 to enable their operation.

Also, in addition to the actively powered devices illustrated in FIGS. 63, 64 and 65, a passively powered device may be used that provides no powering to the exterior components but provides a shorter distance or higher power from the internal components within the building.

The described system provides an optical or RF tunnel that allows signals to be transmitted from outside a building to devices within the building. The optical or RF tunnel can also be used to allow signals from the Internet of Things devices located within the building to go from inside to outside. In addition to the techniques described herein above, other near field techniques can be used for transmitting the information through the window or wall.

It will be appreciated by those skilled in the art having the benefit of this disclosure that this regeneration and retransmission of millimeter waves for building penetration provides a manner for providing millimeter wave signals inside of a building where the signals do not effectively penetrate. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for enabling signal penetration into a building, comprising:

first circuitry, located on an outside of the building, for receiving millimeter wave signals and converting the millimeter wave signals into a format that overcomes losses caused by penetrating into an interior of the building over a wireless communications link, wherein the first circuitry further comprises:

at least one power amplifier for amplifying the received millimeter wave signals to a level that counteracts losses occurring when the millimeter wave signals are transmitted from the outside of the building to the interior of the building; and second circuitry, located on the interior of the building and communicatively linked with the first circuitry via the wireless communications link, for receiving the millimeter wave signals in the format that overcomes the losses caused by penetrating into the interior of the building and converting the millimeter wave signals in the format to a second format for transmission to the wireless devices within the building.

2. The system of claim 1 further comprising:
wherein the first circuitry further comprises:
an antenna for transmitting and receiving the millimeter wave signals;
at least one of a first conical or horn antennas for transmitting and receiving the amplified millimeter wave signal from/to the outside of the building to/from the interior of the building;
wherein the second circuitry further comprises:
at least one of a second conical or horn antennas for receiving and transmitting the amplified millimeter wave signal from/to the at least one first conical or horn antennas; and
transceiver circuitry for converting the received, amplified millimeter wave signal to the second format for transmission to the wireless devices within the building.

3. The system of claim 1, wherein the at least one power amplifier further amplifies millimeter wave signals before they are transmitted by the at least one of the first canonical or horn antenna.

4. The system of claim 1 further including at least one solar panel associated with the at least one power amplifier, the at least one solar panel providing power for operating the at least one power amplifier.

5. The system of claim 1 further including a laser power system for providing power to the at least one power amplifier, the laser power system further comprising:
a laser for generating a beam for transmission of light energy from the interior of the building to the exterior of the building; and
a photovoltaic receiver for receiving the light energy from the laser beam and generating electrical energy to power the at least one power amplifier.

6. The system of claim 1 further including an inductive coupling system for providing power to the at least one power amplifier, the inductive coupling system further comprising:
a first inductive coil located on the interior of the building and connected to a power system located in the interior of the building; and
a second inductive coil located on the exterior of the building and inductively coupled to the first inductive coil, the second inductive coil connected to provide electrical energy to the at least one power amplifier.

7. The system of claim 2 further including a second at least one power amplifier located on the interior of the building for amplifying the millimeter wave signals from the transceiver to a second level that counteracts losses occurring when the millimeter wave signals are transmitted from the interior of the building to the exterior of the building.

8. The system of claim 1 further including an RF circulator for interconnecting the antenna with the at least one power amplifier.

9. The system of claim 2, wherein the first and second at least one of the conical or horn antennas have a gain of at least 20 dB.

10. The system of claim 2 further including a shielding material for limiting transmissions that do not pass directly between the first at least one conical or horn antenna and the second at least one conical or horn antenna.

11. The system of claim 1, wherein the second circuitry further comprises a WiFi router to transmit signals in the format to the wireless devices within the building.

12. The system of claim 1, wherein the first circuitry and the second circuitry are communicatively coupled via an RF tunnel.

13. The system of claim 1, wherein the first circuitry and the second circuitry are communicatively coupled via a nearfield technique.

14. A system for enabling signal penetration into a building, comprising:
first circuitry, located on an outside of the building, for receiving millimeter wave signals and converting the millimeter wave signals into a format that overcomes dB losses caused by penetrating into an interior of the building over a wireless link, wherein the first circuitry further comprises:
at least one power amplifier for amplifying the received millimeter wave signals to a level that counteracts dB losses occurring when the millimeter wave signals are transmitted from the outside of the building to the interior of the building;
second circuitry, located on the interior of the building and communicatively linked with the first circuitry via the wireless link, for receiving the millimeter wave signals in the format that overcomes dB losses caused by penetrating into the interior of the building and converting the millimeter wave signals in the format to a second format for transmission to wireless devices within the building; and
wherein the first circuitry and the second circuitry are communicatively coupled via an RF tunnel.

15. A system for enabling signal penetration into a building, comprising:
first circuitry, located on an outside of the building, for receiving millimeter wave signals and converting the millimeter wave signals into a format that overcomes dB losses caused by penetrating into an interior of the building for reception by wireless devices within the building, wherein the first circuitry further comprises:
an antenna for transmitting and receiving the millimeter wave signals;
at least one power amplifier for amplifying the received millimeter wave signals to a level that counteracts the dB losses occurring when the millimeter wave signals are transmitted from outside the building to the interior of the building;
transceiver circuitry for transmitting and receiving the amplified millimeter wave signal from/to the outside of the building to/from the interior of the building.

16. The system of claim 15, wherein the at least one power amplifier further amplifies millimeter wave signals before they are transmitted by the transceiver circuitry.

17. A system for enabling signal penetration into a building, comprising:
first circuitry, located on an outside of the building, for receiving millimeter wave signals and converting the millimeter wave signals into a format that overcomes dB losses caused by penetrating into an interior of the building for reception by wireless devices within the building, wherein the first circuitry further comprises:
at least one power amplifier for amplifying the received millimeter wave signals to a level that counteracts losses occurring when the millimeter wave signals are transmitted from the outside of the building to the interior of the building; and second circuitry, located on the interior of the building and communicatively linked with the first circuitry, for receiving the millimeter wave signals in the format that overcomes the dB losses caused by penetrating into the interior of the building and converting the millimeter wave signals in the format to a second format for transmission to a wireless device within the building.

18. The system of claim 1, wherein the losses further include at least one of absorption losses, scattering losses and reflection losses.

19. The system of claim 14, wherein the dB losses further include at least one of absorption losses, scattering losses and reflection losses.

20. The system of claim 15, wherein the dB losses further include at least one of absorption losses, scattering losses and reflection losses.

21. The system of claim 17, wherein the dB losses further include at least one of absorption losses, scattering losses and reflection losses.

* * * * *